United States Patent
Vidnovic et al.

(10) Patent No.: US 11,481,205 B2
(45) Date of Patent: Oct. 25, 2022

(54) USER INTERFACES FOR MANAGING SUBSCRIPTIONS

(71) Applicant: Apple Inc., Cupertino, CA (US)

(72) Inventors: John Vidnovic, San Francisco, CA (US); Bryan Wegman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/888,524

(22) Filed: May 29, 2020

(65) Prior Publication Data

US 2020/0379741 A1   Dec. 3, 2020

Related U.S. Application Data

(60) Provisional application No. 62/856,014, filed on Jun. 1, 2019.

(51) Int. Cl.

| | |
|---|---|
| *G06F 8/61* | (2018.01) |
| *G06F 21/44* | (2013.01) |
| *G06F 3/0482* | (2013.01) |
| *H04L 29/08* | (2006.01) |
| *H04L 67/306* | (2022.01) |

(52) U.S. Cl.
CPC .............. *G06F 8/62* (2013.01); *G06F 3/0482* (2013.01); *G06F 21/44* (2013.01); *H04L 67/306* (2013.01)

(58) Field of Classification Search
CPC .......... G06F 8/62; G06F 21/44; G06F 3/0482; G06F 2203/014; G06F 3/04883; G06F 8/60; H04L 67/306; H04L 67/18; H04L 67/26

See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,458,051 B1 * | 6/2013 | Saltzman ............... G06Q 20/02 705/26.7 |

(Continued)

FOREIGN PATENT DOCUMENTS

| | | |
|---|---|---|
| WO | 2013/169849 A2 | 11/2013 |
| WO | 2014/105276 A1 | 7/2014 |

*Primary Examiner* — Sang H Kim
(74) *Attorney, Agent, or Firm* — Kubota & Basol LLP

(57) ABSTRACT

In some embodiments, an electronic device presents a subscription management user interface. The subscription management user interface optionally includes one or more selectable options that, when selected, change the status of a subscription associated with a user account of the user. In some embodiments, the subscription management user interface is presented in response to detecting deletion of an application that utilizes an active subscription associated with the user account of the user.

45 Claims, 45 Drawing Sheets

(56) References Cited

U.S. PATENT DOCUMENTS

| | | | |
|---|---|---|---|
| 8,479,122 B2 | 7/2013 | Hotelling et al. | |
| 9,348,458 B2 | 5/2016 | Hotelling et al. | |
| 9,933,937 B2 | 4/2018 | Lemay et al. | |
| 10,079,872 B1* | 9/2018 | Thomas | H04M 15/80 |
| 2002/0015024 A1 | 2/2002 | Westerman et al. | |
| 2003/0033209 A1* | 2/2003 | Minear | G06Q 40/12 |
| | | | 705/26.1 |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2009/0055266 A1* | 2/2009 | Brody | G06Q 40/12 |
| | | | 705/14.61 |
| 2009/0307105 A1* | 12/2009 | Lemay | G06F 3/04817 |
| | | | 705/26.1 |
| 2011/0231280 A1* | 9/2011 | Farah | G06Q 30/04 |
| | | | 705/26.8 |
| 2013/0179360 A1* | 7/2013 | Baker | H04L 63/0823 |
| | | | 705/325 |
| 2014/0236846 A1* | 8/2014 | Melika | G06Q 10/06 |
| | | | 705/310 |
| 2014/0337139 A1* | 11/2014 | Thomas | G06Q 30/0269 |
| | | | 705/14.66 |
| 2016/0308940 A1* | 10/2016 | Procopio | H04L 67/10 |
| 2019/0028865 A1* | 1/2019 | Raleigh | G06T 1/0007 |

\* cited by examiner

USER INTERFACES FOR MANAGING SUBSCRIPTIONS

CROSS-REFERENCE TO RELATED APPLICATIONS

This application claims the benefit of U.S. Provisional Application No. 62/856,014, filed Jun. 1, 2019, which is hereby incorporated by reference in its entirety for all purposes.

FIELD OF THE DISCLOSURE

This relates generally to electronic devices that present user interfaces for managing subscriptions associated with user accounts.

BACKGROUND

User interaction with electronic devices has increased significantly in recent years. These devices can be devices such as computers, tablet computers, televisions, multimedia devices, mobile devices, and the like.

In some circumstances, users wish to discontinue subscriptions after deleting applications associated with subscriptions. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to presenting a notification of an active subscription in response to detecting deletion of an application associated with the active subscription. Some embodiments in this disclosure are directed to including a selectable option that, when selected, causes the electronic device to display a subscription management user interface in the notification of the subscription.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
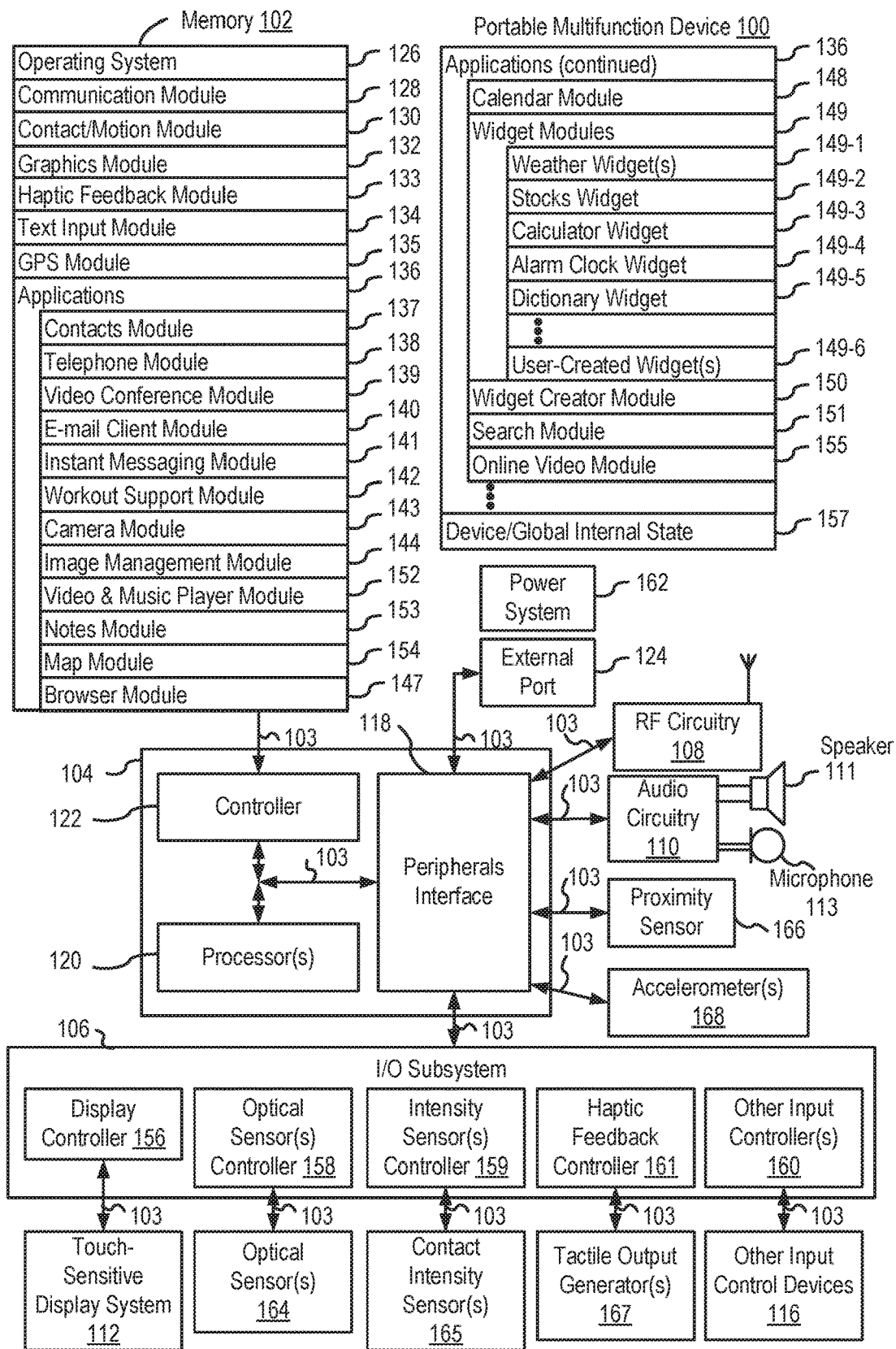
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that present subscription management user interfaces. There is also a need for electronic devices that present subscription management user interfaces in response to detecting deletion of applications that utilize an active subscription. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety.

In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
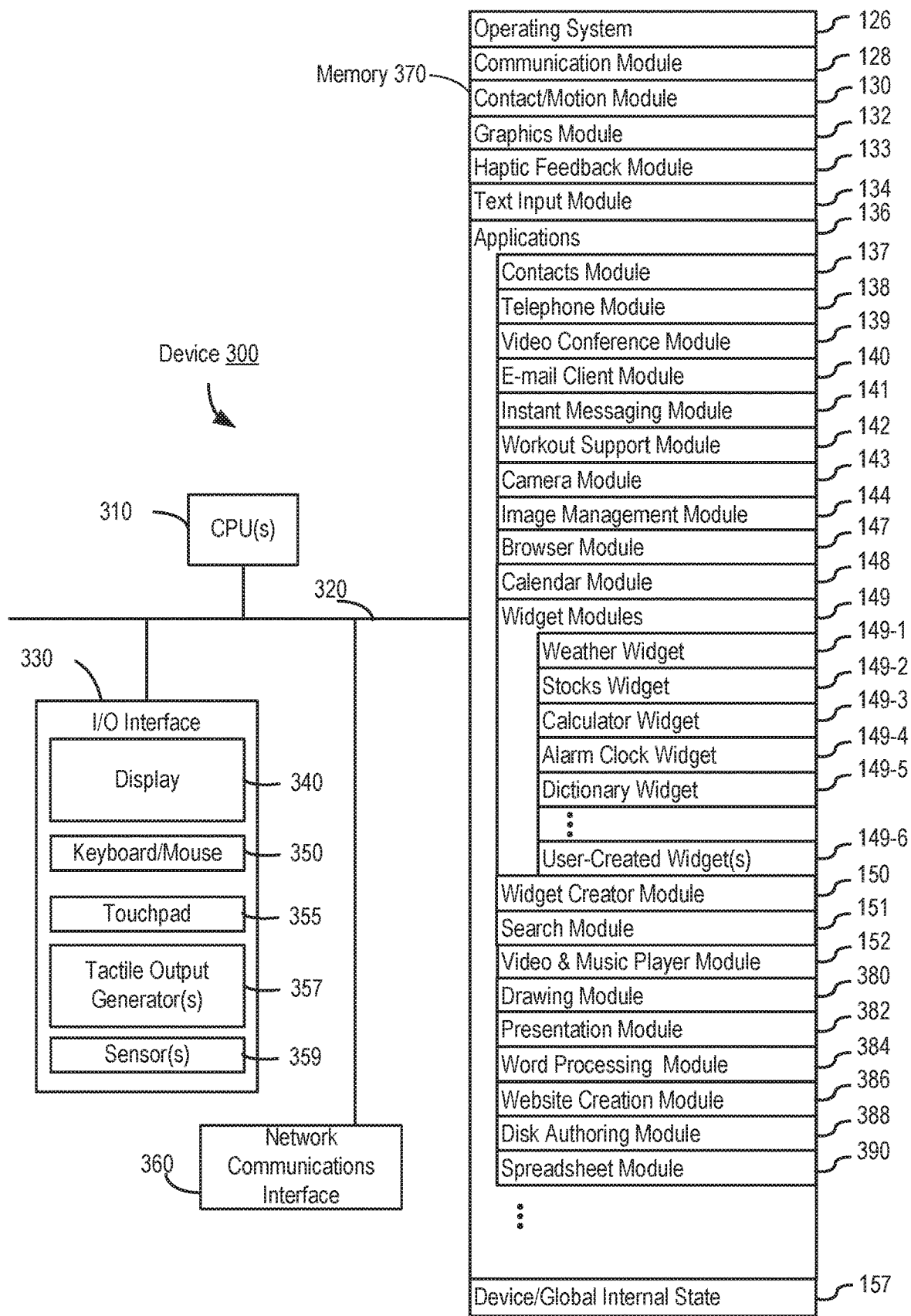
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
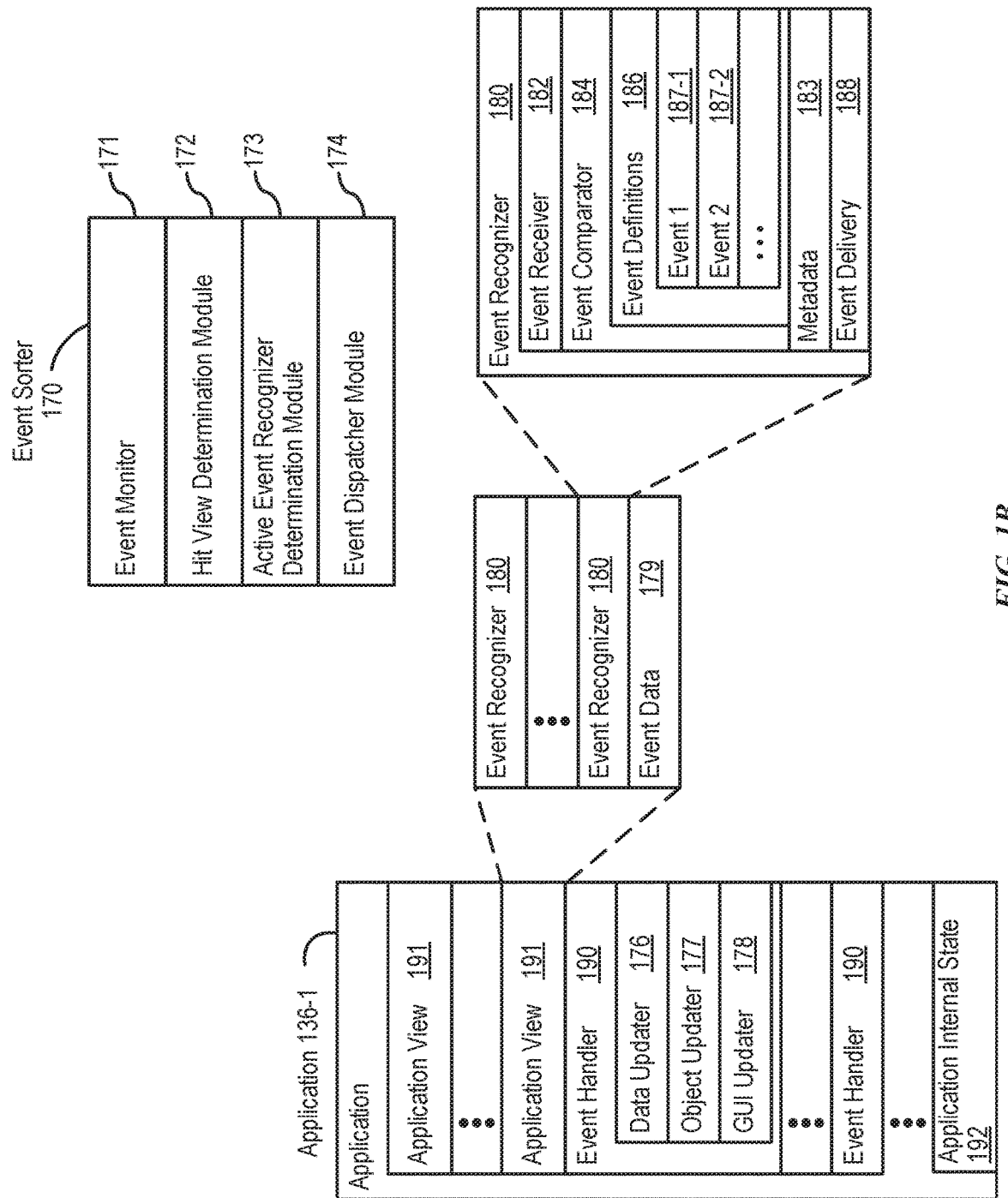
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
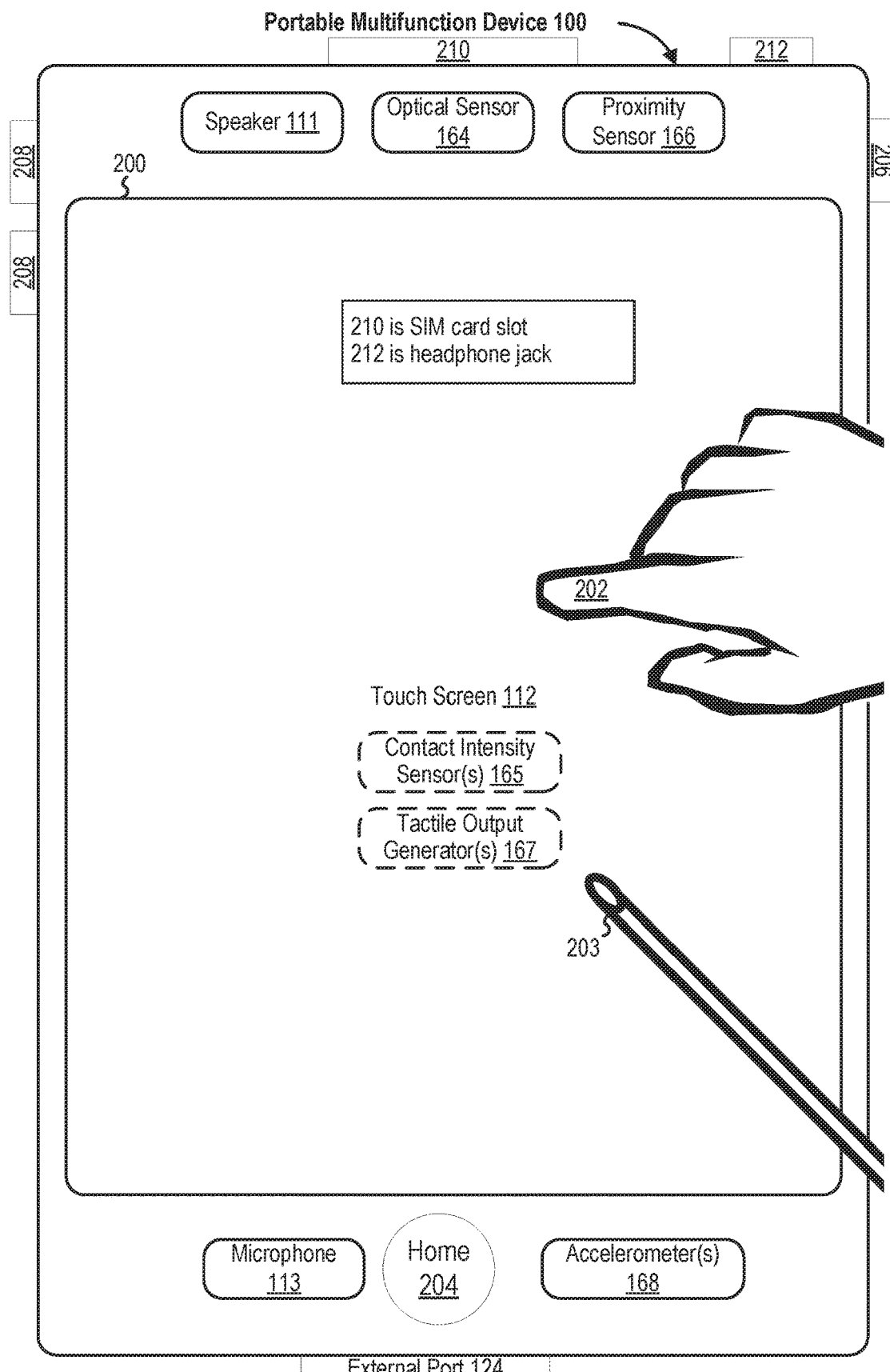
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
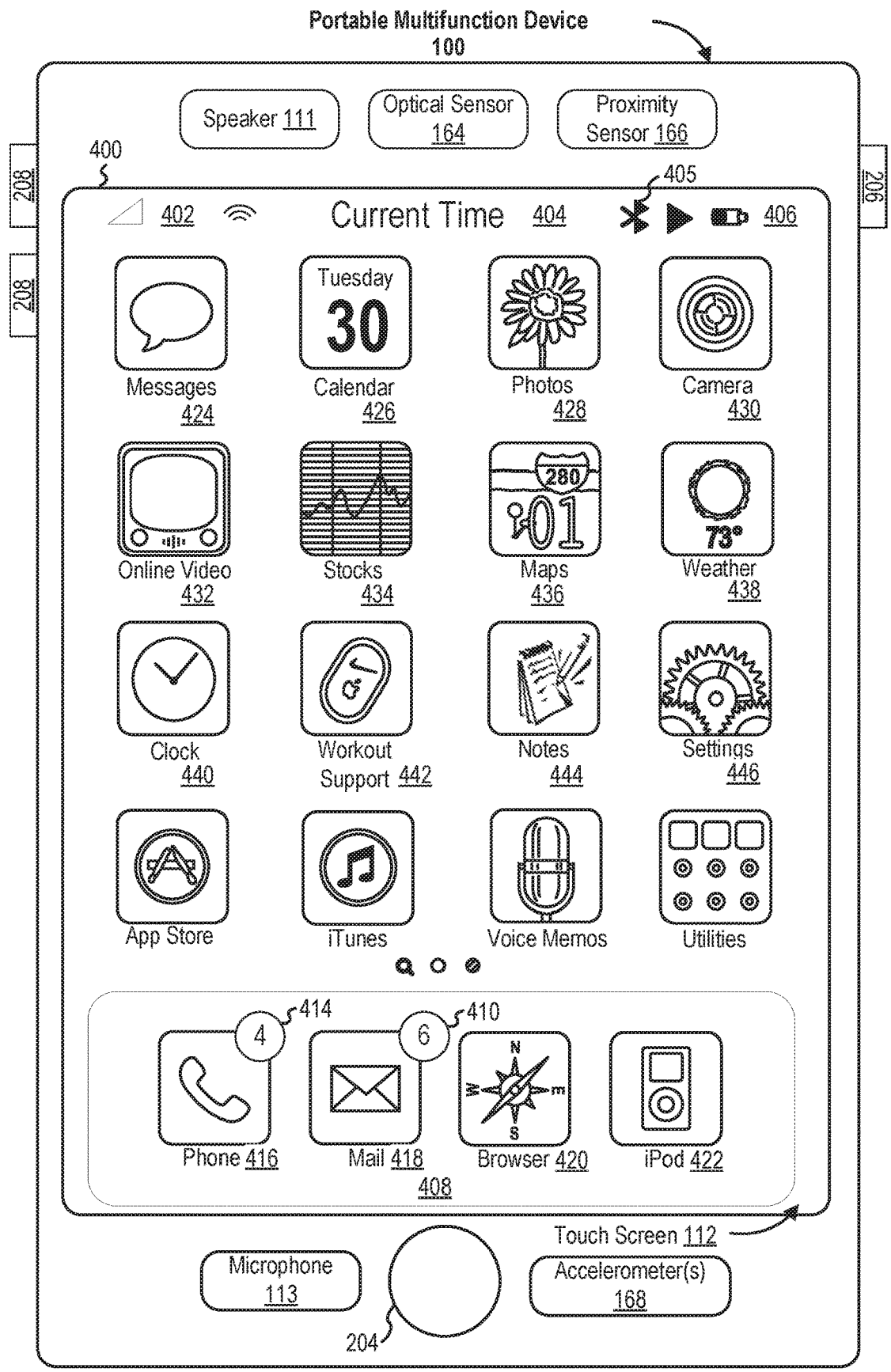
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
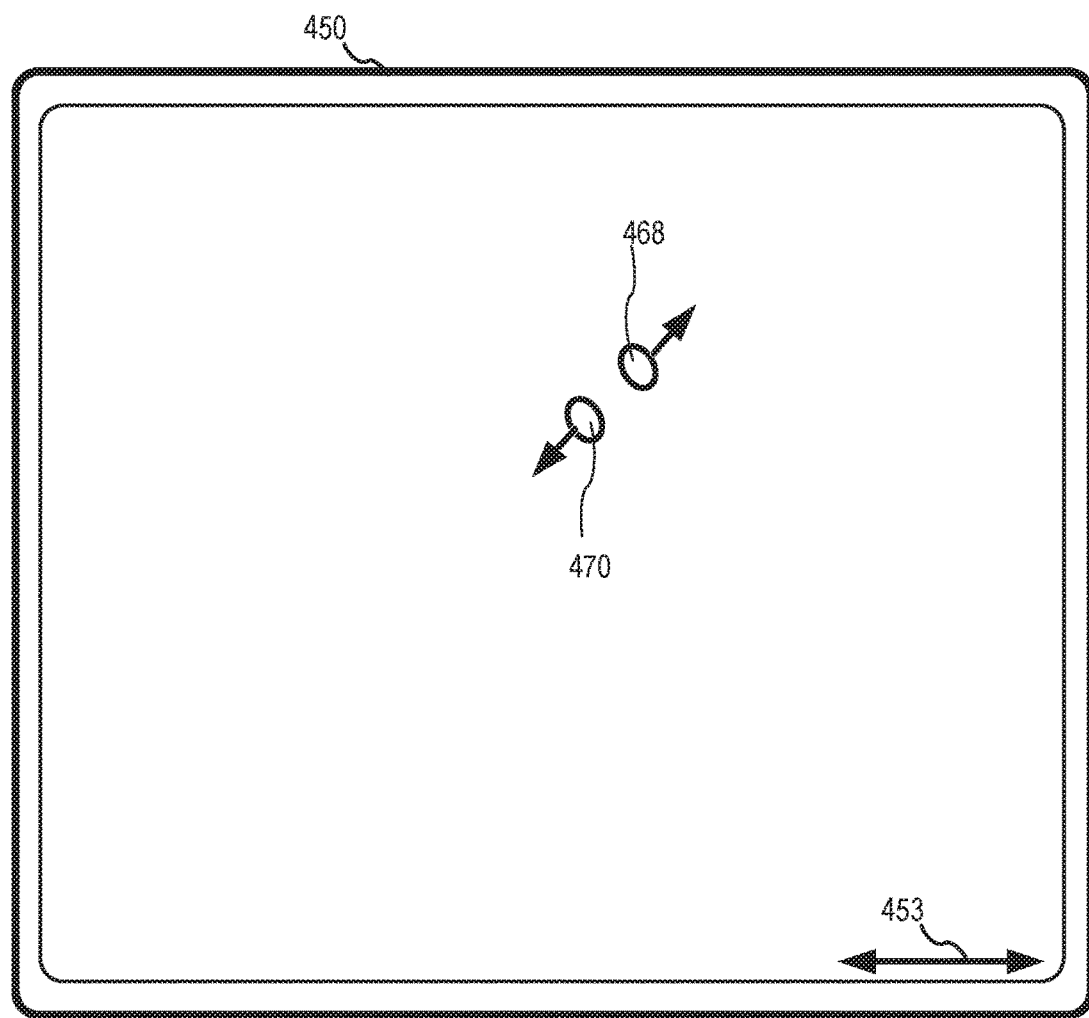
FIG. 4B illustrates an exemplary user interface for a multifunction device with a touch-sensitive surface that is separate from the display in accordance with some embodiments.
Figure 4B:
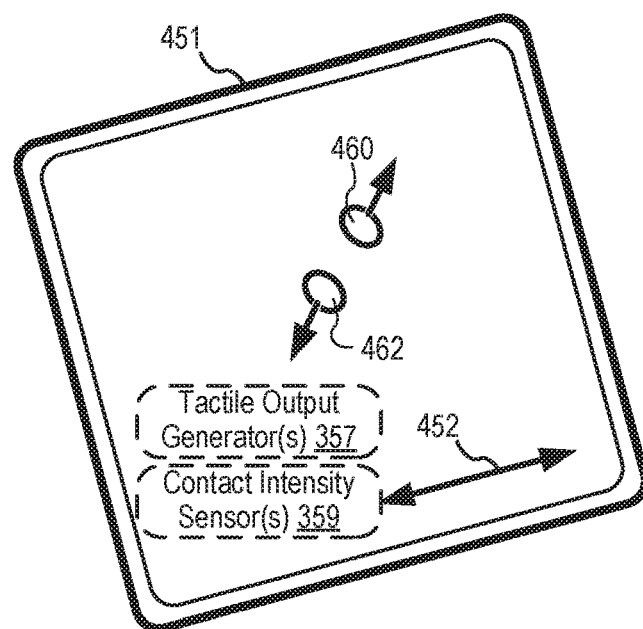

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
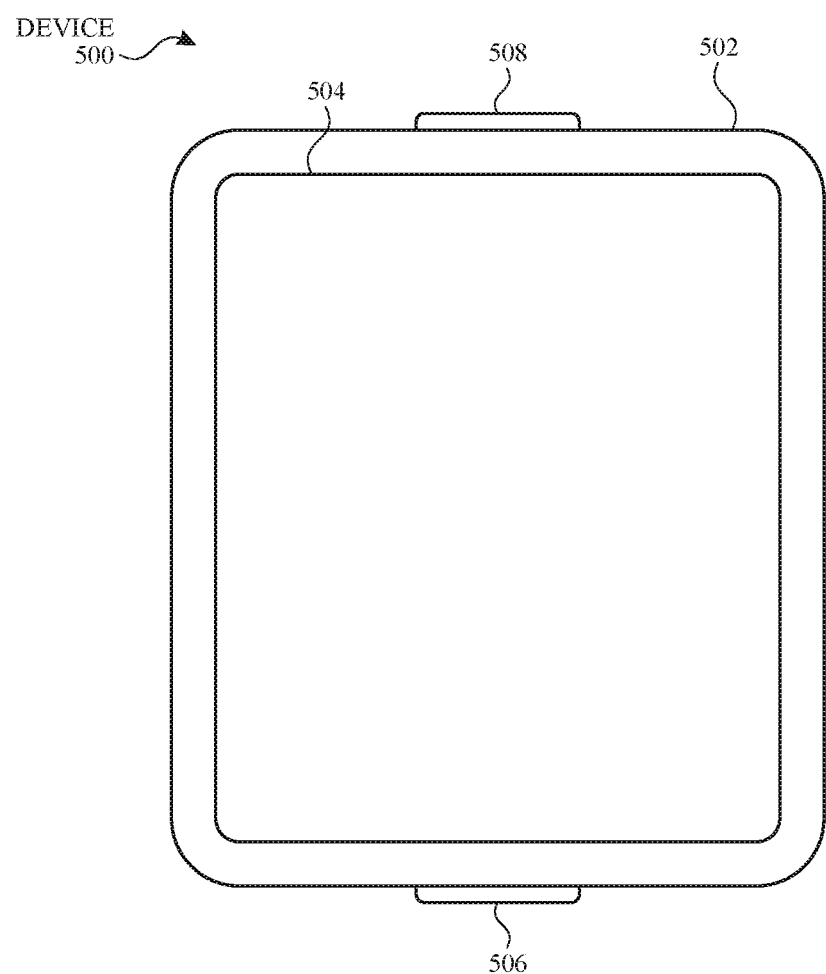
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
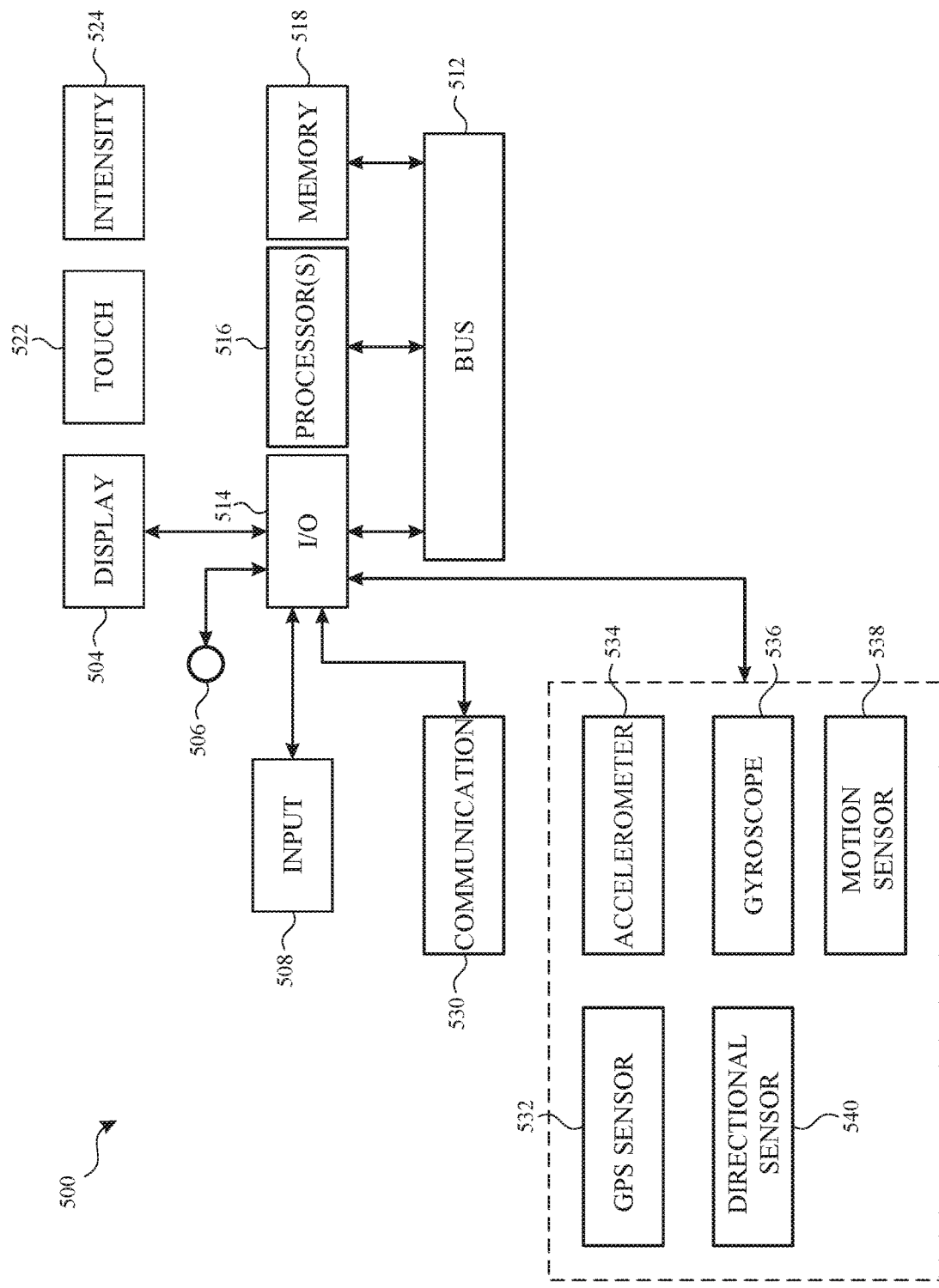
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-7. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
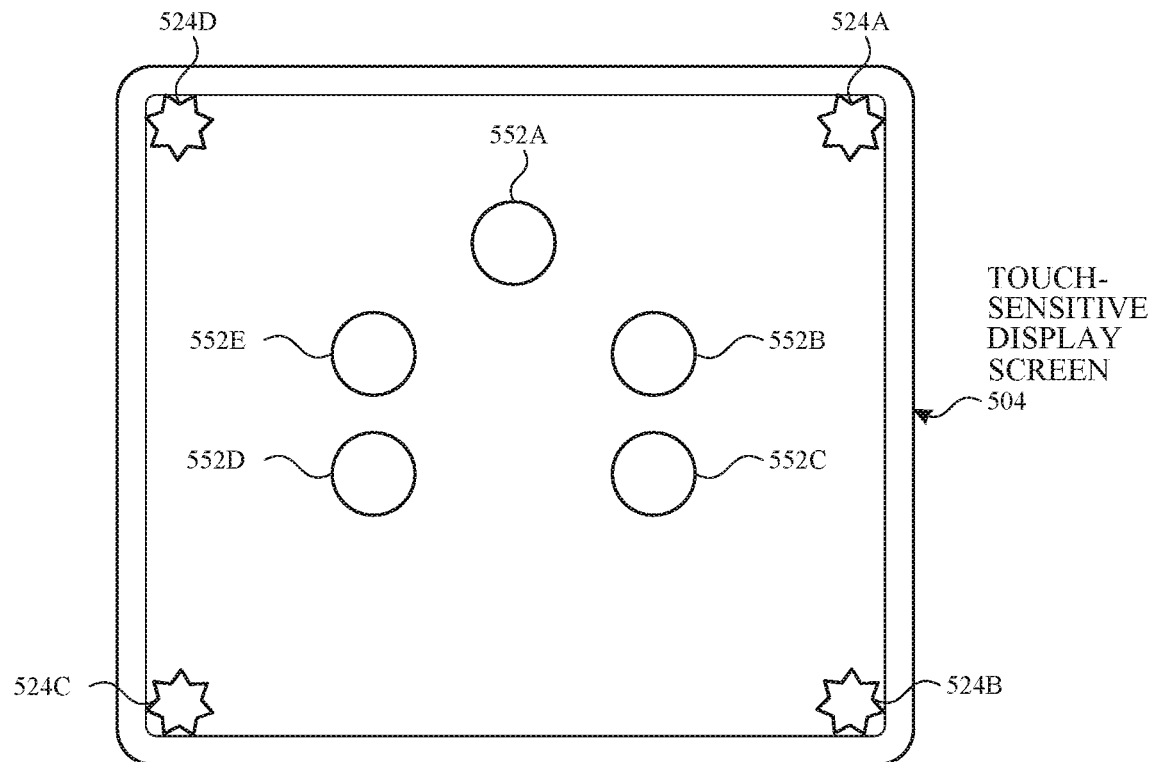
FIGS. 5C-5D illustrate exemplary components of a personal electronic device having a touch-sensitive display and intensity sensors in accordance with some embodiments.
Figure 5C:
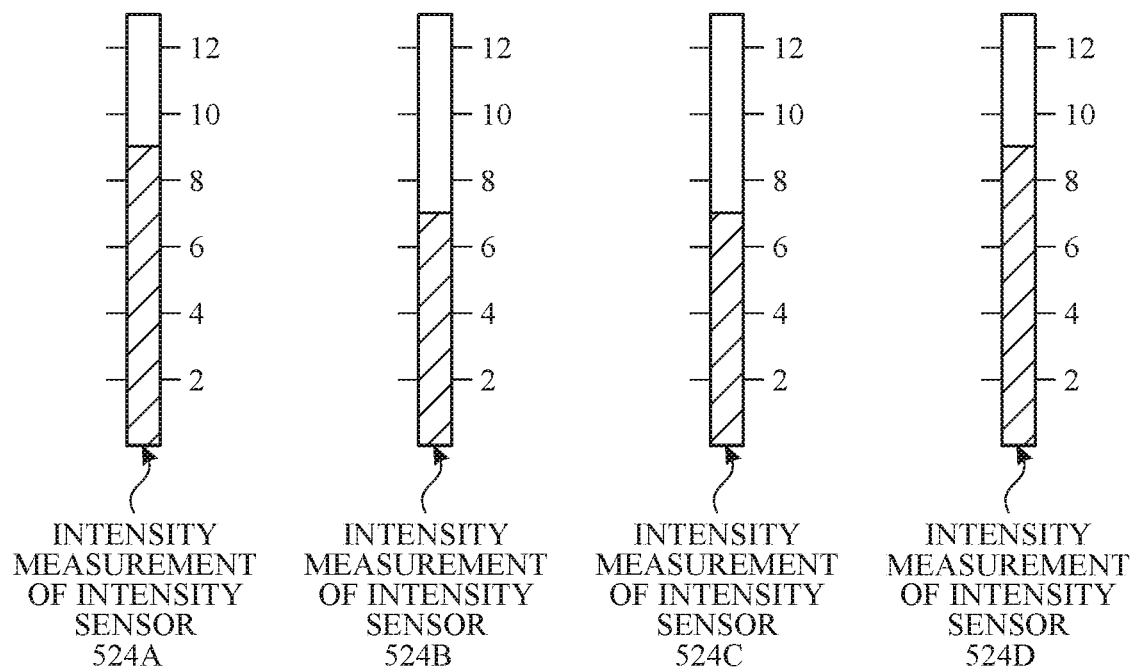
Figure 5D:
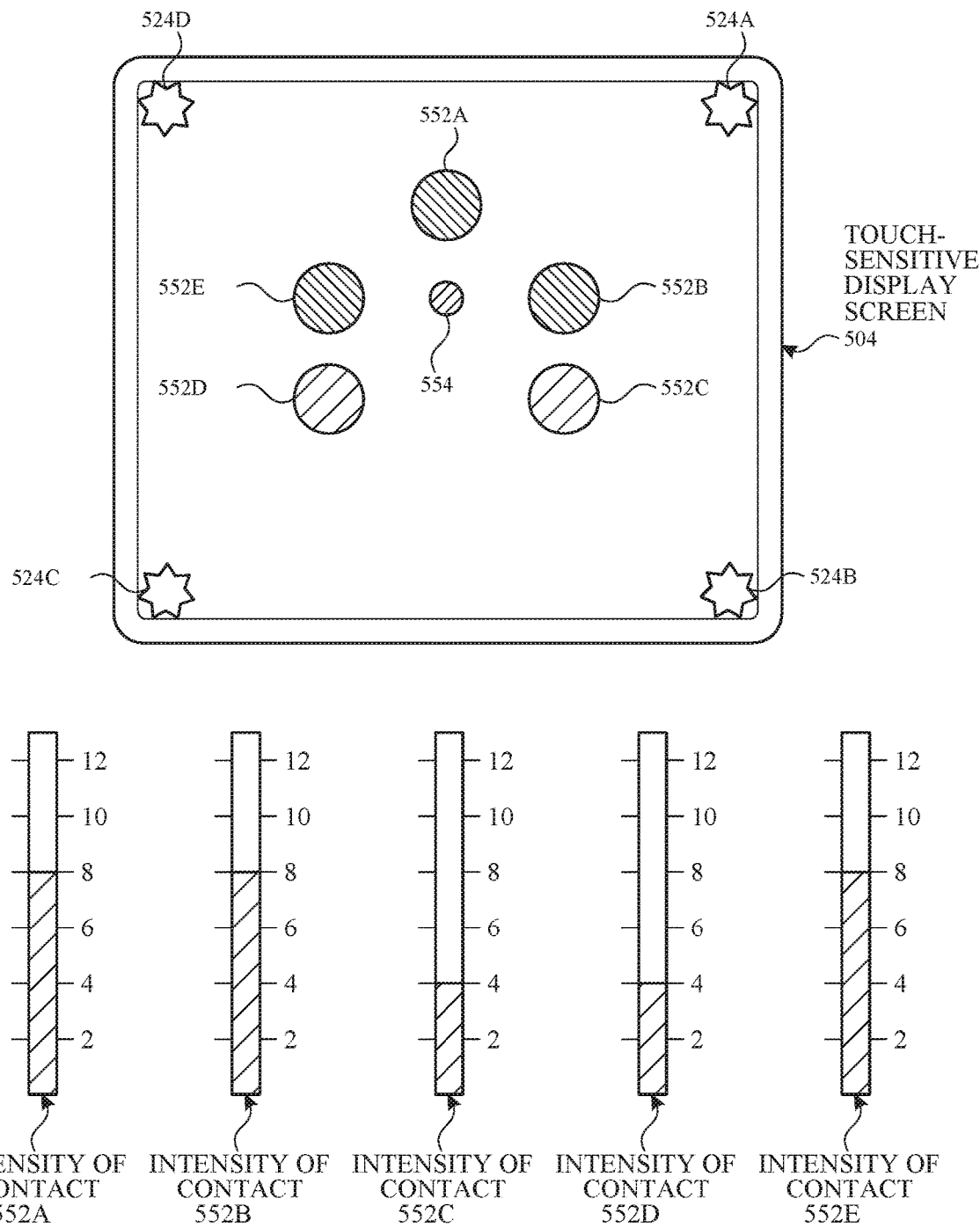

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts)

above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
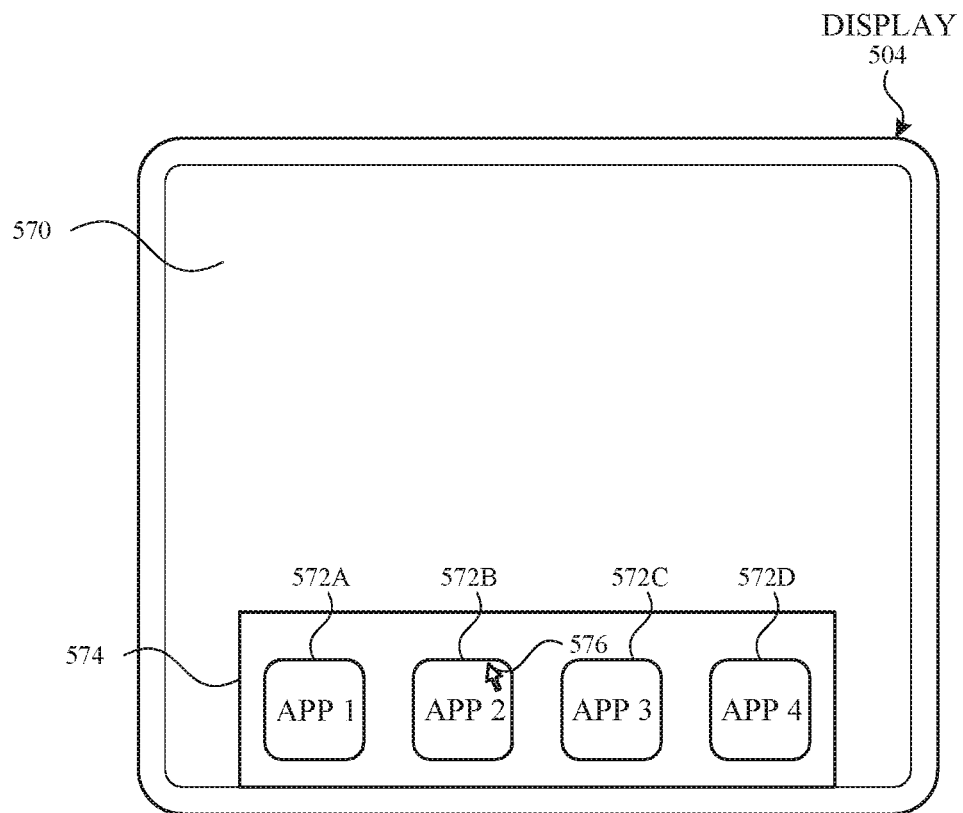
FIGS. 5E-5H illustrate exemplary components and user interfaces of a personal electronic device in accordance with some embodiments.
Figure 5E:
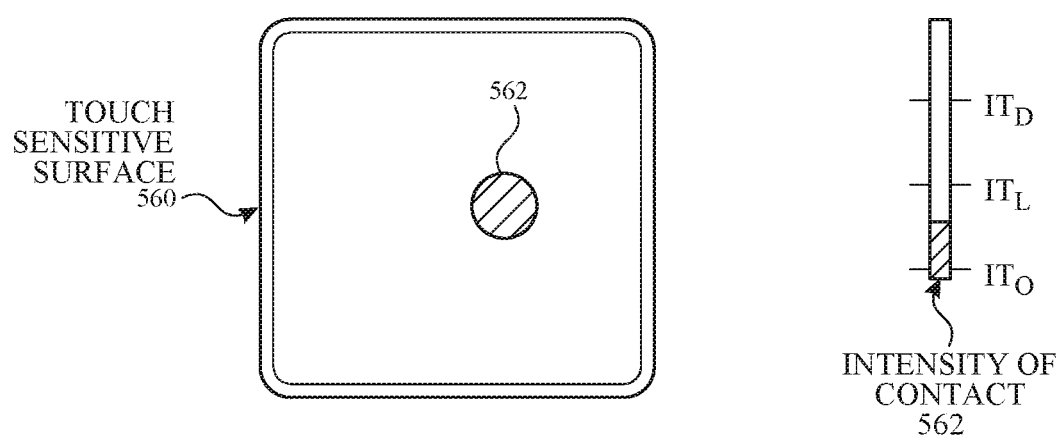
Figure 5F:
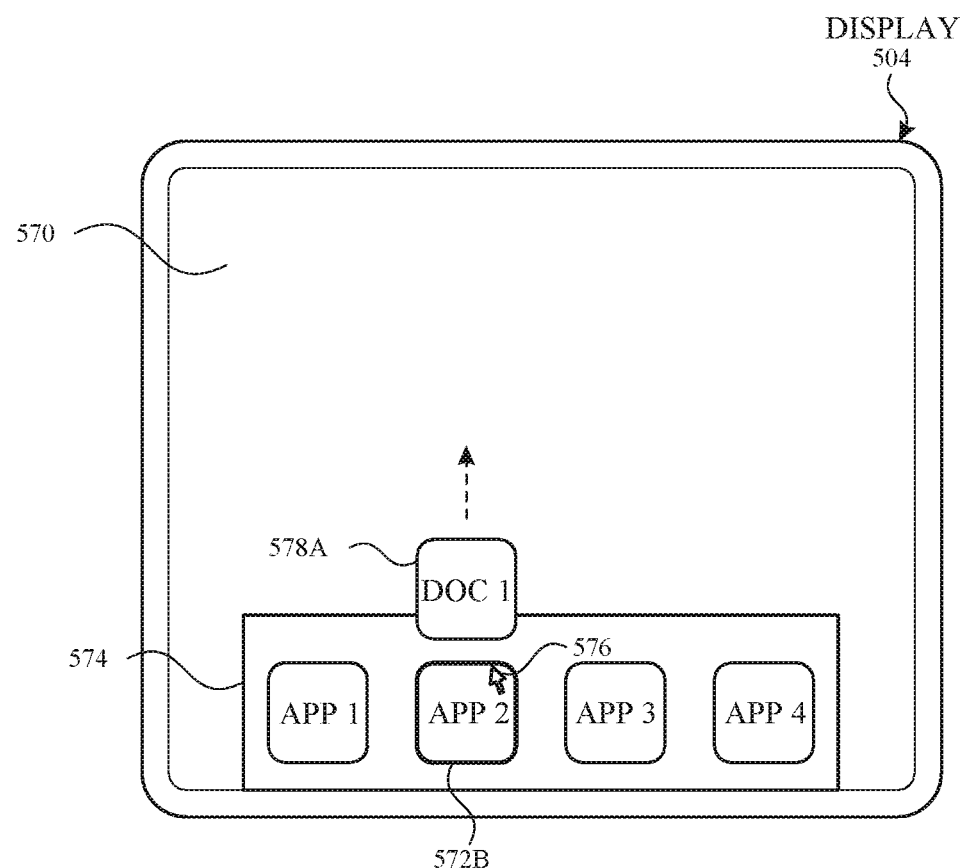
Figure 5F:
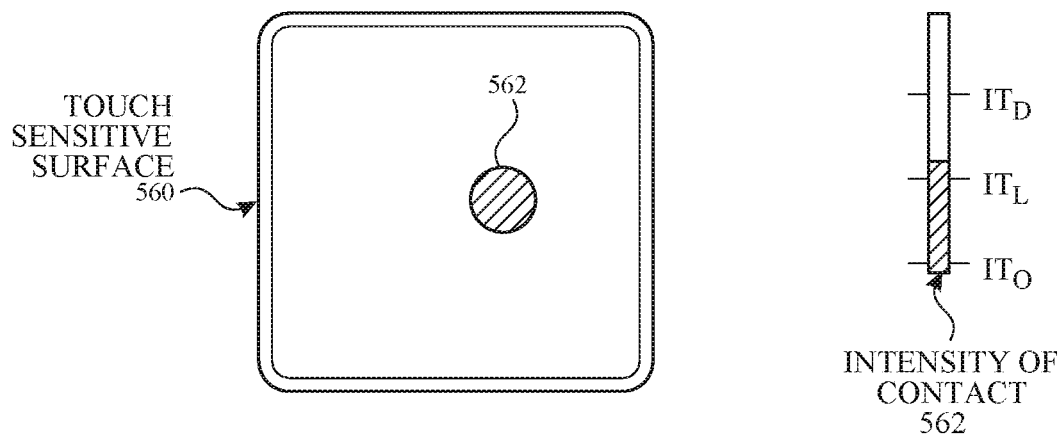
Figure 5G:
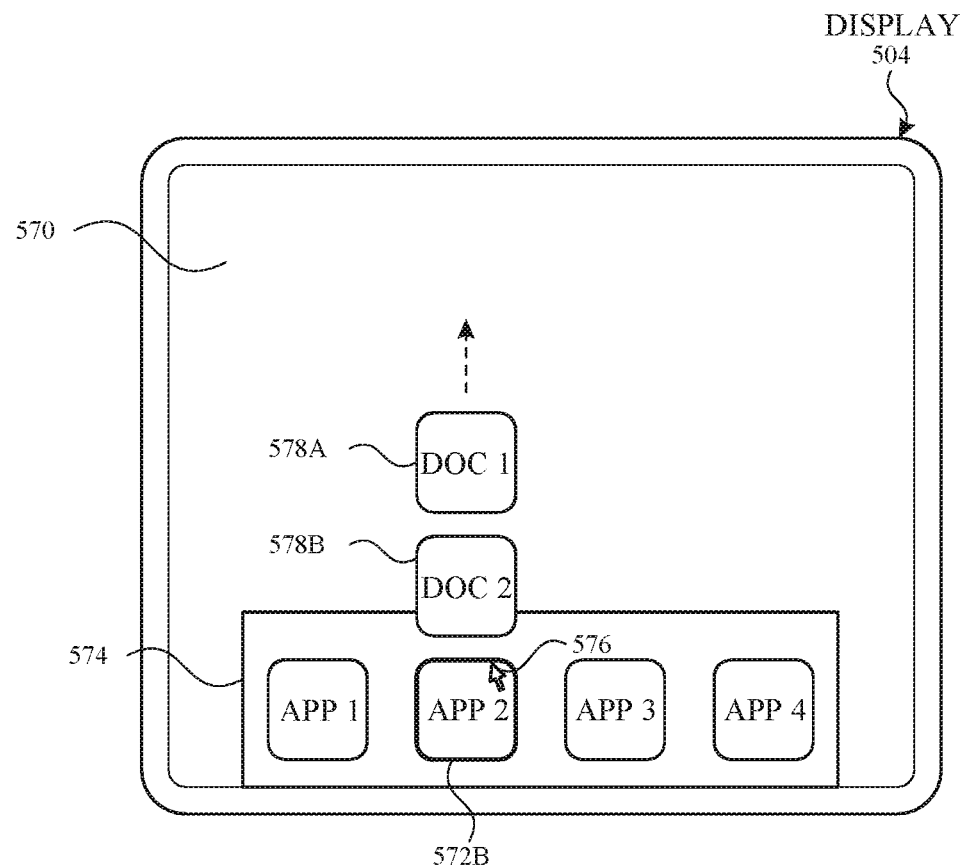
Figure 5G:
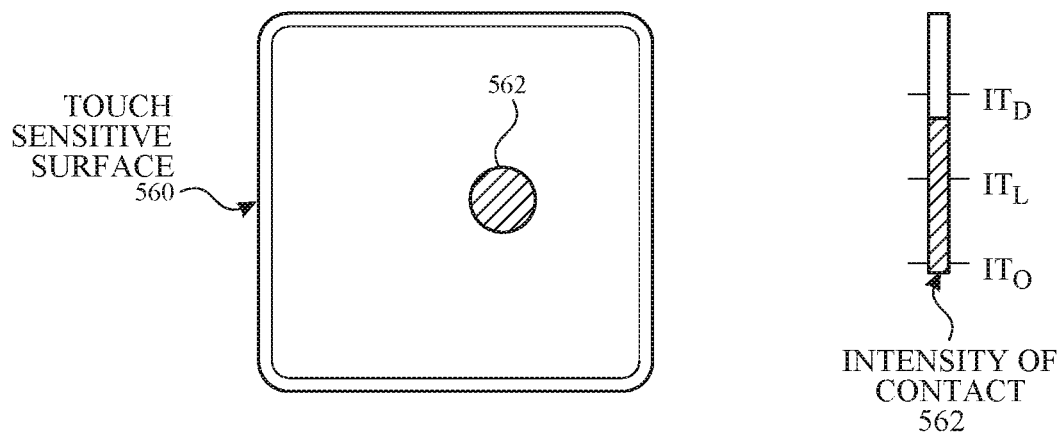
Figure 5H:
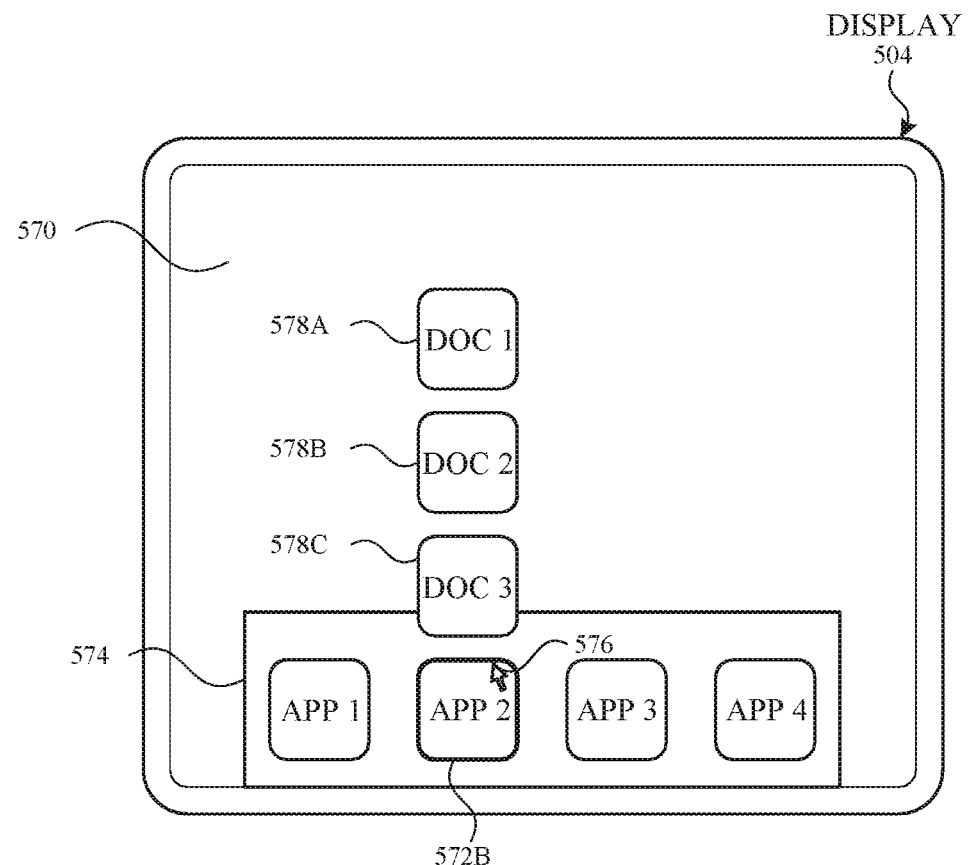
Figure 5H:
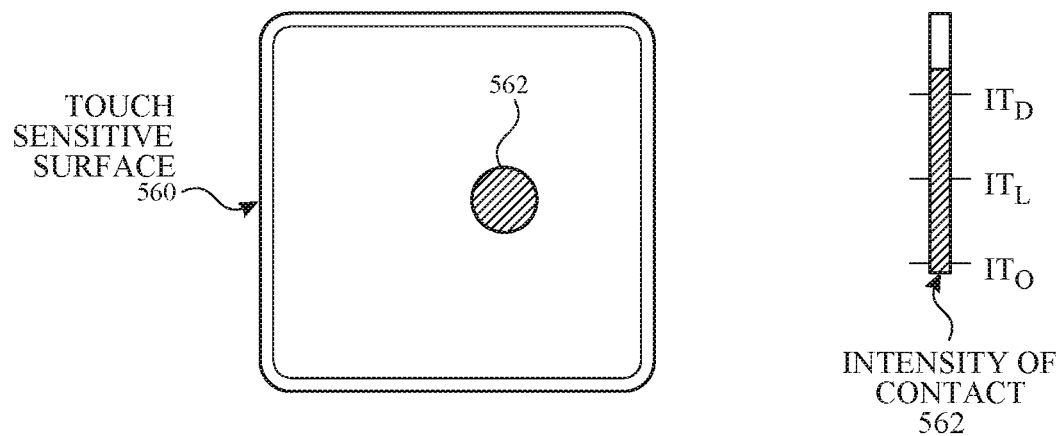

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5J. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

Figure 5I:
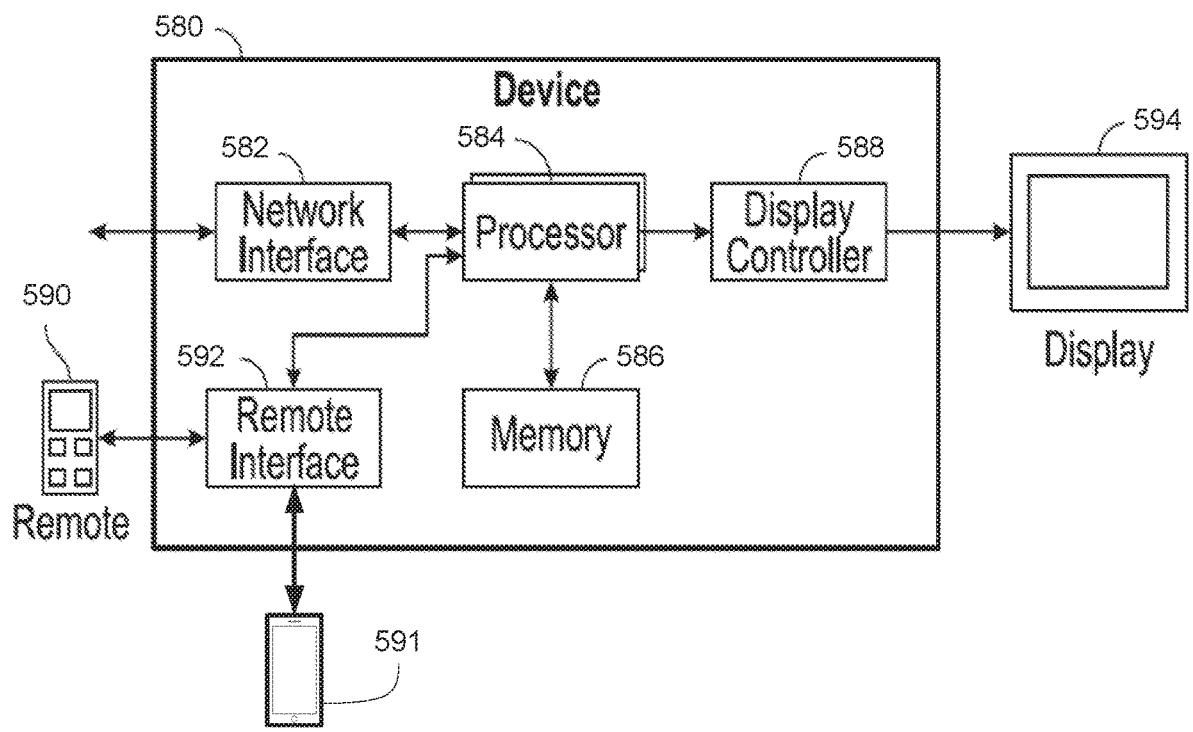
FIGS. 5I-5J illustrate block diagrams of exemplary architectures for devices according to some embodiments of the disclosure.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., method 700).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multifunction device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

Figure 5J:
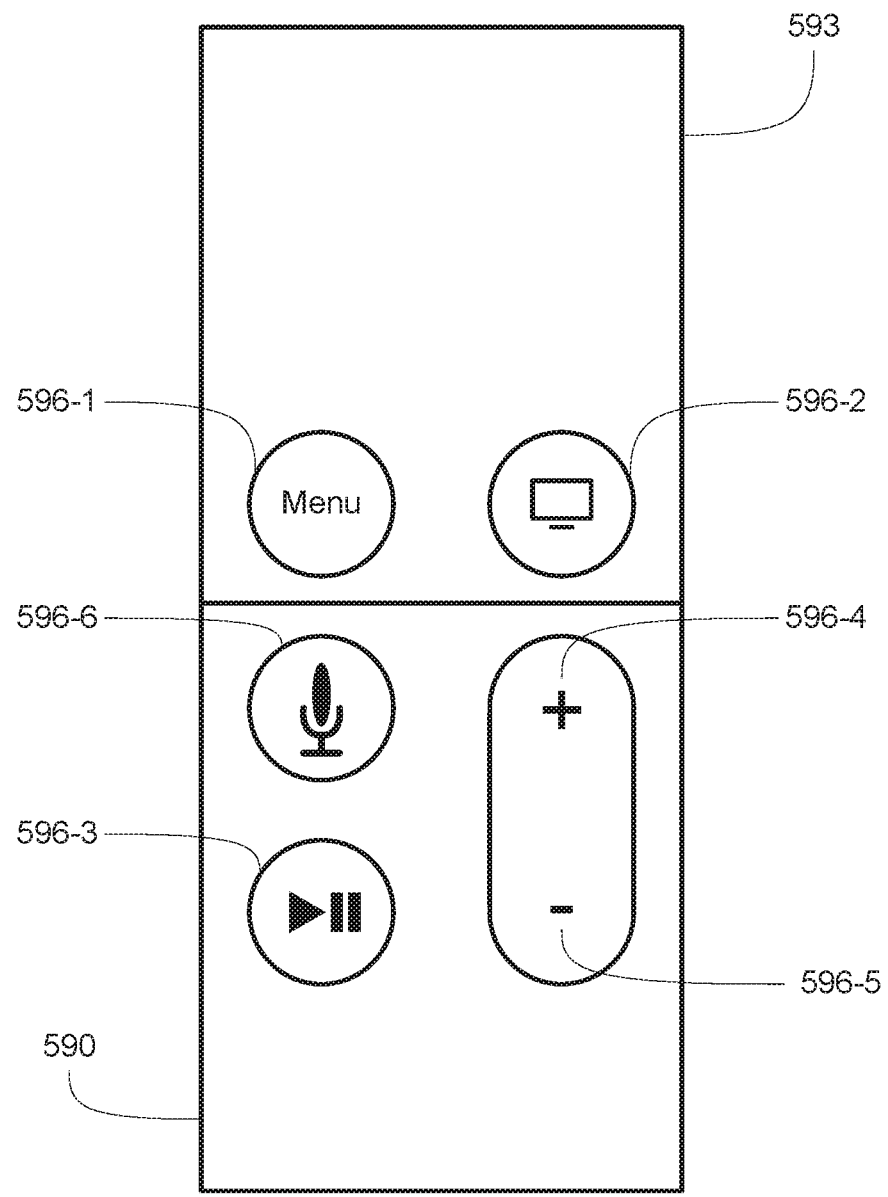

FIG. 5J illustrates an exemplary structure for remote 590 according to some embodiments of the disclosure. In some embodiments, remote 590 optionally corresponds to one or more of multifunction device 100 in FIGS. 1A and 2, device 300 in FIG. 3, and device 500 in FIG. 5A. Remote 590 optionally includes touch-sensitive surface 593, similar to touch-sensitive surface 451 in FIG. 4. In some embodiments, touch-sensitive surface 593 is edge-to-edge (e.g., it extends to the edges of remote 590, such that little or no surface of remote 590 exists between the touch-sensitive surface 593 and one or more edges of remote 590, as illustrated in FIG. 5J). Touch-sensitive surface 593 is optionally able to sense contacts as well as contact intensities (e.g., clicks of touch-sensitive surface 593), as previously described in this disclosure. Further, touch-sensitive surface 593 optionally includes a mechanical actuator for providing physical button click functionality (e.g., touch-sensitive surface 593 is "clickable" to provide corresponding input to device 580). Remote 590 also optionally includes buttons 594, 595, 596, 597, 598, and 599. Buttons 594, 595, 596, 597, 598, and 599 are optionally mechanical buttons or mechanical button alternatives that are able to sense contact with, or depression of, such buttons to initiate corresponding action(s) on, for example, device 580. In some embodiments, selection of "menu" button 594 by a user navigates device 580 backwards in a currently-executing application or currently-displayed user interface (e.g., back to a user interface that was displayed previous to the currently-displayed user interface), or navigates device 580 to a one-higher-level user interface than the currently-displayed user interface. In some embodiments, selection of "home" button 595 by a user navigates device 580 to a main, home, or root user interface from any user interface that is displayed on device 580 (e.g., to a home screen of device 580 that optionally includes one or more applications accessible on device 580). In some embodiments, selection of "play/pause" button 596 by a user toggles between playing and pausing a currently-playing content item on device 580 (e.g., if a content item is playing on device 580 when "play/pause" button 596 is selected, the content item is optionally paused, and if a content item is paused on device 580 when "play/pause" button 596 is selected, the content item is optionally played). In some embodiments, selection of "+" 597 or "−" 598 buttons by a user increases or decreases, respectively, the volume of audio reproduced by device 580 (e.g., the volume of a content item currently-playing on device 580). In some embodiments, selection of "audio input" button 599 by a user allows the user to provide audio input (e.g., voice input) to device 580, optionally, to a voice assistant on the device. In some embodiments, remote 590 includes a microphone via which the user provides audio input to device 580 upon selection of "audio input" button 599. In some embodiments, remote 590 includes one or more accelerometers for detecting information about the motion of the remote.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Users interact with electronic devices in many different manners, including using an electronic device to manage active subscriptions associated with a user account. In some embodiments, an electronic device is able to present subscription management user interfaces from which the user is able to make changes to a subscription associated with a user account. The embodiments described below provide ways in which an electronic device presents subscription management user interfaces in response to detecting deletion of an application that utilizes an active subscription. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6II illustrate exemplary ways in which an electronic device 500 presents subscription management user interfaces in response to detecting deletion of an application associated with one or more active subscriptions in accordance with some embodiments. The embodiments in these figures are used to illustrate the processes described below, including the processes described with reference to FIGS. 7A-7K.

Although various examples described herein are illustrated as being executed on one of a variety of types of electronic devices (e.g., smartphones, media players, set top boxes in communication with a display and a remote control), it should be understood that each type of electronic device and other types of electronic devices (e.g., computers, wearable devices, etc.) are able to perform functions corresponding to every example described herein. For example, a media player is able to perform functions illustrated as being performed by a set-top box; a set-top box is able to perform functions illustrated as being performed by a smartphone, and so on.

Figure 6B:
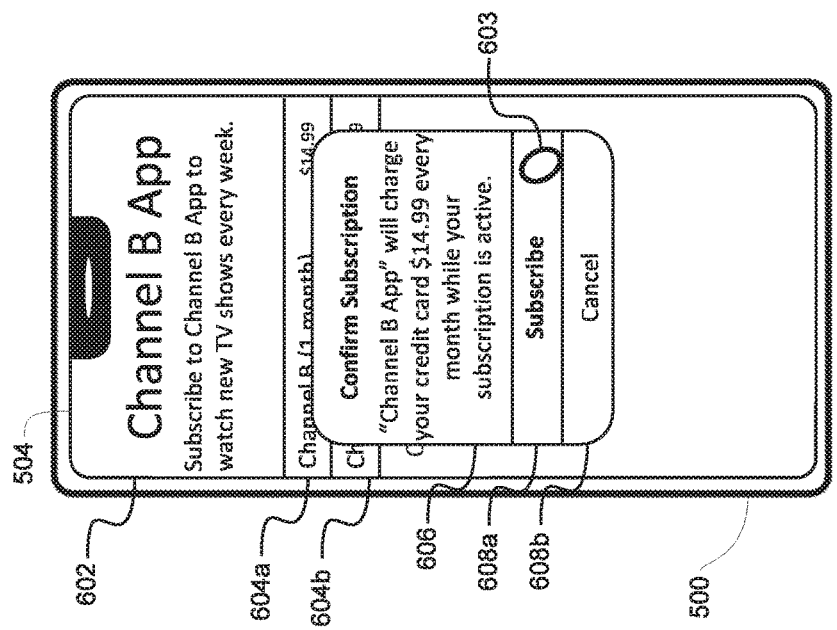
FIGS. 6A-6II illustrate exemplary ways in which an electronic device presents subscription management user interfaces in response to detecting deletion of an application associated with one or more active subscriptions in accordance with some embodiments.
Figure 6A:
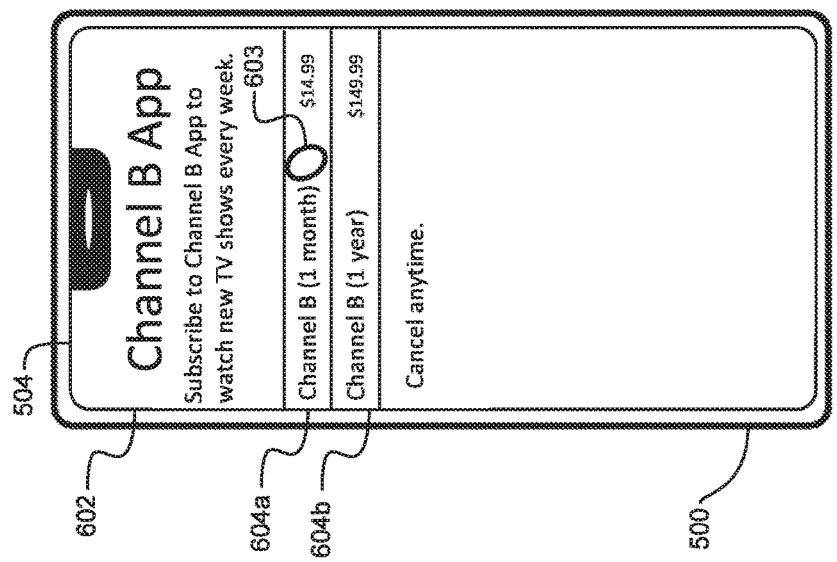
Figure 6D:
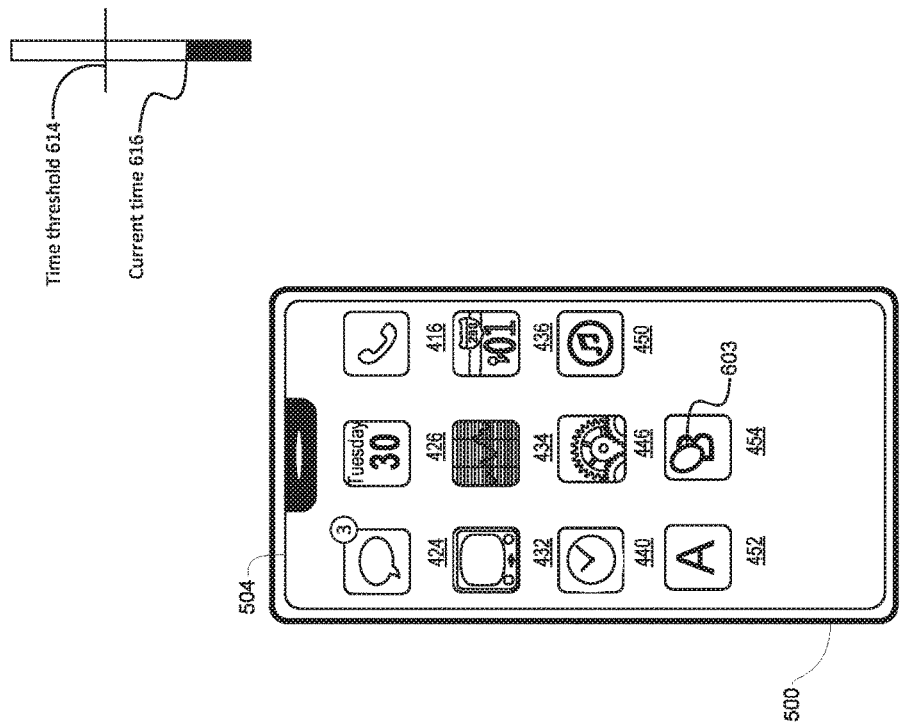
Figure 6C:
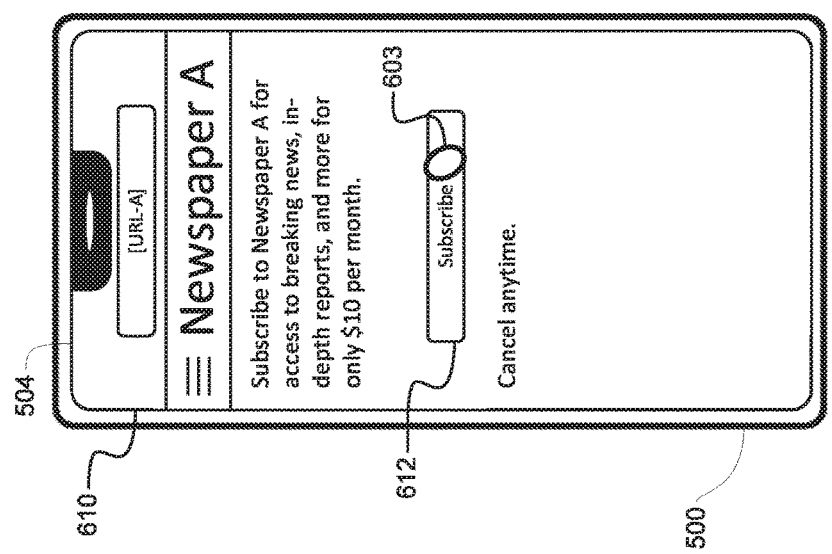

FIGS. 6A-6C illustrate ways the electronic device 500 presents user interfaces that enable the user to subscribe to services that present content using applications on the electronic device.

In FIG. 6A, the electronic device 500 displays a user interface 602 of an application that includes options 604a-b for subscribing to a service associated with the application. The subscription associated with the application is managed by an application store that manages downloading and updating applications on the electronic device 500. When the user subscribes to a subscription that is managed by the application store, the user is able to use payment information stored by the application store to pay for the subscription and is able to view information about the subscription within an application store user interface. As shown in FIG. 6A, the user selects (e.g., with contact 603) the option 604a to start a month-long subscription to the subscription service associated with the application (e.g., Channel B app).

As shown in FIG. 6B, in response to the user's selection in FIG. 6A, the electronic device 500 presents a notification 606 requesting confirmation of the subscription. The notification 606 includes a selectable option 608a that, when selected, causes the electronic device 500 to confirm the subscription and a selectable option 608b that, when selected, causes the electronic device 500 to cease displaying the notification 606 without confirming the subscription. As shown in FIG. 6B, the user selects (e.g., with contact 603) the option 608a to confirm the subscription. In response to the user's selection in FIG. 6B, the electronic device 500 transmits an indication to the subscription service to initiate the subscription.

In FIG. 6C, the electronic device 500 presents a web browser user interface 610 that presents a webpage for subscribing to another subscription service (e.g., Newspaper A). The subscription service is not managed by the application store of the electronic device, thus, the user is not able to make payments or edit the subscription via the application store. The web page includes a selectable option 612 that, when selected, causes the electronic device 500 to transmit an indication to the subscription service to initiate the process for subscribing to the service. As shown in FIG. 6C, the user selects (e.g., with contact 603) the option 612 to initiate the process to subscribe to the subscription service. In response to the user's selection, the electronic device 500 initiates the process to subscribe to the subscription service.

Thus, as shown in FIGS. 6A-6C, the electronic device 500 enables the user to subscribe to subscription services that provide access to content using applications running on the electronic device.

FIGS. 6D-6L illustrate ways the electronic device 500 presents an indication of an active subscription in response to detecting deletion of an application associated with the active subscription.

In FIG. 6D, the electronic device 500 presents a home screen user interface that includes a plurality of icons 424-454 that, when selected, cause the electronic device 500 to display a respective application. The home screen includes an icon 452 that is selectable to display an application associated with a newspaper the user subscribed to in FIG. 6C and an icon 454 that is selectable to display a content application the user subscribed to in FIGS. 6A-6B. As shown in FIG. 6B, the user selects (e.g., with contact 603) the icon 454 associated with the content application and holds the contact in place for an amount of time 616.

Figure 6F:
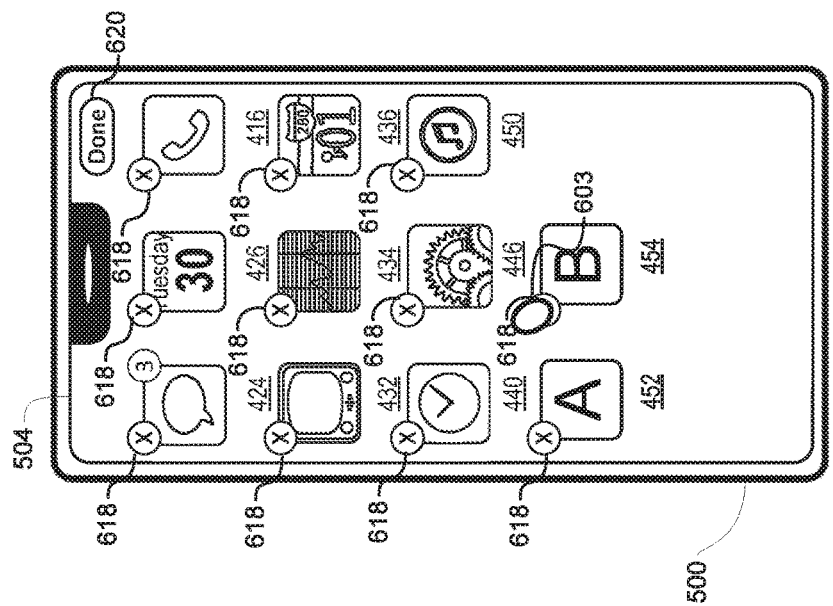
Figure 6E:
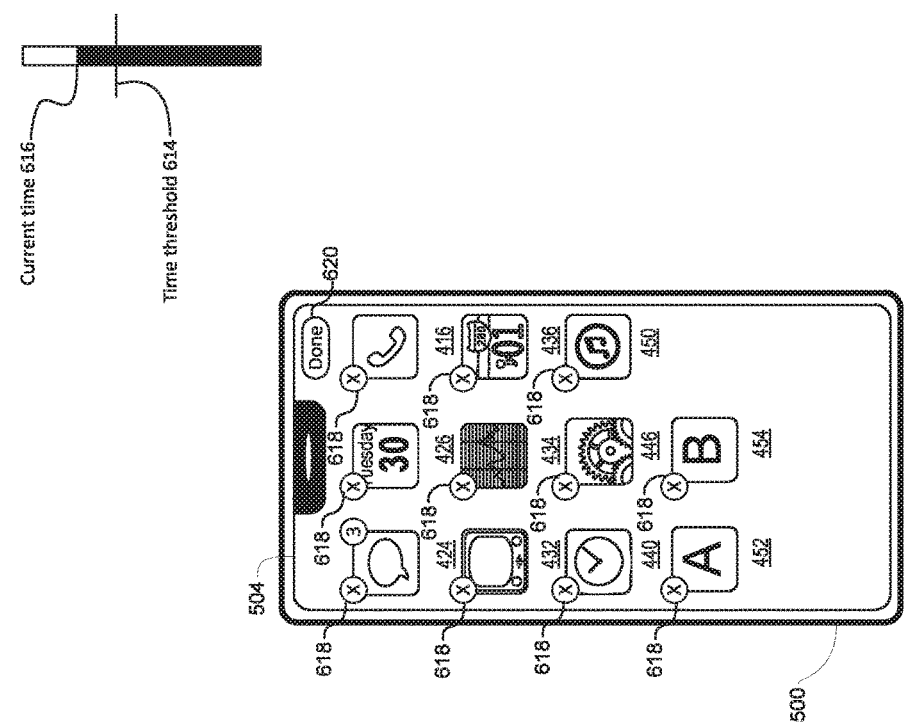

In FIG. 6E, the user lifts off the contact 603 illustrated in FIG. 6D at a time 616 that exceeds a threshold 614 amount of time (e.g., 1, 2, 5, etc. seconds). In response to detecting the contact 603 for an amount of time 616 that exceeds the threshold amount of time 614, the electronic device updates the home screen user interface to include selectable options 618 on each icon 424-454 that, when selected, cause the electronic device 500 to delete a respective application from the electronic device. The home screen user interface further includes a selectable option 620 that, when selected, causes the electronic device 500 to cease displaying the options 618 to delete the applications. In some embodiments, in response to detecting liftoff of the contact 603 after a time 616 exceeding the threshold 614, the electronic device 500 presents a menu including an option that, when selected, causes the electronic device 500 to present the user interface illustrated in FIG. 6E.

In FIG. 6F, the user selects (e.g., with contact 603) the option 618 overlaid on icon 454 to delete the content application, App B. In FIG. 6G, the electronic device presents a notification 622a confirming deletion of the application in response to the user's selection in FIG. 6F. The notification 622a indicates the application that is being deleted and includes a selectable option 624a that, when selected, causes the electronic device 500 to dismiss the notification 622a without deleting the application and a selectable option 624b that, when selected, causes the electronic device 500 to delete the application. As shown in FIG. 6G, the user selects (e.g., with contact 603) the option 624b to delete the application.

Figure 6H:
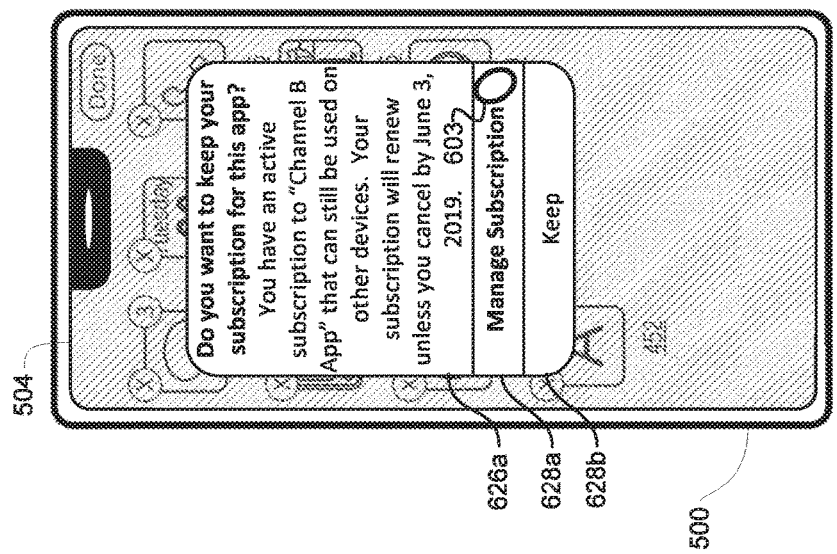
Figure 6G:
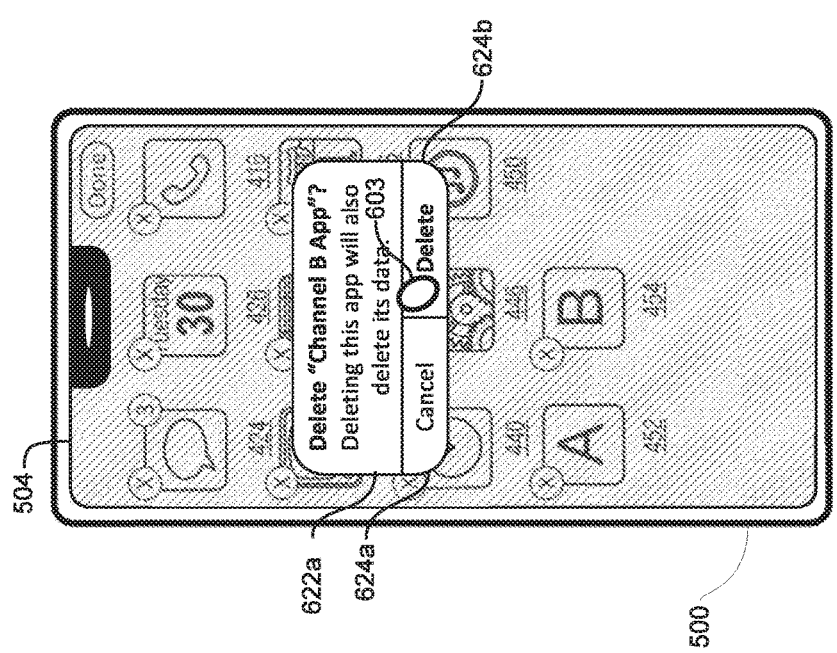

In response to the user's selection in FIG. 6G, the electronic device 500 deletes the application and displays a notification 626a of an active subscription associated with the deleted application, as shown in FIG. 6H. The notification 626a indicates that the subscription associated with the application that was deleted by the user is accessible on other electronic devices and indicates when the subscription is scheduled to renew. The notification 626a includes a selectable option 628a that, when selected, causes the electronic device 500 to present a subscription management user interface from which the user is able to manage the subscription and a selectable option 628b that, when selected, causes the electronic device 500 to dismiss the notification 626a without displaying the subscription management user interface and without modifying the subscription. Thus, if the user were to select the selectable option 628b, the subscription would continue to renew and continue to be accessible to other electronic devices. As shown in FIG. 6H, the user selects (e.g., with contact 603) the option 628a to cause the electronic device 500 to present the subscription management user interface illustrated in FIG. 6I.

Figures 6I, 6J:
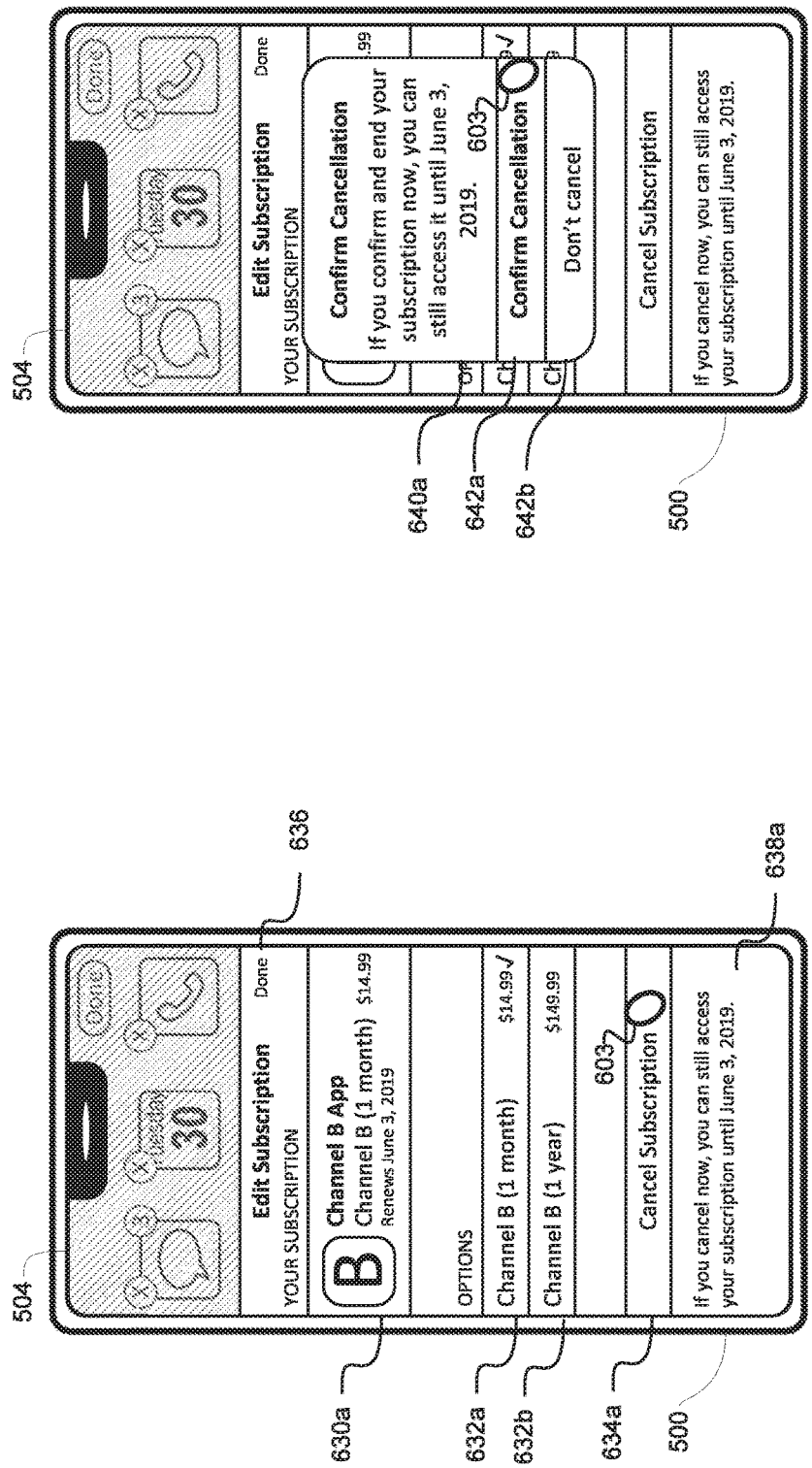

FIG. 6I illustrates the subscription management user interface that is displayed overlaid on the home screen user interface. The subscription management user interface includes a plurality of options for managing the subscription associated with the application the user deleted, such as an option 632b to change the time period of the subscription and an option 634a to cancel the subscription. The subscription management user interface further includes an indication 630a of the details of the current subscription, an indication 638a of the last date to access the subscription after the subscription is canceled, and an option 636 to dismiss the subscription management user interface.

The information 630a about the current subscription associated with the deleted application includes the name of the subscription and/or application it is associated with, the renewal price of the subscription, the length of the current subscription, and the renewal date of the subscription. The information 638a about the last date to access the subscription indicates the date the subscription will end if the user cancels the subscription on the current day.

As shown in FIG. 6I, the user selects (e.g., with contact 603) the option 634a to cancel the subscription. In response to the user's selection, the electronic device 500 displays a notification 640a to confirm cancelation of the subscription, as shown in FIG. 6J. As shown in FIG. 6J, the notification 640a indicates the date that access to the subscription will end if the user cancels the subscription, a selectable option 642a that, when selected, causes the electronic device 500 to initiate the process to cancel the subscription, and a selectable option 642b to dismiss the notification 640a without canceling the subscription. The user selects (e.g., with contact 603) the option 642a to confirm the cancelation of the subscription. In response to the user's selection, the electronic device 500 cancels the subscription. The user may still be able to access the subscription until the renewal date, upon which the subscription will not renew and access will cease.

Figure 6L:
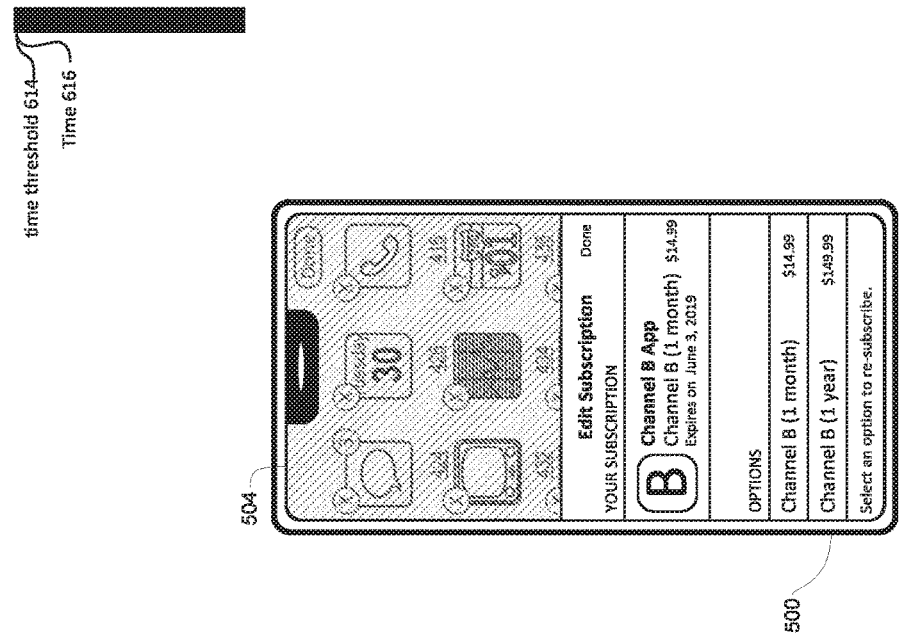
Figure 6K:
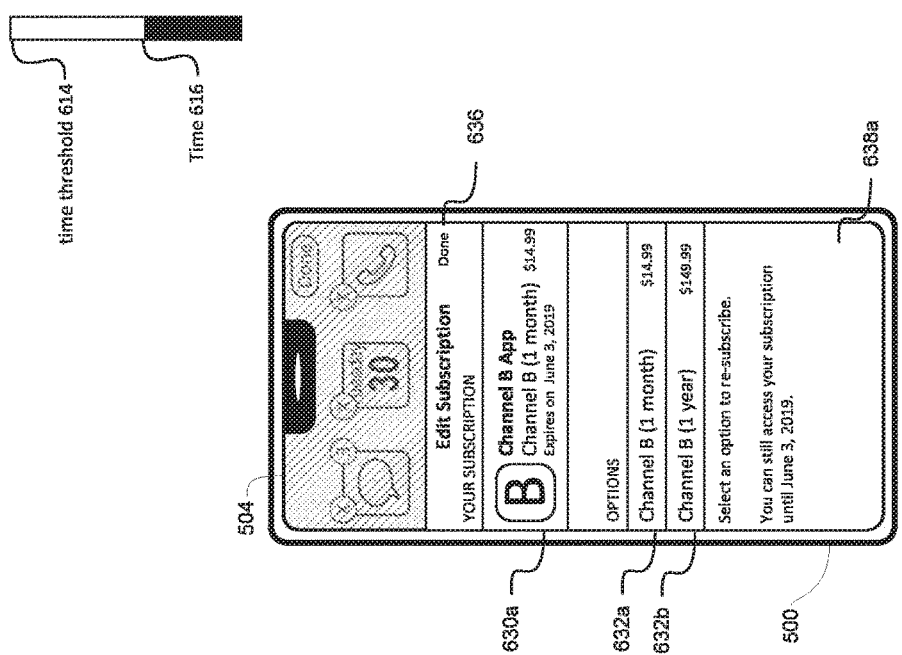

As shown in FIG. 6K, in response to the user's selection in FIG. 6J, the electronic device 500 updates the subscription management user interface to indicate that the subscription has been canceled. Namely, indication 630a is updated to state the date the subscription will expire (instead of a date the subscription will renew) and information 638a indicates that the user is able to re-subscribe to the subscription and indicates the date access to the subscription will cease. The subscription management user interface is displayed for a time 616 until a time threshold 614 (e.g., 3, 5, 10, etc. seconds) has been reached. As shown in FIG. 6L, when the subscription management user interface has been displayed for an amount of time 616 that equals the time threshold 614, the electronic device 500 dismisses the subscription management user interface by displaying an animation of the subscription management user interface sliding down from the display (e.g., as shown in FIGS. 6L-6M).

Thus, as shown in FIGS. 6D-6L, the electronic device 500 presents an indication of an active subscription in response to detecting deletion of an application associated with the active subscription, which allows a user to easily change the details of the subscription in response to deleting the application associated with the subscription.

FIGS. 6M-6Q illustrate ways the electronic device 500 deletes an application with a subscription not managed by the application store without presenting a subscription management user interface.

Figure 6N:
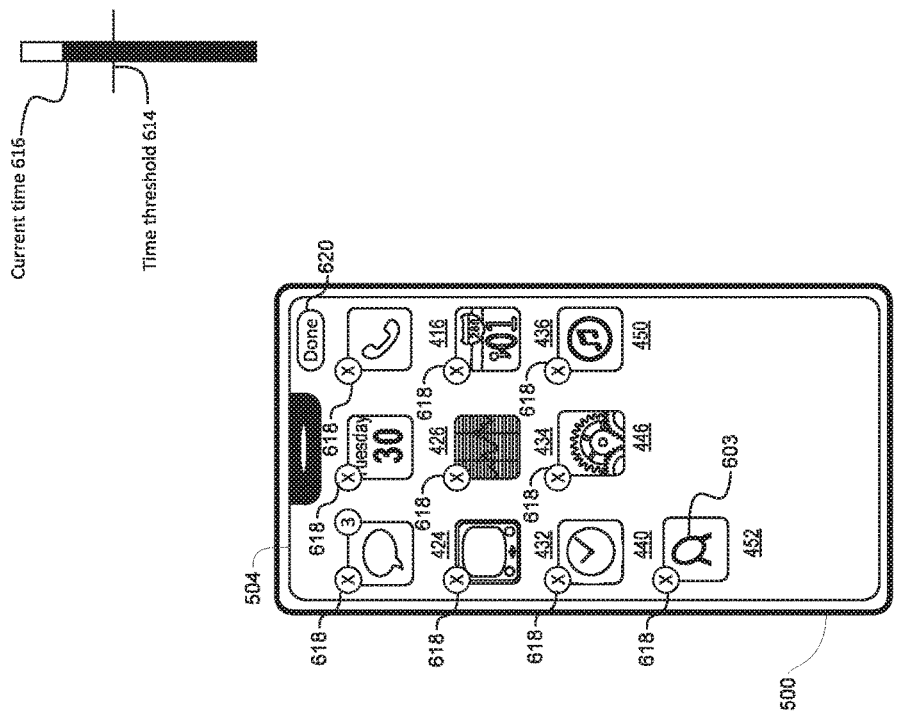
Figure 6M:
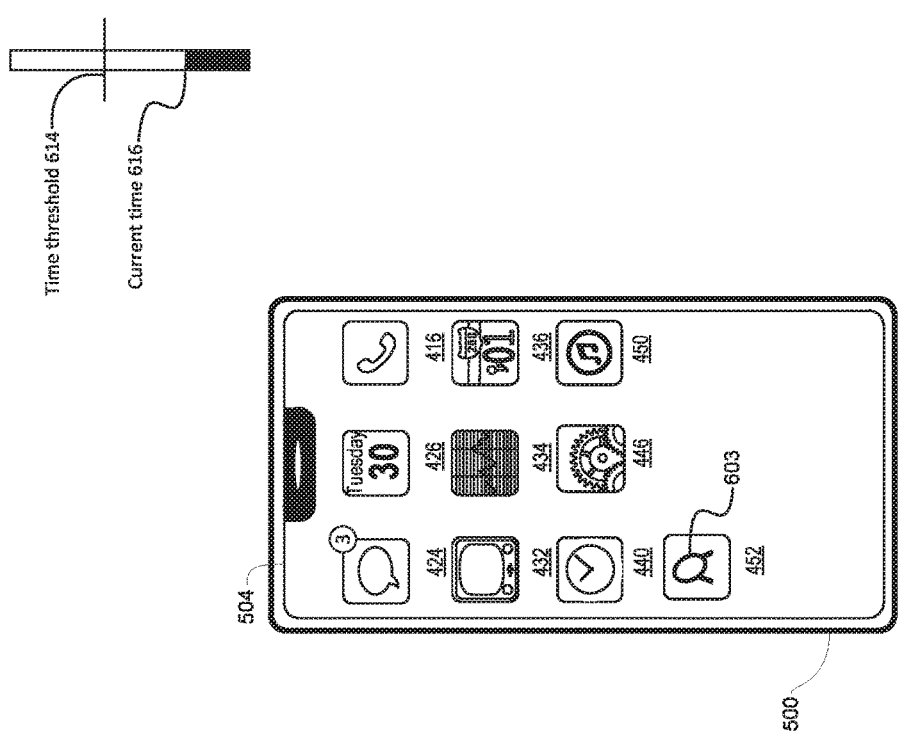

FIG. 6M illustrates the home screen user interface. The user selects (e.g., with contact 603) and holds the contact 603 in place over the icon 452 associated with the newspaper application that is associated with a subscription not managed by the application store. The user subscribed to the newspaper in FIG. 6C through a website associated with the newspaper.

In FIG. 6N, in response to detecting the contact 603 over the icon 452 for an amount of time 626 that exceeds the threshold amount of time 614 (e.g., 1, 3, 5 etc. seconds), the electronic device 500 displays the selectable options 618 for deleting applications from the electronic device 500. In FIG. 6O, the user selects (e.g., with contact 603) the option 618 overlaid on icon 452 to delete the newspaper application. In some embodiments, in response to detecting liftoff of the contact 603 after a time 616 exceeding the threshold 614, the electronic device 500 presents a menu including an option that, when selected, causes the electronic device 500 to present the user interface illustrated in FIG. 6N.

Figure 6P:
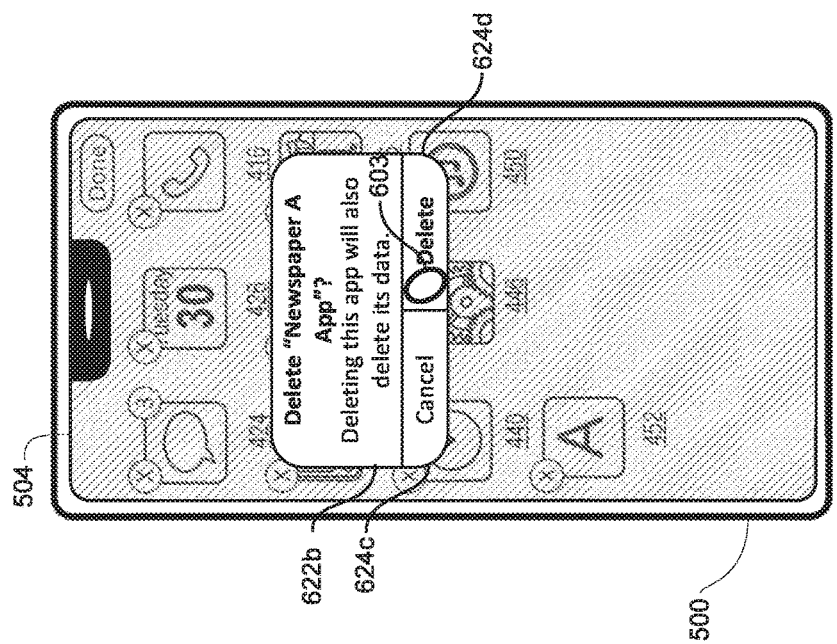
Figure 6O:
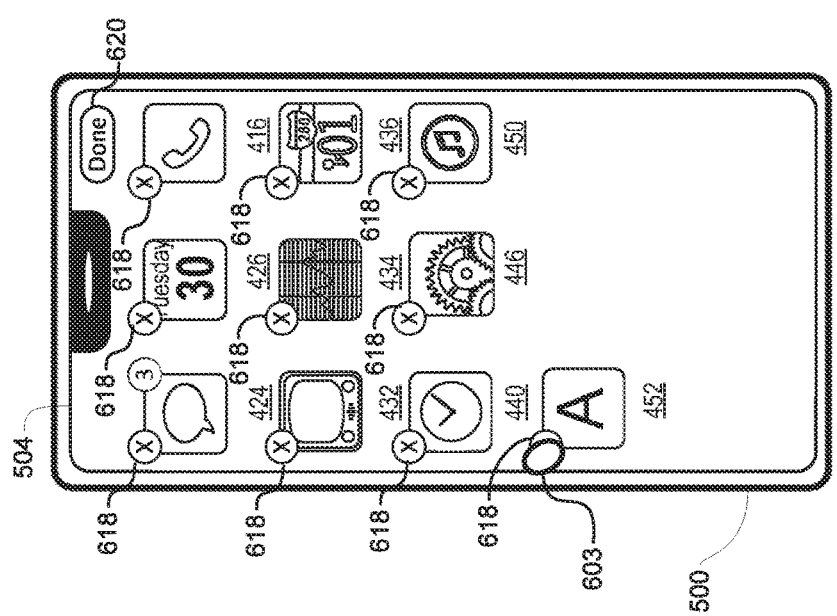

In response to the user's selection in FIG. 6O, the electronic device 500 displays a notification 622b to confirm deletion of the application, as shown in FIG. 6P. The notification includes a selectable option 624c that, when selected, causes the electronic device 500 to dismiss the notification 622b without deleting the application and a selectable option 624d that, when selected, causes the electronic device 500 to delete the application. As shown in FIG. 6P, the user selects (e.g., with contact 603) the option 642d to delete the application.

Figure 6R:
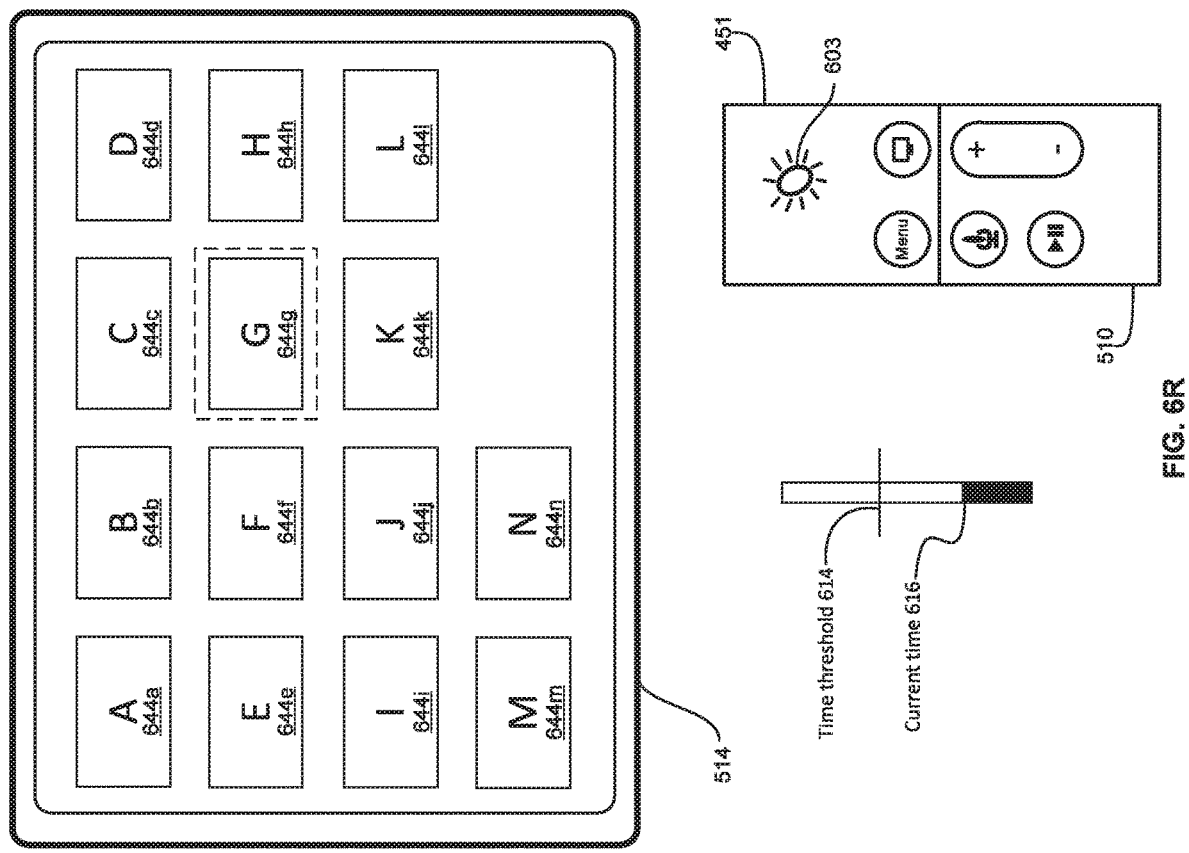
Figure 6Q:
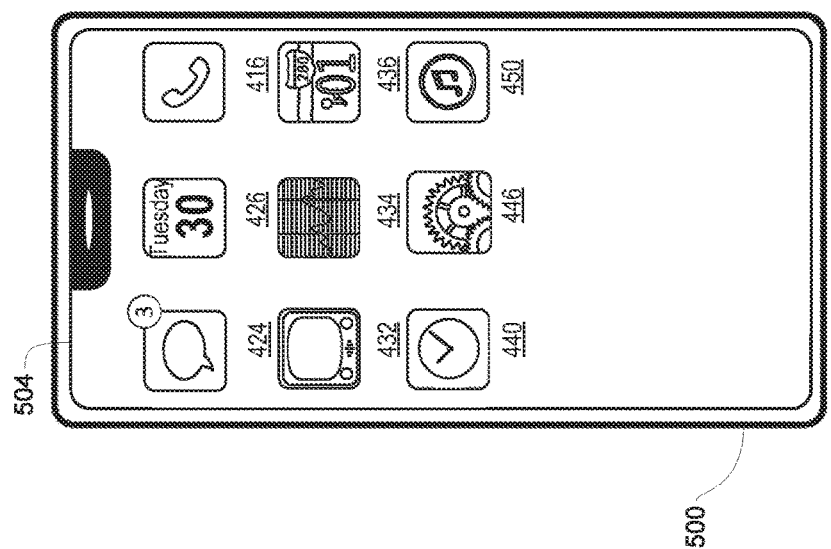

In FIG. 6Q, in response to the user's selection in FIG. 6P, the electronic device 500 ceases displaying the notification 622b and displays the home screen user interface without displaying the icon 452 associated with the application that was deleted by the user. Because the subscription associated with the newspaper application is not managed by the application store, the electronic device 500 did not present a notification of the active subscription or the subscription management user interface. Thus, the subscription to the newspaper will persist until it expires or the user otherwise changes it from another user interface (e.g., the website through which the subscription was initially obtained).

Thus, as shown in FIGS. 6M-6Q, the electronic device 500 forgoes presenting the subscription management user interface when the user deletes an application associated with a subscription not managed by the application store.

FIGS. 6R-6AA illustrate ways an electronic device 500 presents a notification of multiple subscriptions associated with an application and a subscription management user interface in response to detecting deletion of the application.

Figure 6T:
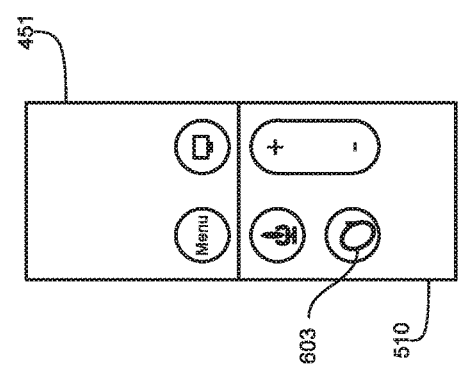
Figure 6T:
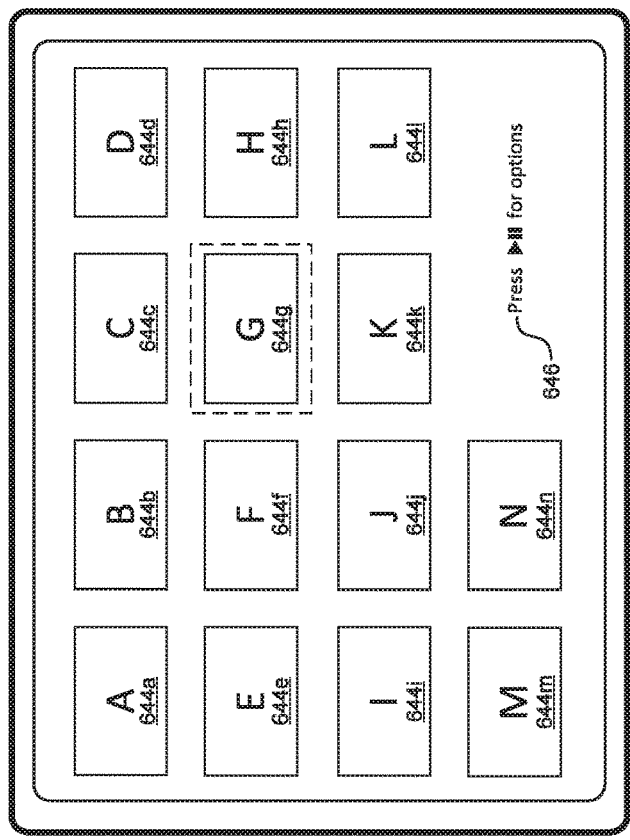
Figure 6S:
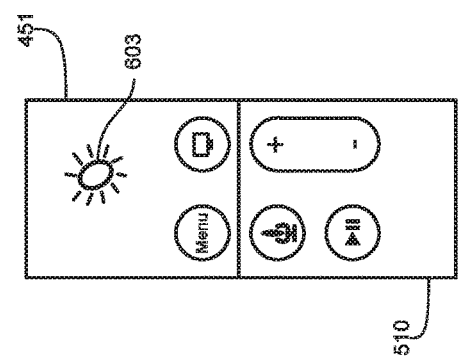
Figure 6S:
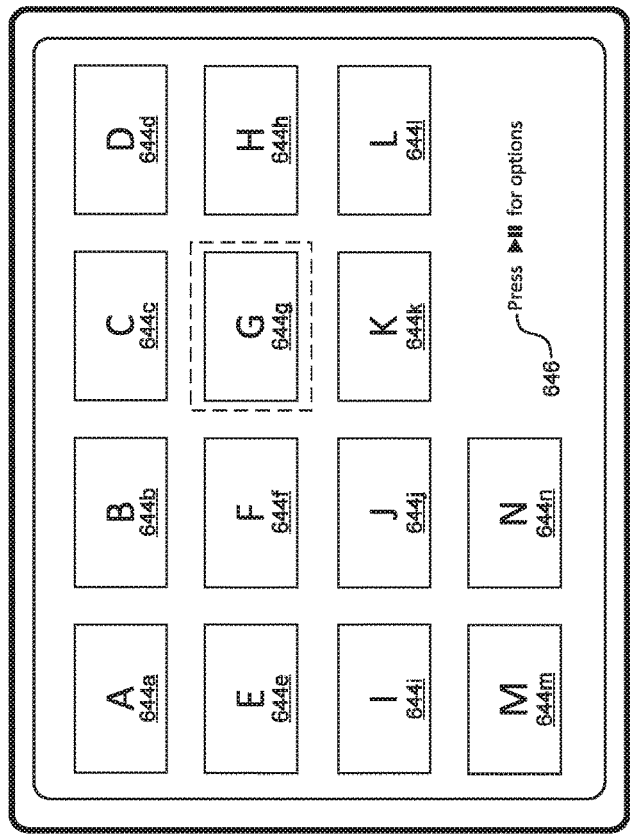

FIG. 6R illustrates a home screen user interface. The home screen user interface includes a plurality of icons 644 representing various applications on the electronic device 500, and are selectable to display the respective selected application. While one of the icons 644g has the current focus, the user selects (e.g., with contact 603) the icon 644g and holds the contact 603 in place for a period of time 616. In FIG. 6S, in response to detecting that the user has held the contact 603 for an amount of time 616 that exceeds a threshold amount of time 614 (e.g., 1, 3, 5 etc. seconds), the electronic device 500 presents an indication 646 of an input the user is able to enter to view a plurality of options related to the icon 644g that has the current focus. In FIG. 6T, the user selects the play/pause button of the remote control device 590 to view the options associated with the icon 644g with the current focus.

Figure 6V:
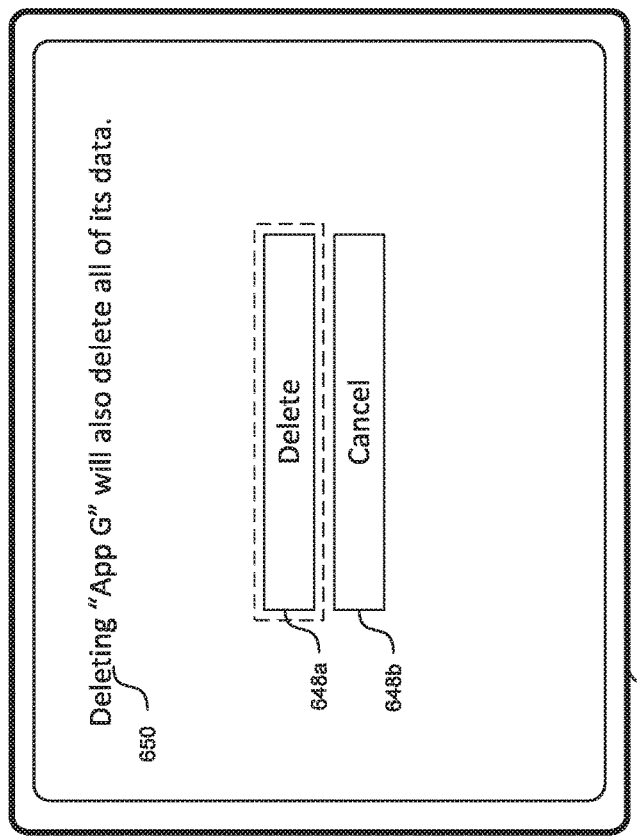
Figure 6V:
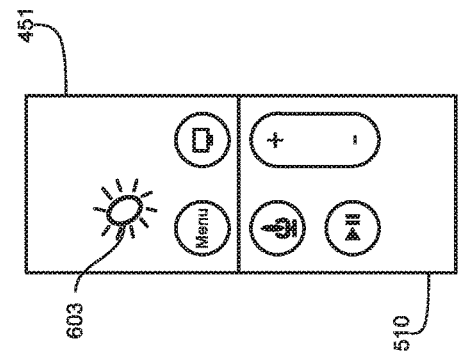
Figure 6U:
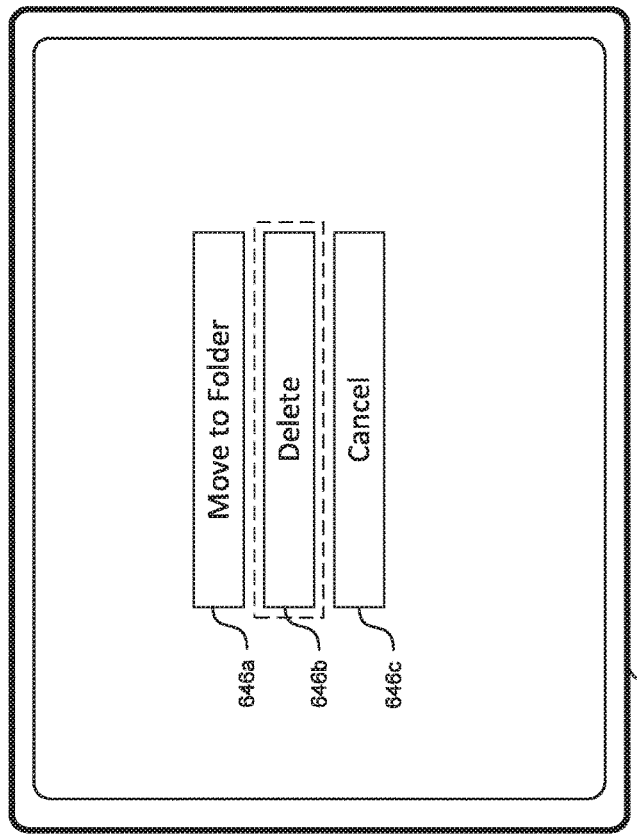
Figure 6U:
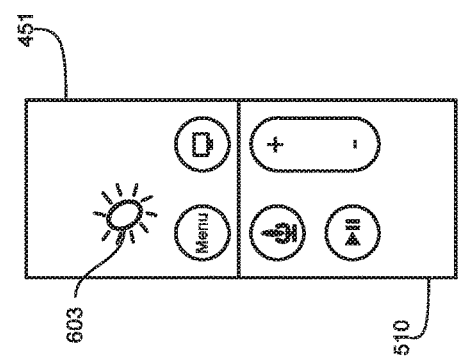

In FIG. 6U, in response to the user's selection in FIG. 6T, the electronic device 500 presents a plurality of selectable options 646a-c related to the selected icon. In response to detecting selection of the option 646a, the electronic device 500 initiates a process to move the icon to a respective folder of icons corresponding to applications on the electronic device 500. In response to detecting selection of the option 646b, the electronic device 500 initiates a process to delete the application associated with the icon. In response to detecting selection of the option 646c, the electronic device 500 ceases displaying the options 646a-c without taking further action. As shown in FIG. 6U, the user selects (e.g., with contact 603) the option 646b to delete the application associated with the icon.

In FIG. 6V, in response to the user's selection in FIG. 6U, the electronic device 500 displays an indication 650 confirming deletion of the application from the electronic device, a selectable option 648a that, when selected, causes the electronic device 500 to delete the application, and a selectable option 648b that, when selected, causes the electronic device 500 to cancel the process to delete the application and return to the home screen user interface. As shown in FIG. 6V, the user selects (e.g., with contact 603) the option 648a to delete the application. In response to the user's selection in FIG. 6V, the electronic device 500 deletes the application and presents the user interface illustrated in FIG. 6W.

Figure 6X:
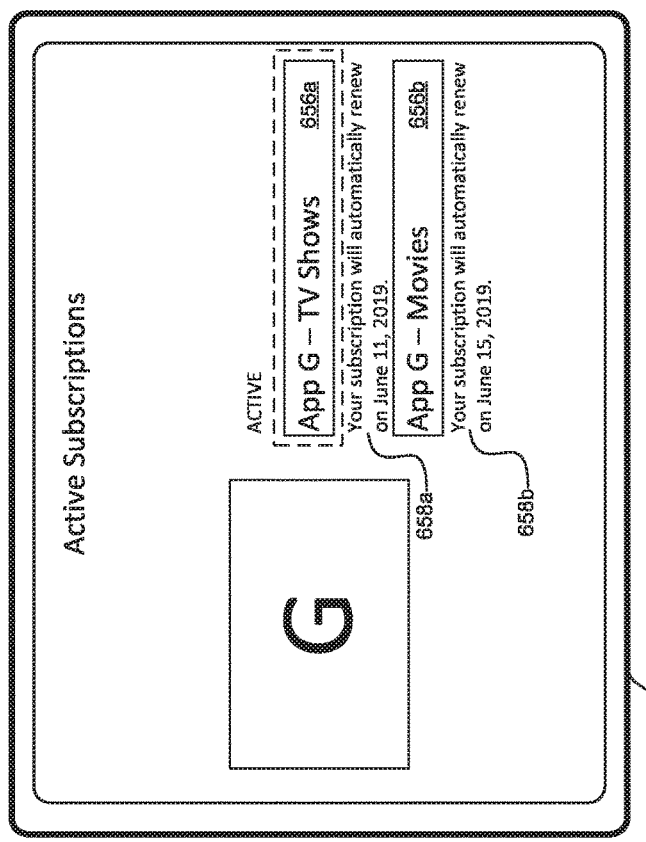
Figure 6X:
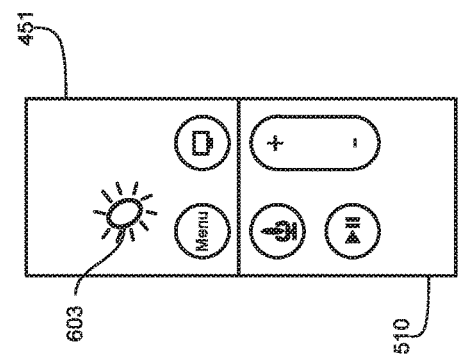
Figure 6W:
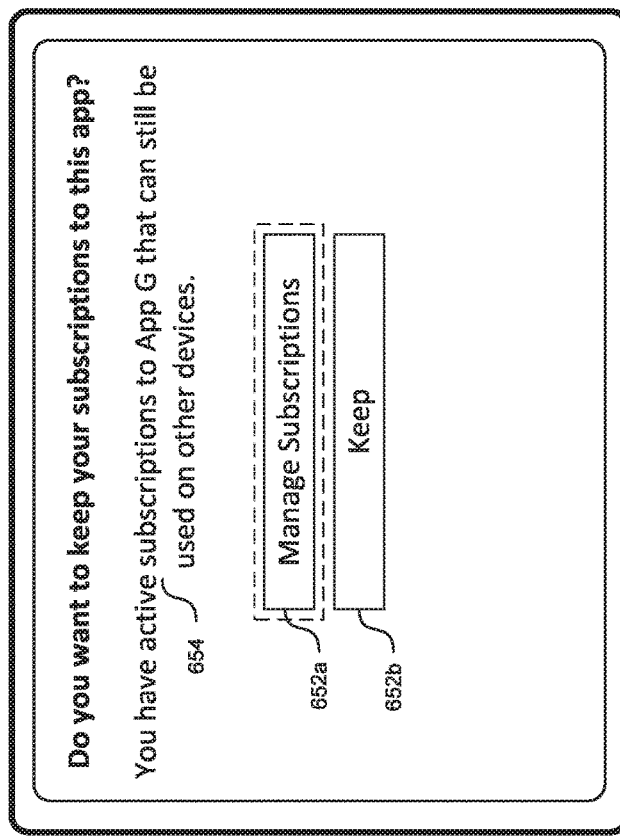
Figure 6W:
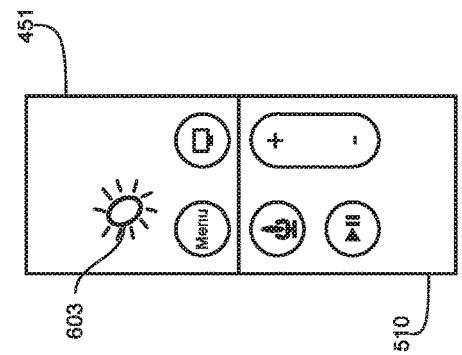

As shown in FIG. 6W, in response to detecting deletion of the application associated with active subscriptions managed by the application store, the electronic device 500 presents an indication 654 of the active subscriptions. The user interface also includes a selectable option 652a that, when selected, causes the electronic device 500 to present a subscription management user interface that includes options for managing the subscriptions associated with the deleted application and a selectable option 652b that, when selected, causes the electronic device 500 to dismiss the user interface shown in FIG. 6W without presenting the subscription management user interface. As shown in FIG. 6W, the user selects (e.g., with contact 603) the option 652a to present the subscription management user interface illustrated in FIG. 6X.

FIG. 6X illustrates the subscription management user interface that is displayed in response to the user's selection in FIG. 6W. The subscription management user interface includes indications 656a and 656b of active subscriptions associated with the application the user just deleted. Each indication 656a and 656b includes the name of the subscription and is presented with an indication 658a or 658b of the renewal date of the respective subscription. The indications 656a and 656b are selectable to display options associated with the respective subscription, including options to edit or cancel each subscription. As shown in FIG. 6X, the user selects (e.g., with contact 603) the indication 656a of one of the subscriptions.

Figure 6Z:
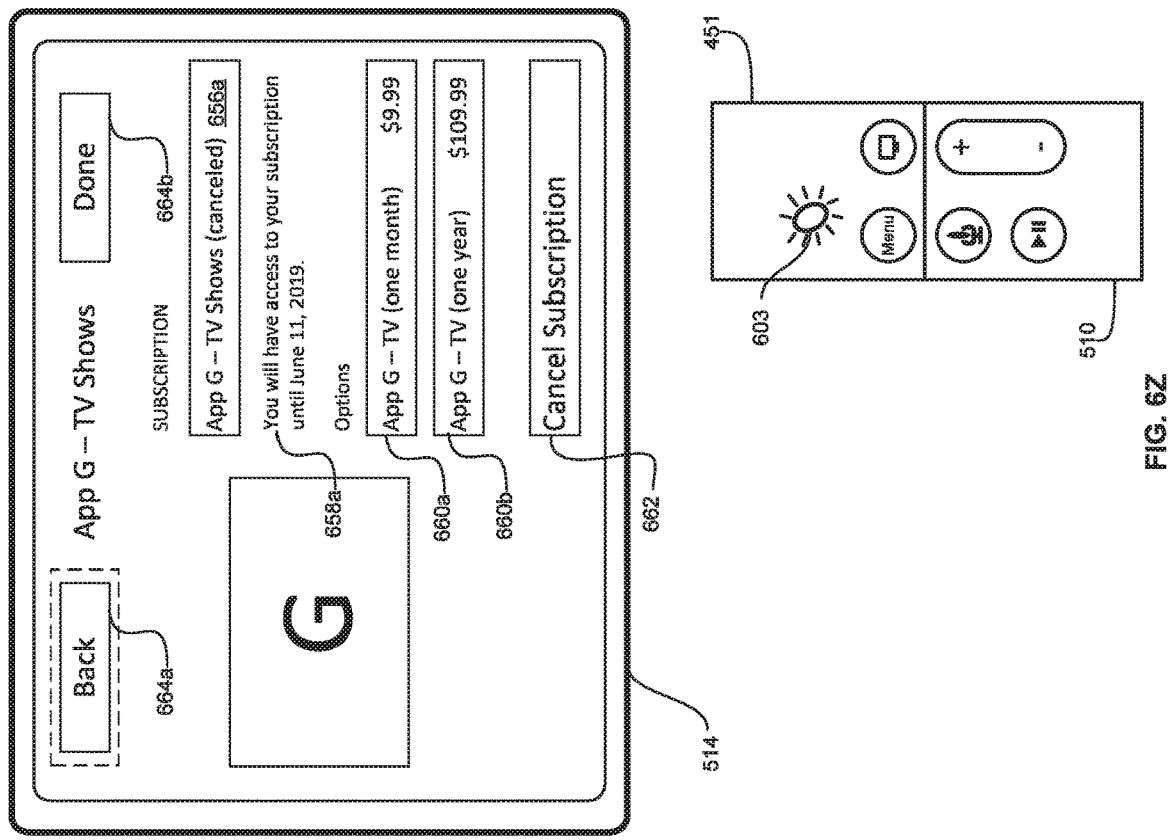
Figure 6Y:
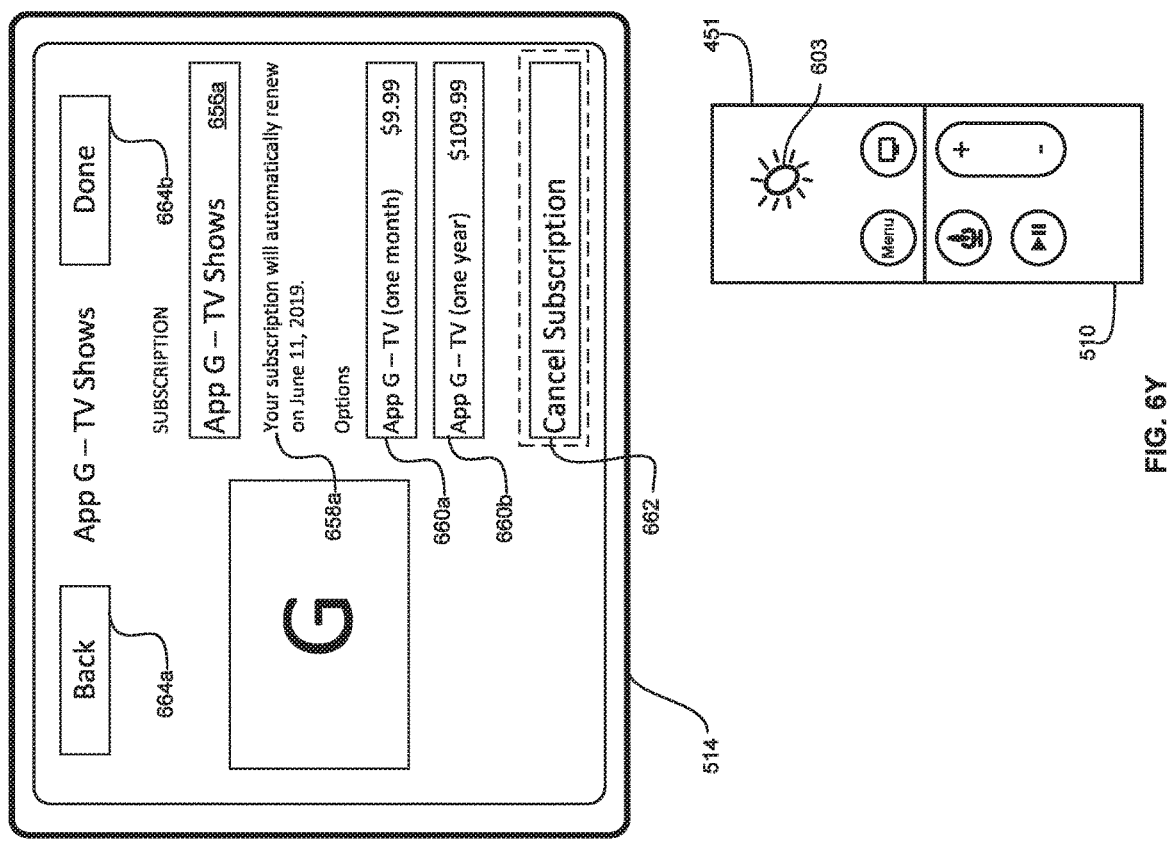
Figure 6B:
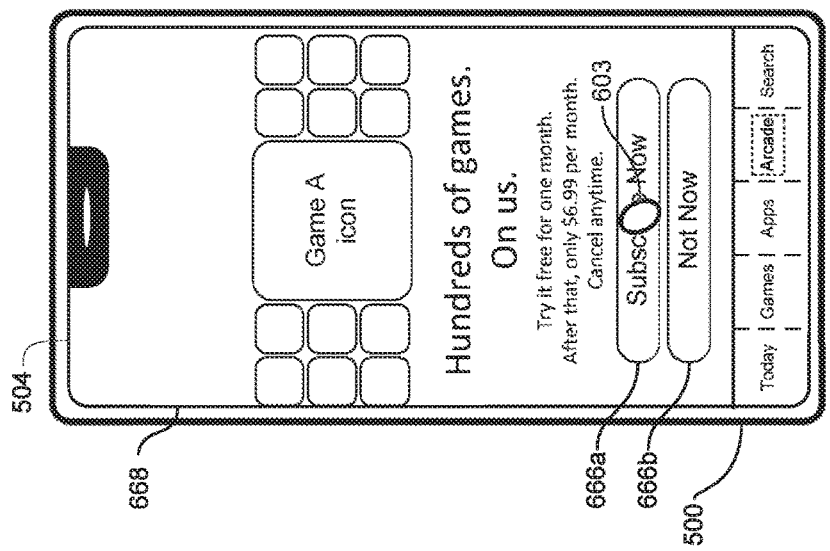
Figure 6A:
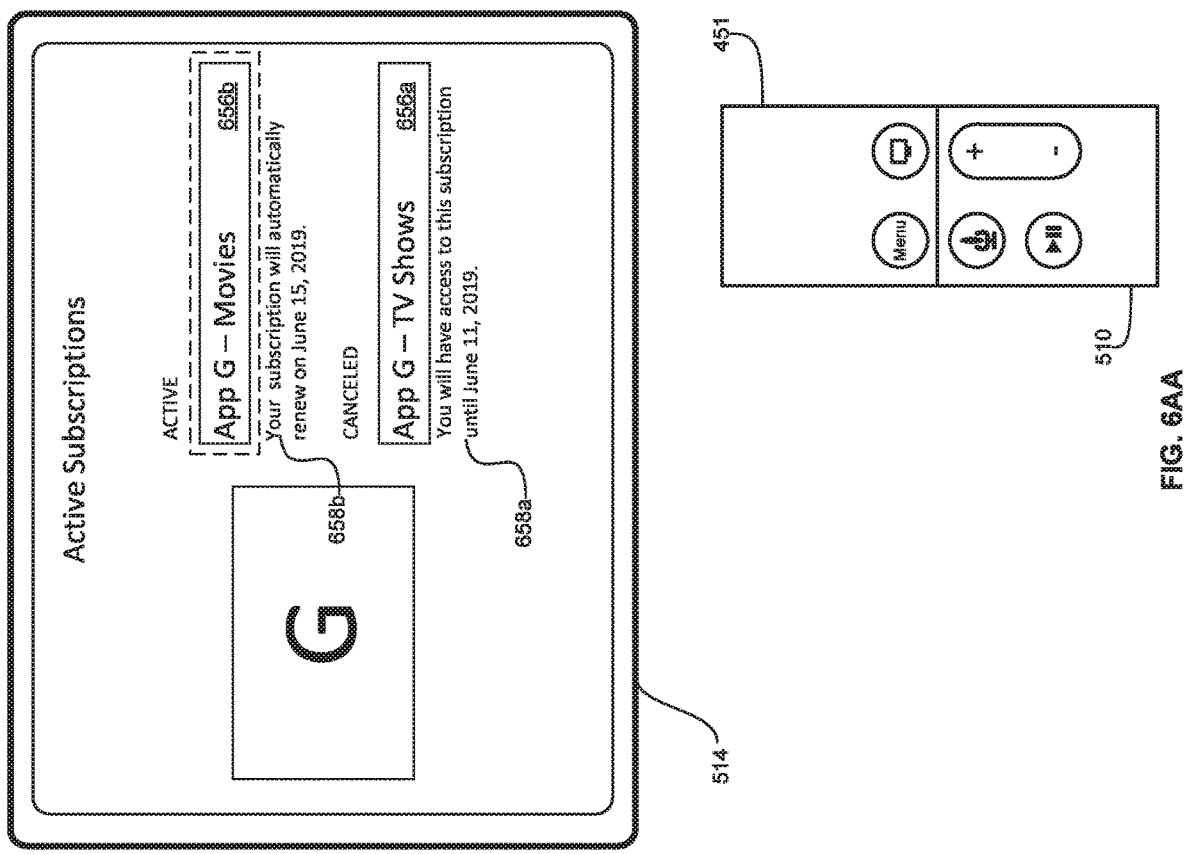
Figure 6D:
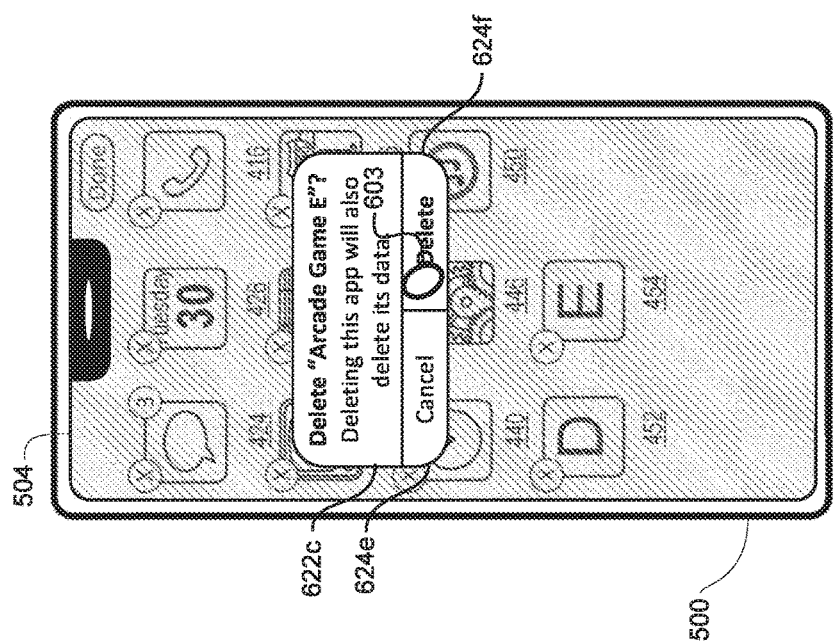
Figure 6C:
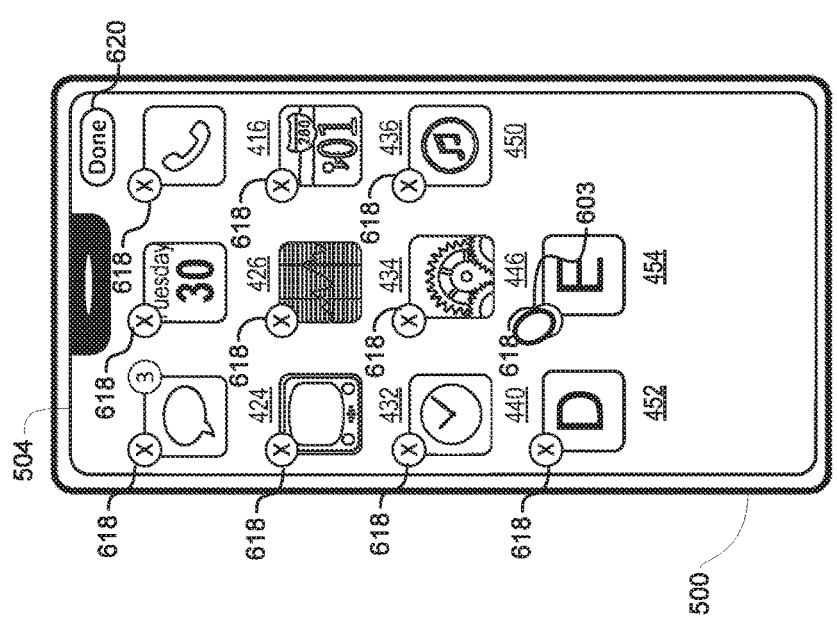
Figure 6F:
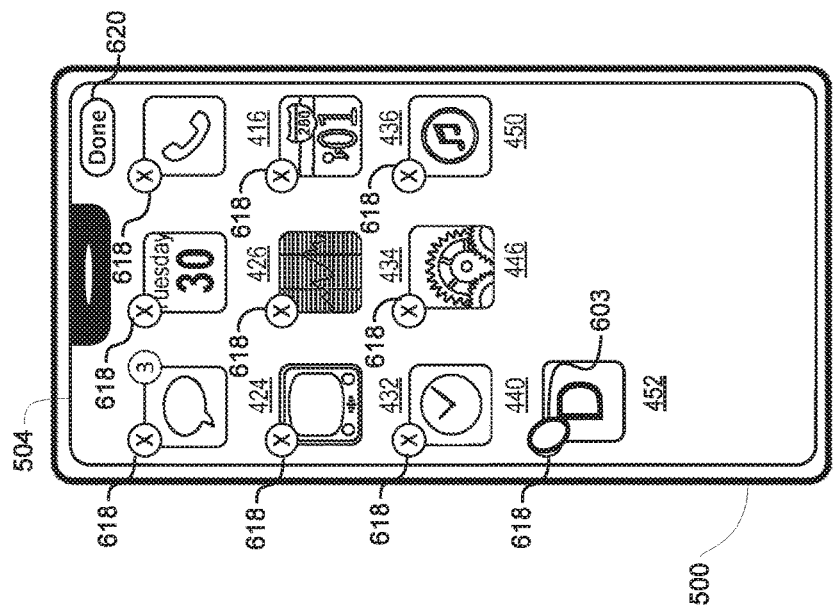
Figure 6E:
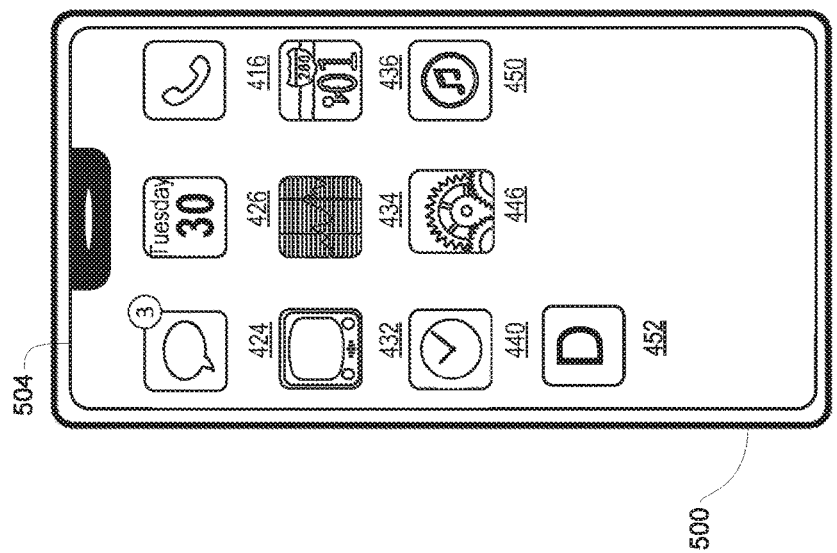
Figure 6H:
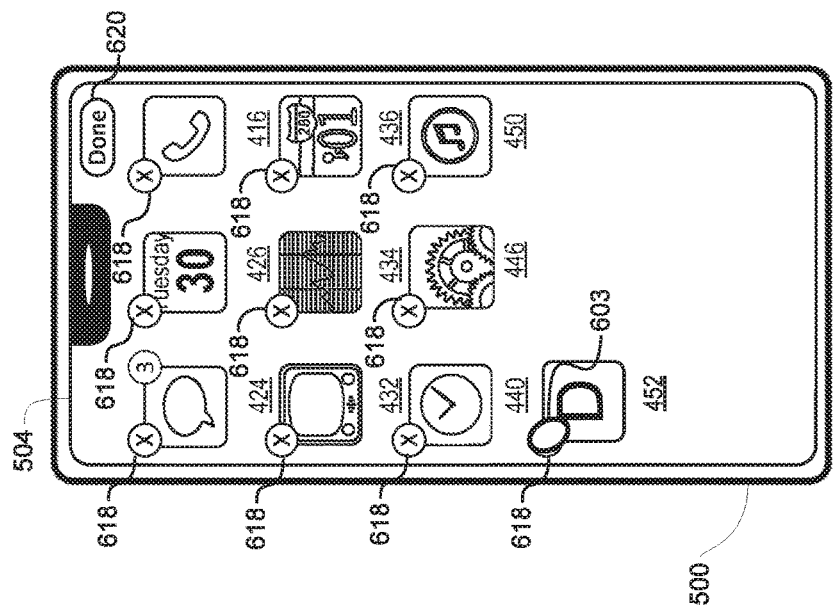
Figure 6G:
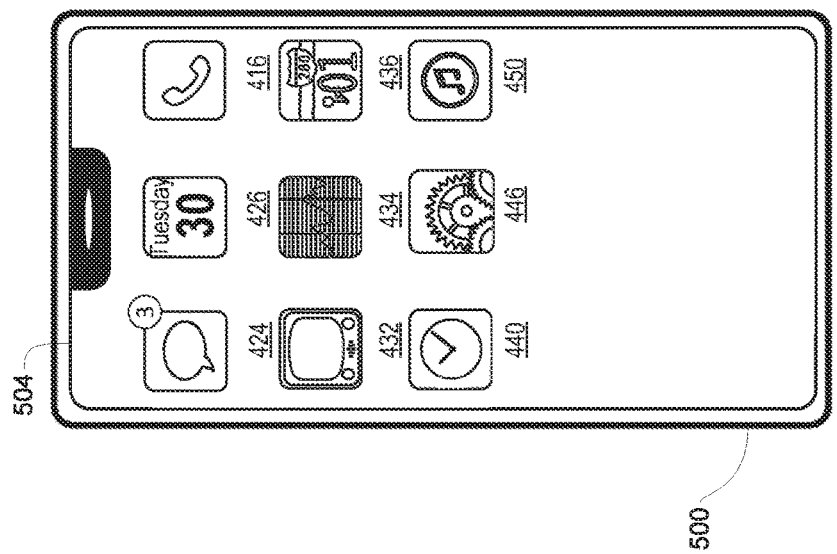
Figure 6I:
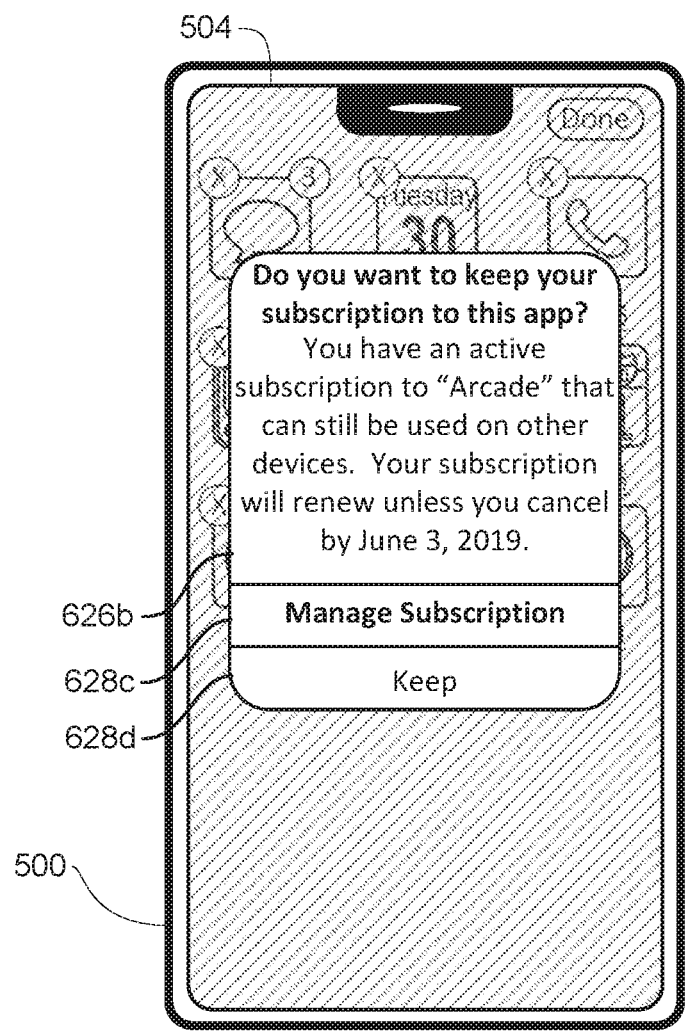
Figure 7A:
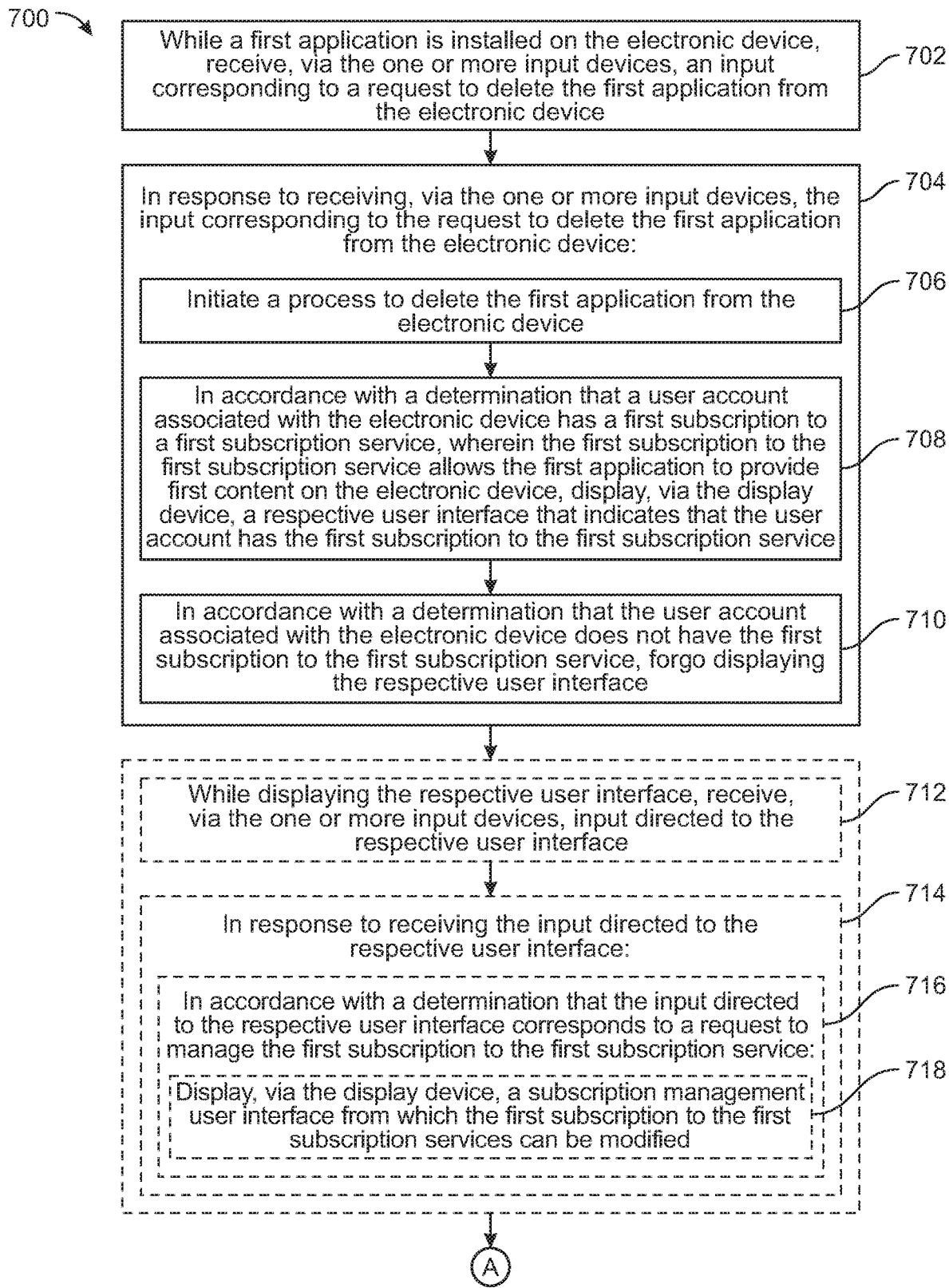
FIGS. 7A-7K are flow diagrams illustrating a method of presenting subscription management user interfaces in response to detecting deletion of an application associated with one or more active subscriptions in accordance with some embodiments.
Figure 7B:
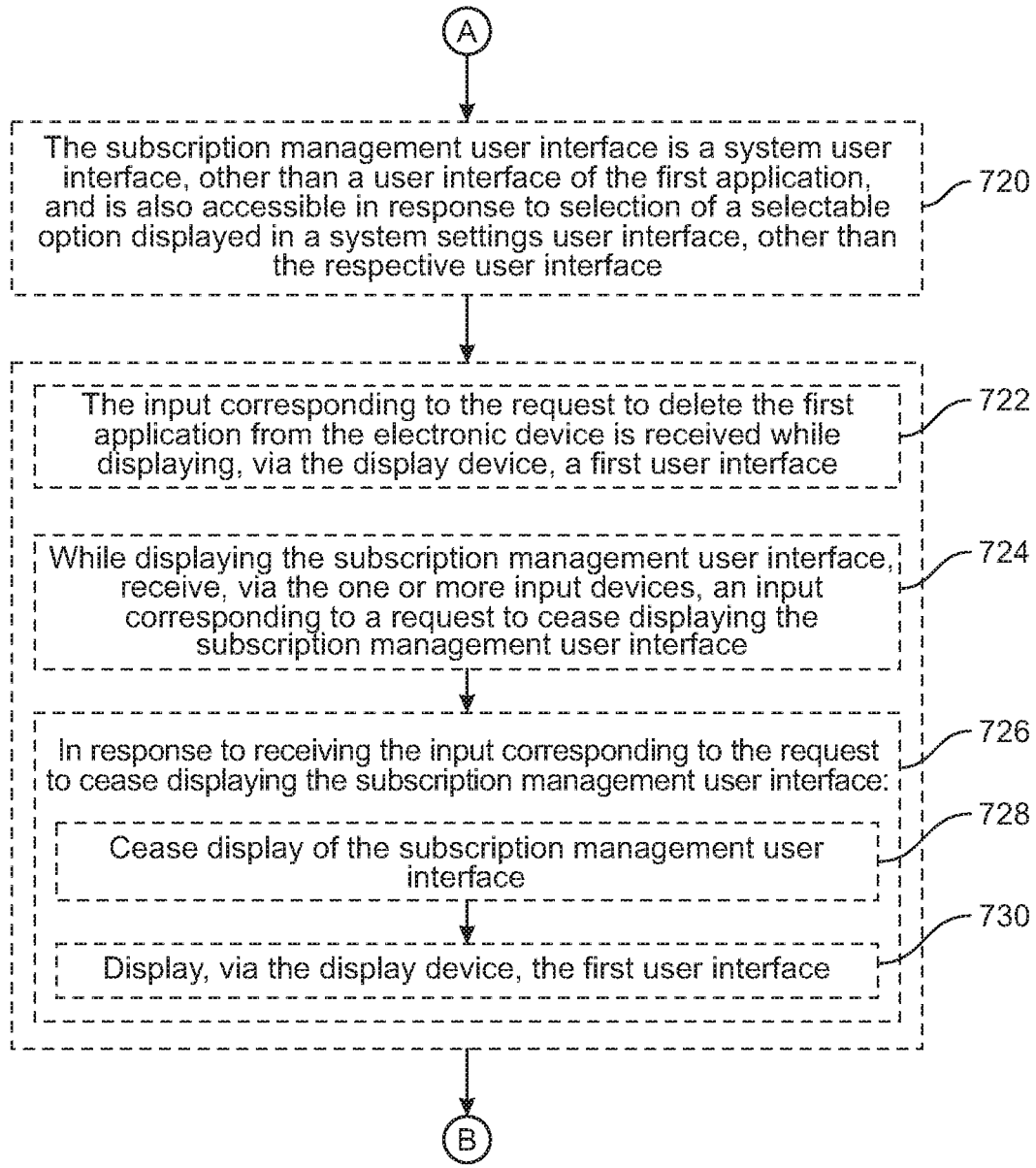
Figure 7C:
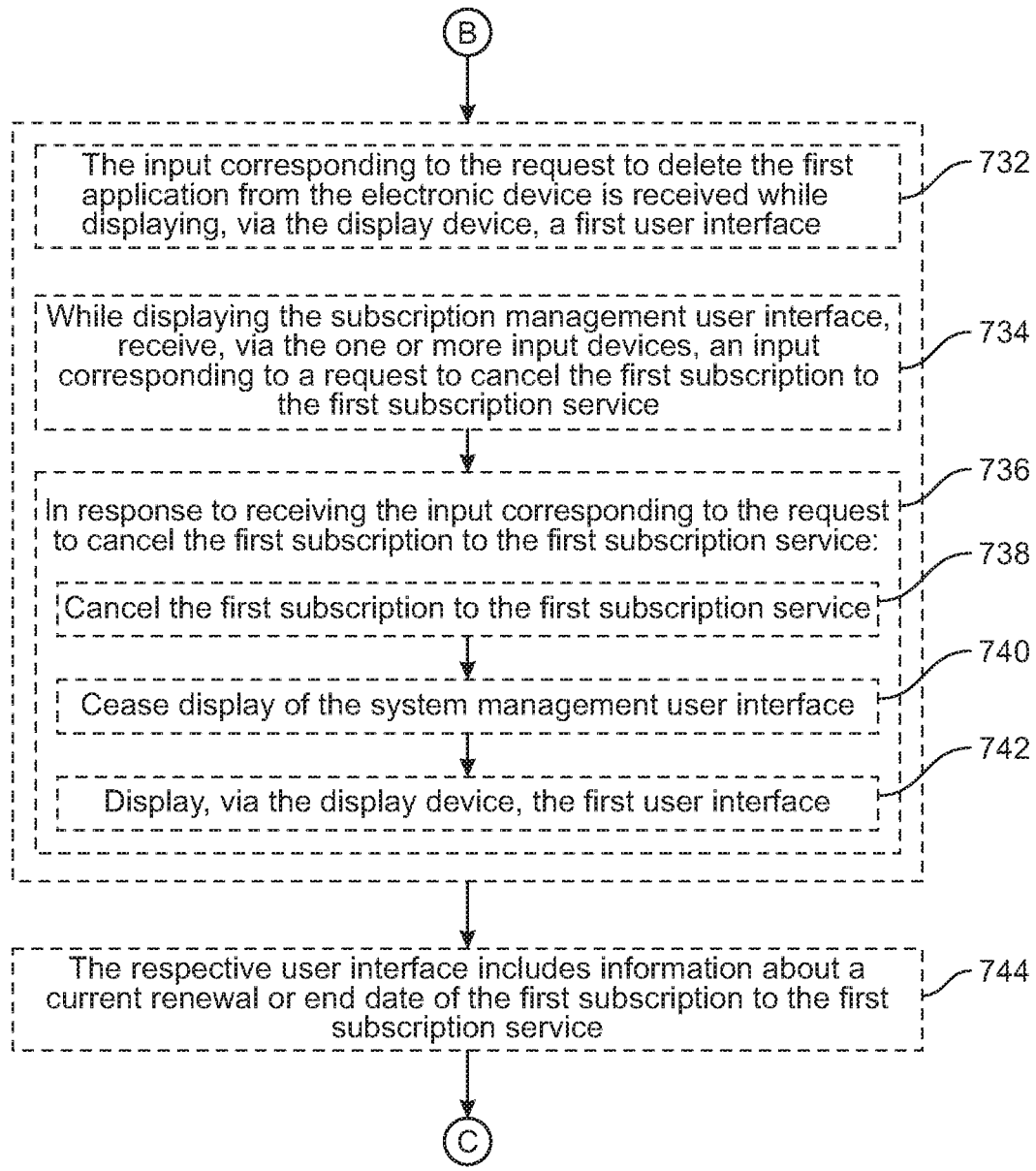
Figure 7D:
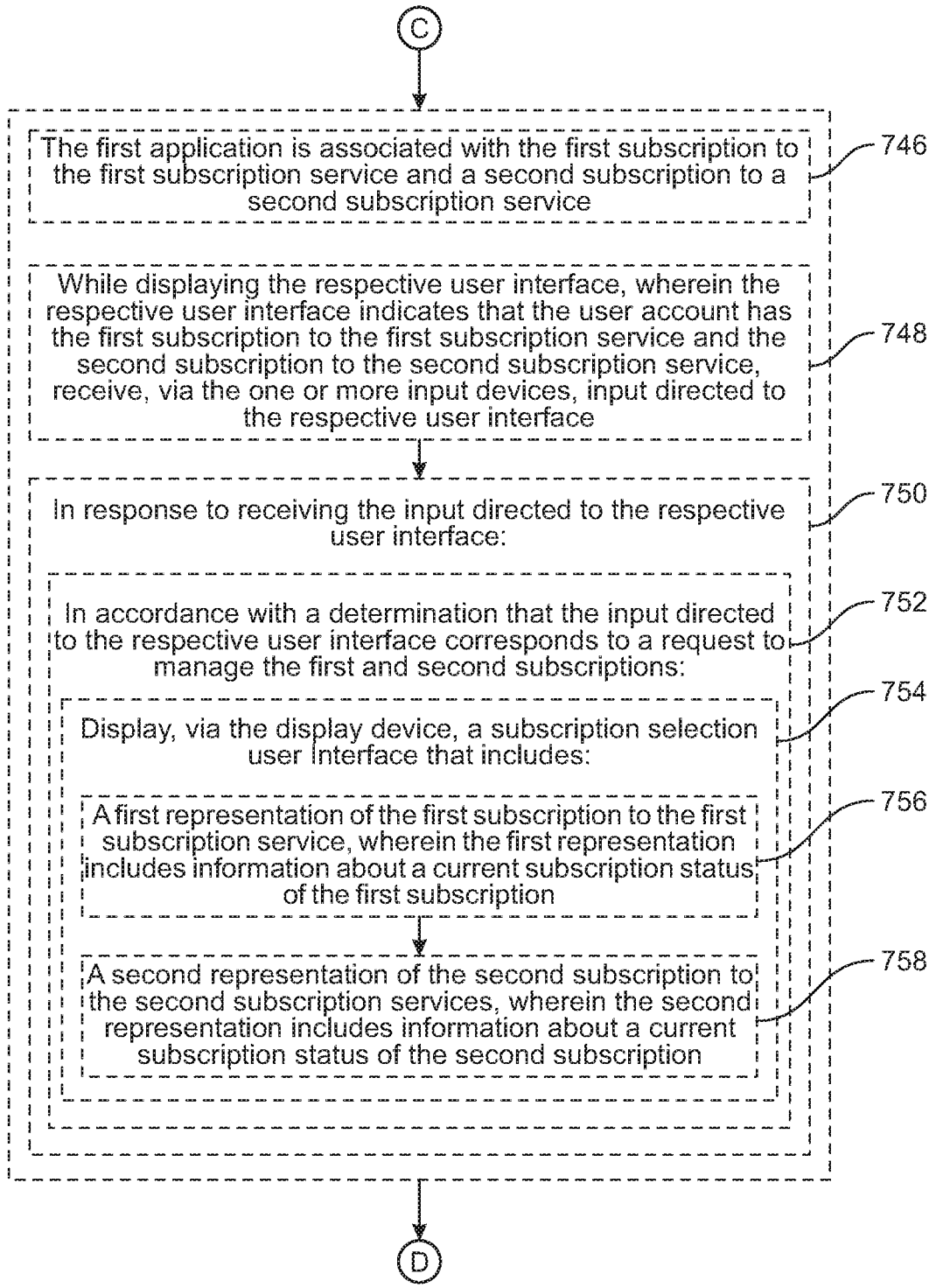
Figure 7E:
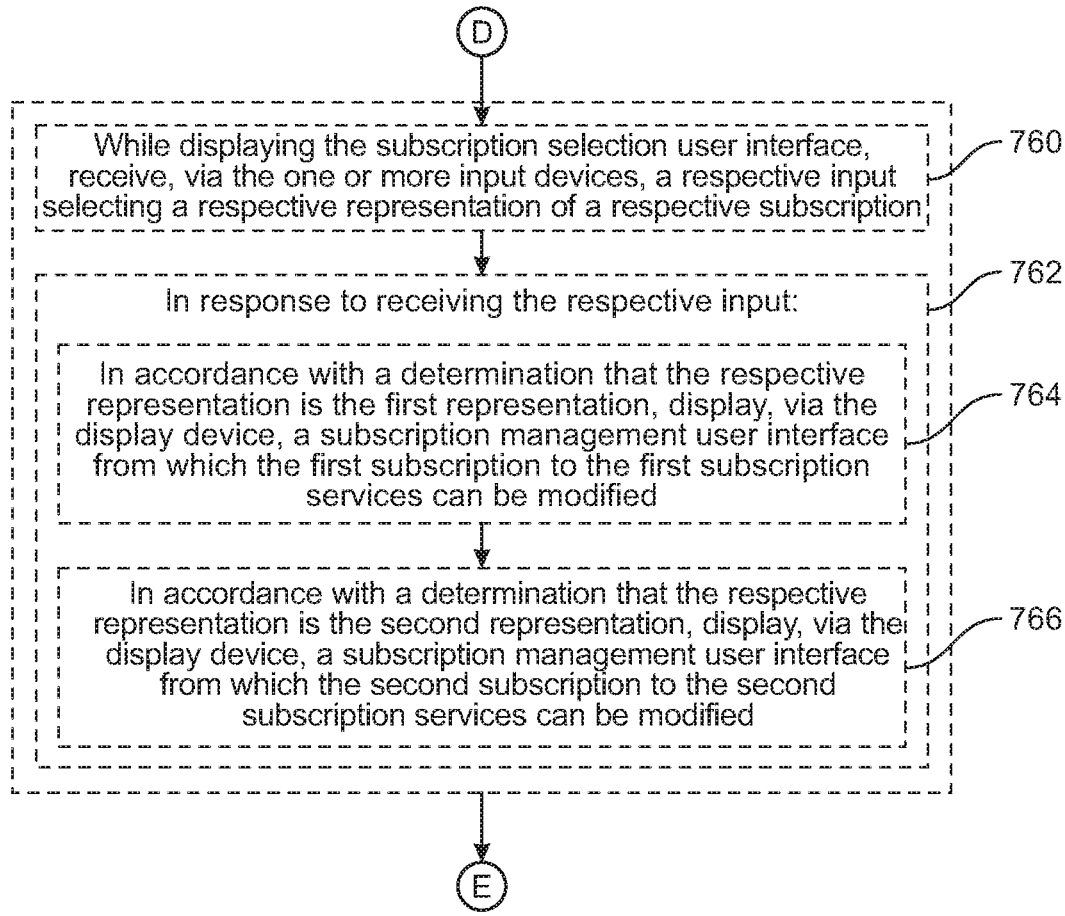
Figure 7F:
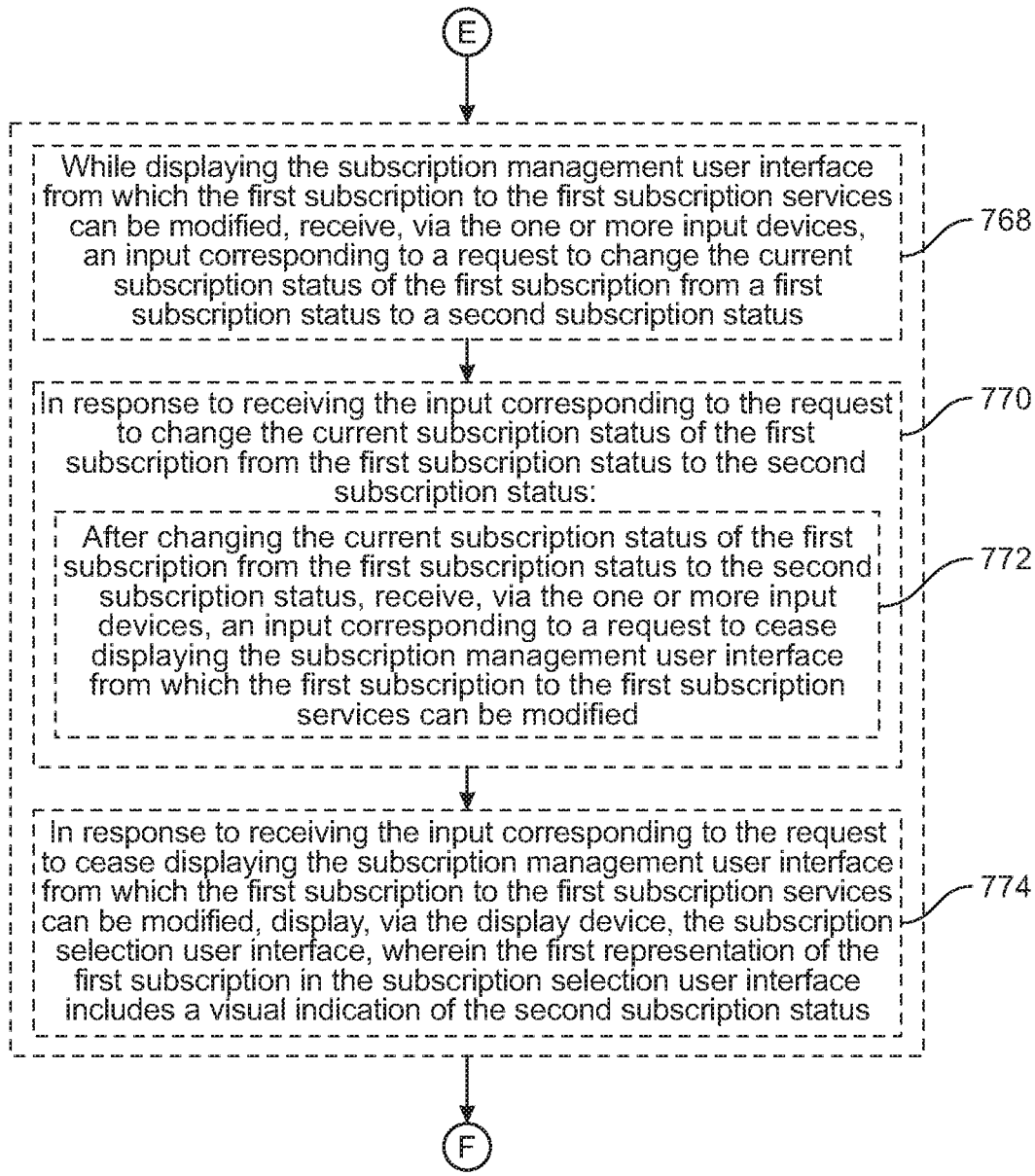
Figure 7G:
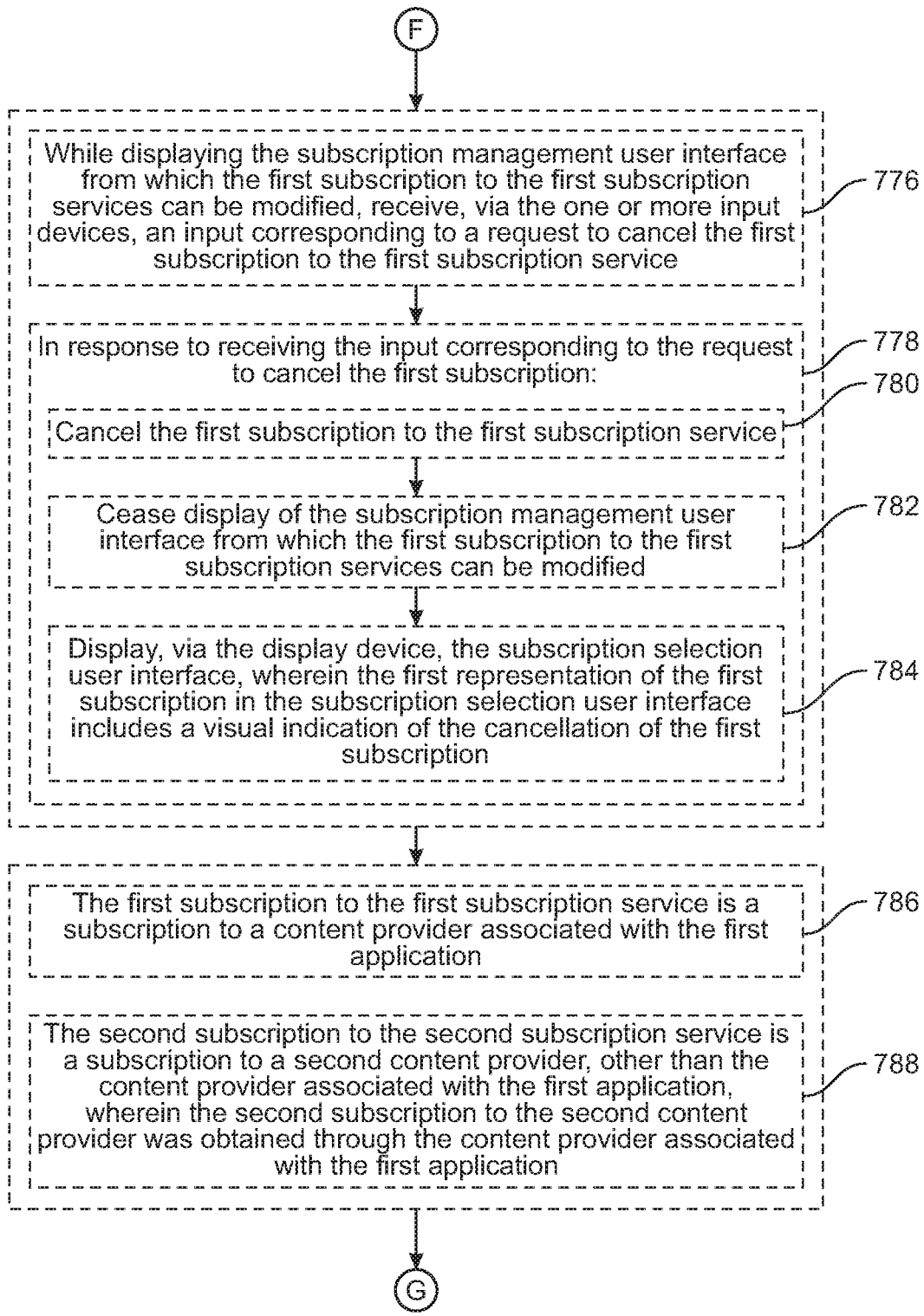
Figure 7H:
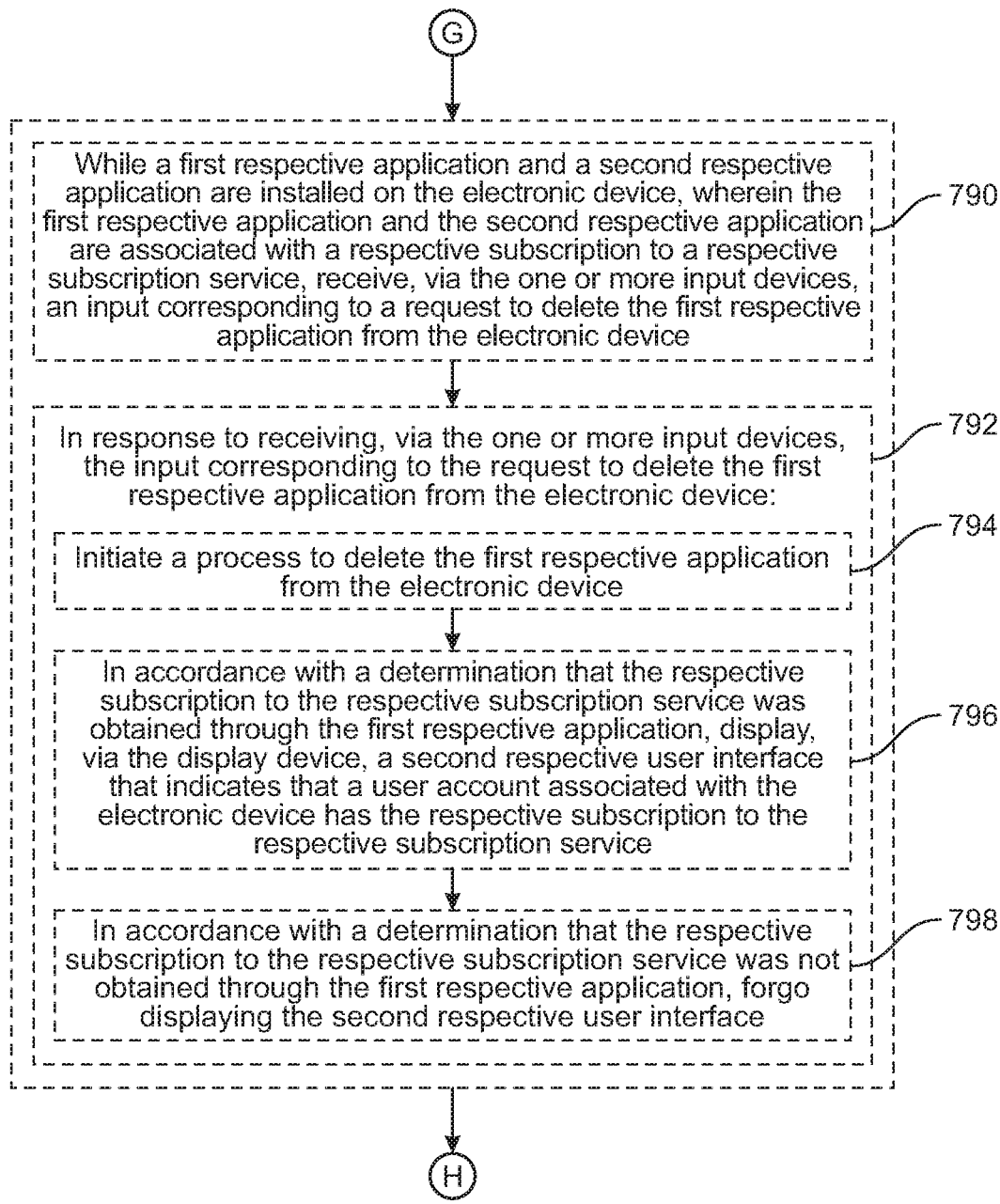
Figure 7I:
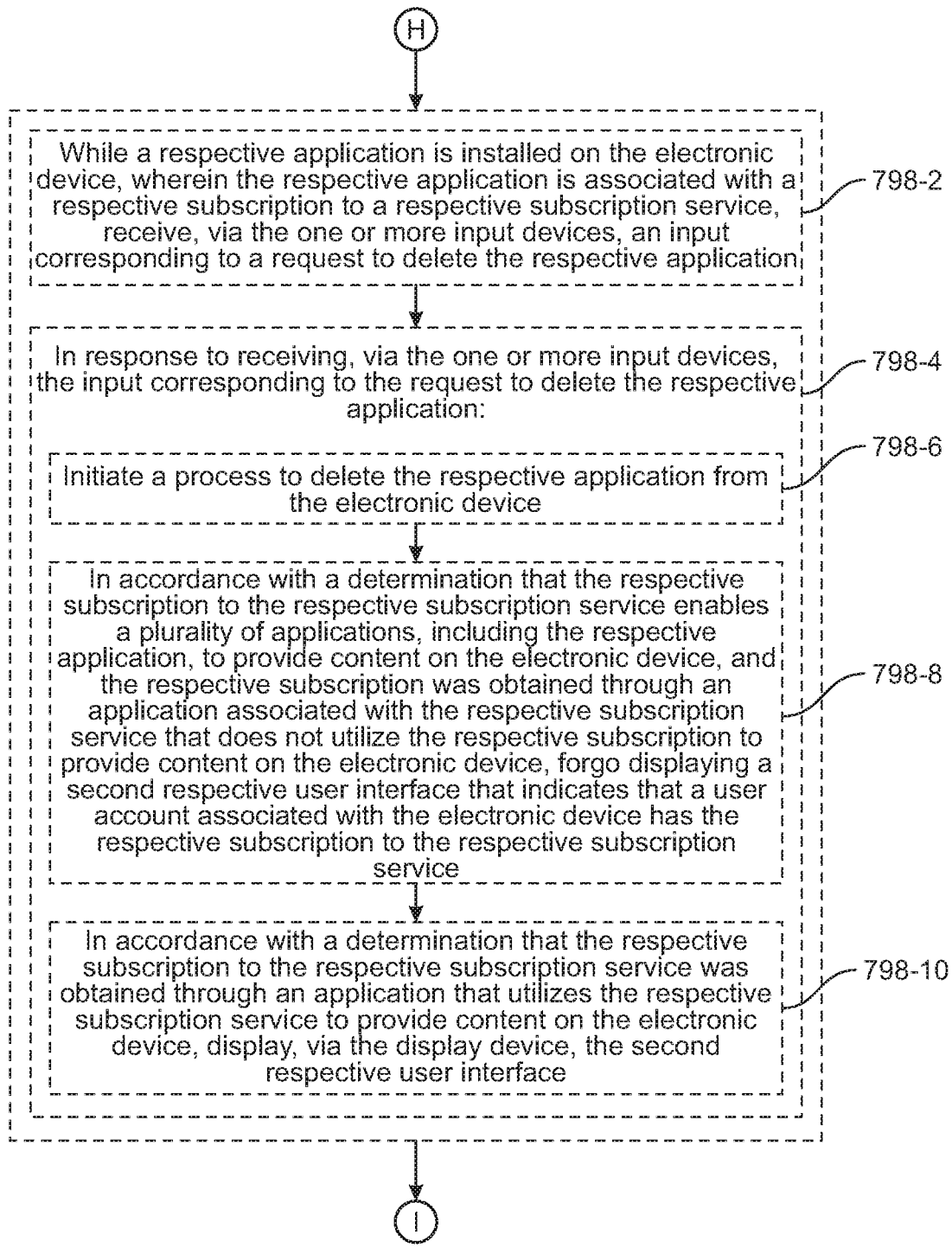
Figure 7J:
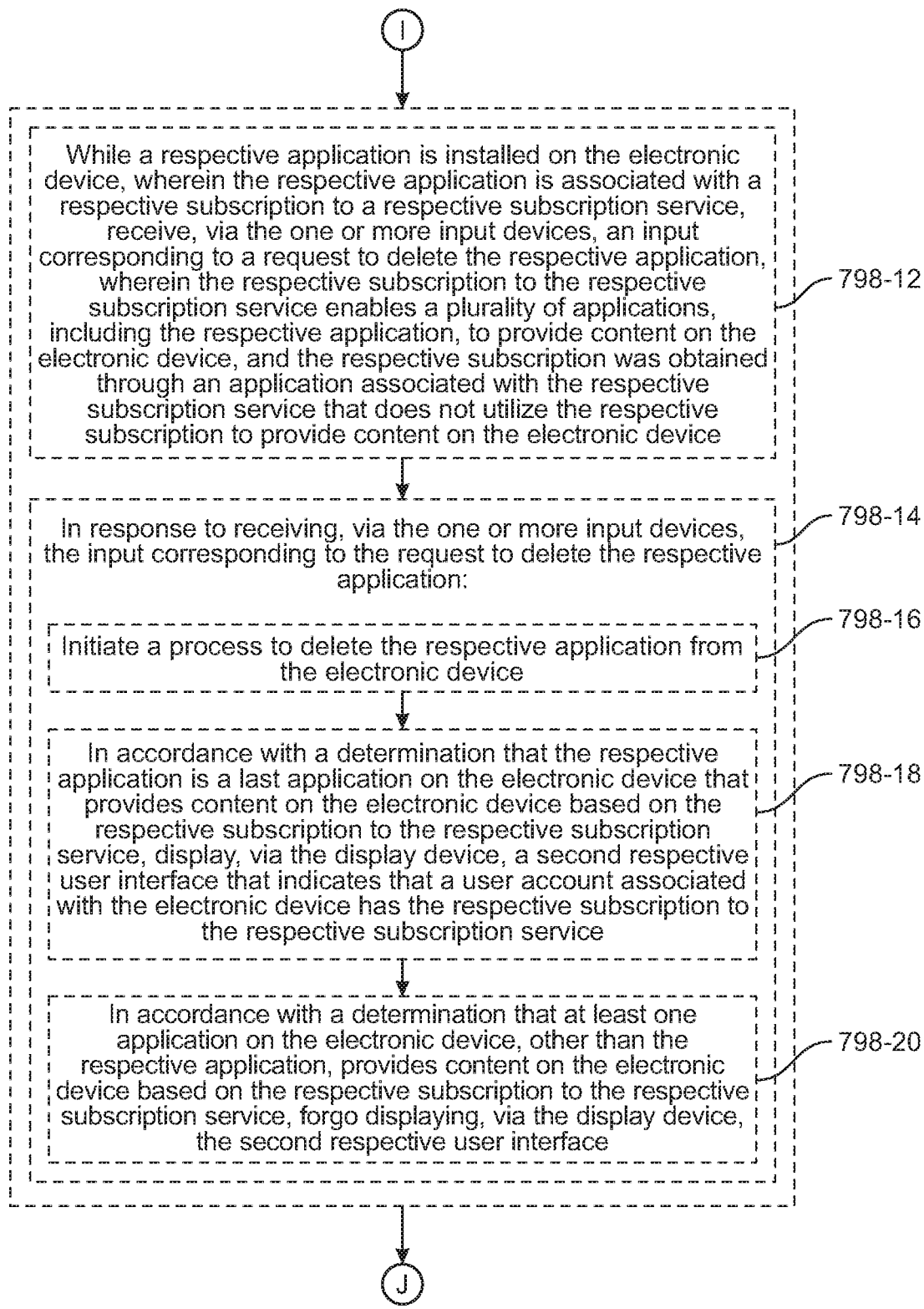
Figure 7K:
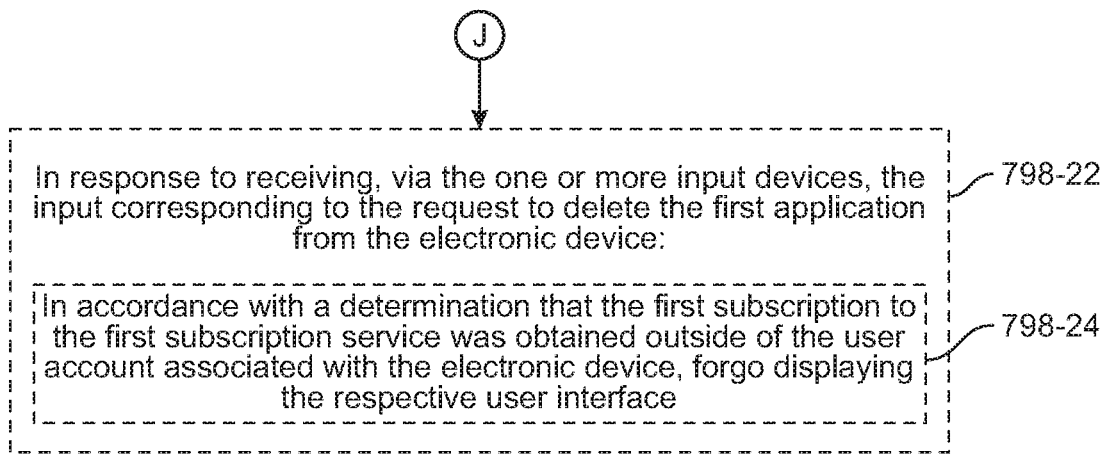

As shown in FIG. 6Y, in response to the user's selection in FIG. 6X, the electronic device 500 displays a user interface that includes a plurality of options for managing one of the subscriptions associated with the application the user just deleted (the subscription the user selected in FIG. 6X). The user interface includes an indication 656a of the name of the subscription, an indication 658a of the renewal date of the subscription, selectable options 660a and 660b that, when selected, change the renewal period of the subscription, a selectable option 662 that, when selected, initiates a process to cancel the subscription, an option 664a to navigate back to the user interface illustrated in FIG. 6X, and an option 664b to close the subscription management user interface and return to the home screen user interface illustrated in FIG. 6R. As shown in FIG. 6Y, the user selects (e.g., with contact 603) the option 662 to initiate a process to cancel the subscription.

In response to the user's selection in FIG. 6Y, the electronic device 500 updates the subscription management user interface to reflect that the subscription will not be renewed, as shown in FIG. 6Z (e.g., "canceled" in representation 656a). The updated subscription management user interface includes an indication 658a of the date the subscription will be canceled. As shown in FIG. 6Z, the user selects (e.g., with contact 603) the option 664a to navigate back to the user interface that includes the representation of the other subscription associated with the application the user just deleted.

As shown in FIG. 6AA, in response to the user's selection in FIG. 6Z, the electronic device 500 presents the user interface with representations of the subscriptions associated with the application the user just deleted. The user interface includes an indication 656b of a subscription that is still active. The indication 656b of the subscription is presented with an indication 658b of the date that the subscription will automatically renew. The indication 656b is selectable to cause the electronic device 500 to present a user interface similar to the user interface illustrated in FIG. 6Y that includes options for managing that active subscription. FIG. 6AA also includes an indication 656a of the canceled subscription 656a that is presented with an indication 658a of the date on which the subscription will expire.

Thus, as shown in FIG. 6R-6AA, the electronic device 500 presents a notification of multiple subscriptions associated with an application and a subscription management user interface in response to detecting deletion of the application.

The examples described above with reference to FIGS. 6A-6AA relate to subscriptions that entitle the user to access content via an application if the subscription is current. In some embodiments, the electronic device 500 is able to download and run a plurality of applications if the user has a subscription to a single subscription service that provides access to a group of applications (e.g., an "application access" subscription). In some circumstances, the electronic device 500 presents a notification of the application access subscription when the user deletes one or more subscription applications and in other circumstances, the electronic device 500 forgoes presenting the notification of the application access subscription when the user deletes one or more subscription applications. FIGS. 6BB-6II illustrate ways the electronic device manages a subscription that provides access to a plurality of applications.

FIG. 6BB illustrates an application store user interface 668 that presents information about a subscription that provides access to a plurality of subscription applications. Subscribing to the subscription service entitles the user account of the electronic device 500 to download and run one or more subscription applications on the electronic device 500. The user interface 668 includes an option 666a to initiate a process to subscribe to the application subscription service and an option 666b to exit the user interface 668 without subscribing to the application subscription service. As shown in FIG. 6BB, the user selects (e.g., with contact 603) the option 666a to initiate the process to subscribe to the application subscription service.

After subscribing to the application subscription service, the user downloads a plurality of subscription applications (e.g., applications D and E). FIG. 6CC illustrates a home screen user interface that includes two icons 452 and 454 that represent those subscription applications. As shown in FIG. 6CC, the user selects an option 618 to delete one of the subscription applications (e.g., application E).

As shown in FIG. 6DD, in response to the user's selection in FIG. 6CC, the electronic device 500 presents notification 622c confirming that the user intends to delete the subscription application. The notification 622c includes an option 624e to dismiss the notification 622c without deleting the application and an option 624f to delete the application. As shown in FIG. 6DD, the user selects (e.g., with contact 603) the option 624f to delete the application.

In response to the user's selection in FIG. 6DD, the electronic device 500 deletes the application and displays the home screen user interface illustrated in FIG. 6EE. The home screen user interface does not include the icon associated with the application the user just deleted. The electronic device 500 does not present a notification of the application subscription in response to detecting deletion of the application because the other subscription application represented by icon 452 is still installed on the electronic device.

In FIG. 6FF, the user selects the option 618 to delete the other subscription application from the electronic device. In response to the user's selection in FIG. 6FF, the electronic device deletes the application. In some embodiments, the electronic device 500 presents a notification similar to notification 622c illustrated in FIG. 6DD to confirm deletion before deleting the application. After deleting the application, the electronic device 500 presents the home screen user interface as illustrated in FIG. 6GG. As shown in FIGS. 6FF-6GG, the electronic device 500 does not present a notification of the application subscription even though the last subscription application was deleted because the user is still able to use the subscription to access applications other than the application that was just deleted.

FIGS. 6HH-6II illustrate another embodiment of the disclosure in which the electronic device 500 presents the notification of the application subscription when the user deletes the last subscription application from the electronic device 500. In FIG. 6HH, the user selects the option 618 to delete the application 452. In FIG. 6II, in response to the user's selection in FIG. 6HH and optionally in response to detecting confirmation of the deletion, such as through a notification similar to notification 622c illustrated in FIG. 6DD, the electronic device 500 presents a notification 626b of the subscription, as shown in FIG. 6II. The notification 626b includes a selectable option 628c that, when selected, causes the electronic device 500 to present a user interface that includes options for the user to manage the subscription (e.g., a subscription management user interface similar to the user interface illustrated in FIG. 6I) and an option 628d that, when selected, causes the electronic device 500 to dismiss the notification 626b without managing the subscription. Therefore, in some embodiments, device 500 presents notification 626b upon deletion of the last application on the device that utilizes the application access subscription.

Thus, as shown in FIGS. 6BB-6II, in some circumstances, the electronic device 500 presents a notification of the application access subscription when the user deletes one or more subscription applications and in other circumstances, the electronic device 500 forgoes presenting the notification of the application access subscription when the user deletes one or more subscription applications.

FIGS. 7A-7K are flow diagrams illustrating a method 700 of presenting subscription management user interfaces in response to detecting deletion of an application associated with one or more active subscriptions in accordance with some embodiments. The method 700 is optionally performed at an electronic device such as device 100, device 300, device 500, device 501, device 590, and device 591 as described above with reference to FIGS. 1A-1B, 2-3, 4A-4B and 5A-5J. Some operations in method 700 are, optionally combined and/or order of some operations is, optionally, changed.

As described below, the method 700 provides ways to present subscription management user interfaces in response to detecting deletion of an application associated with one or more active subscriptions. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 6F, an electronic device 500 in communication with a display device and one or more input devices (e.g., a mobile device (e.g., a tablet, a smartphone, a media player, or a wearable device) including a touch screen or a computer including one or more of a keyboard, mouse, trackpad, and display/touch screen.) receives (702), via the one or more input devices, an input corresponding to a request to delete a first application from the electronic device while the first application is installed on the electronic device (e.g., an input to uninstall the application, or an input to delete an icon for launching the application from a home screen of the electronic device, which optionally also causes the electronic device uninstall the application from the electronic device).

In some embodiments, in response to receiving, via the one or more input devices, the input corresponding to the request to delete the first application from the electronic device (704), the electronic device 500 initiates (706) a process to delete the first application from the electronic device, such as in FIG. 6G (e.g., deleting or uninstalling the application from the electronic device, removing the icon for launching the application from the electronic device, etc.).

In some embodiments, in response to receiving, via the one or more input devices, the input corresponding to the request to delete the first application from the electronic device (704), in accordance with a determination that a user account associated with the electronic device has a first subscription to a first subscription service, wherein the first subscription to the first subscription service allows the first application to provide first content on the electronic device (e.g., the first application is an application that provides content, such as movies, tv shows, games, news, etc. on the electronic device as a result of the user having a subscription to an entity that distributes that content, via the first application, to the electronic device), the electronic device 500 displays (708), via the display device, a respective user interface that indicates that the user account has the first subscription to the first subscription service, such as in FIG. 6H (e.g., displaying a pop-up or other message in a messaging element that indicates that while the user is deleting the first application from the electronic device, the subscription associated with the first application is still active, and indicating to the user that if the user wishes to also cancel that subscription, further action is needed). For example, the content it optionally displayed in that application when the user account with which the electronic device is configured is associated with/has the required subscription to the subscription service. In some embodiments, if the user account associated with the electronic device is not associated with a subscription for a particular subscription service that provides content through the first application, the first application does not provide that content on the electronic device.

In some embodiments, in response to receiving, via the one or more input devices, the input corresponding to the request to delete the first application from the electronic device (704), in accordance with a determination that the first application does not provide content on the electronic device 500 based on a subscription to a subscription service (e.g., either the user account does not have an active subscription to the subscription service, which allows the first application to provide content on the electronic device, or the first application is not associated with a subscription service (e.g., does not provide content as a result of a subscription, but rather operates without a subscription service)), forgoing displaying the respective user interface, such as in FIGS. 6O-6Q. Thus, the electronic device optionally alerts the user when the user deletes and application that is associated with an active subscription to a subscription service so that the user is able to then take steps to cancel that subscription if desired—avoiding the situation of having an active subscription to a subscription service with no corresponding application on the electronic device that utilizes that subscription.

The above-described manner of displaying or not displaying the subscription alert based on whether the application being deleted is associated with an active subscription allows the electronic device to indicate to the user that an active subscription associated with the application remains in effect, which simplifies the interaction between the user and the electronic device and enhances the operability of the electronic device and makes the user-device interface more efficient (e.g., by informing the user that a potentially unnecessary subscription remains active), which additionally reduces power usage and improves battery life of the electronic device by enabling the user to use the electronic device more quickly and efficiency.

In some embodiments, while displaying the respective user interface, the electronic device 500 receives (712), via the one or more input devices, input directed to the respective user interface (e.g., the respective user interface optionally includes a button selectable to dismiss the notification without taking action on the subscription, and a button selectable to manage the subscription).

In response to receiving the input directed to the respective user interface (714), such as in FIG. 6H, in accordance with a determination that the input directed to the respective user interface corresponds to a request to manage the first subscription to the first subscription service (716) (e.g., selection of the button in the notification to manage the subscription associated with the application being deleted), the electronic device 500 displays (718), via the display device, a subscription management user interface from which the first subscription to the first subscription services can be modified, such as in FIG. 6I. For example, displaying a user interface with information about the active subscription associated with the first application being deleted. This user interface optionally includes information about when the subscription is next set to renew, the pricing and terms associated with the subscription, and the like. The user interface optionally also includes one or more selectable options for changing the tier of the subscription (e.g., from monthly to yearly, or vice versa), leaving the subscription as is (e.g., a done button to dismiss the user interface), and canceling the subscription (e.g., a cancel subscription button that is selectable to cancel the subscription). In some embodiments, this user interface is overlaid on the user interface from which the application was deleted. In some embodiments, this user interface takes up an entirety of the display.

The above-described manner of directly displaying the subscription management user interface from the subscription alert allows the electronic device to reduce the number of inputs needed to navigate to the user interface from which the subscription can be managed, which simplifies the interaction between the user and the electronic device and enhances the operability of the electronic device and makes the user-device interface more efficient (e.g., by reducing user error and the number of inputs needed by the user to manage the subscription), which additionally reduces power usage and improves battery life of the electronic device by enabling the user to use the electronic device more quickly and efficiency.

In some embodiments, such as in FIG. 6I, the subscription management user interface is a system user interface, other than a user interface of the first application, and is also accessible in response to selection of a selectable option displayed in a system settings user interface, other than the respective user interface (720). For example, the subscription management user interface is also accessible from a settings application/user interface from which settings for the operating system of the electronic device and/or for applications on the electronic device can be modified. Thus, in some embodiments, selecting the "manage subscription" button displayed in the alert provides a direct link to the subscription management user interface, which is optionally not a user interface of the application being deleted (or any other user-installed application on the device).

The above-described manner of directly displaying the subscription management user interface, which is a system user interface, from the subscription alert allows the electronic device to reduce the number of inputs needed to navigate to the user interface from which the subscription can be managed, which simplifies the interaction between the user and the electronic device and enhances the operability of the electronic device and makes the user-device interface more efficient (e.g., by reducing user error and the number of inputs needed by the user to manage the subscription), which additionally reduces power usage and improves battery life of the electronic device by enabling the user to use the electronic device more quickly and efficiency.

In some embodiments, such as in FIG. 6F, the input corresponding to the request to delete the first application from the electronic device is received while displaying, via the display device, a first user interface (722) (e.g., the request to delete the application is a request to delete an icon for launching/displaying the application from a home screen user interface of the electronic device, which optionally includes a plurality of icons for launching/displaying different applications on the electronic device).

In some embodiments, while displaying the subscription management user interface, the electronic device 500 receives 724, via the one or more input devices, an input corresponding to a request to cease displaying the subscription management user interface, such as in FIG. 6J (e.g., an input to close the subscription management user interface).

In some embodiments, in response to receiving the input corresponding to the request to cease displaying the subscription management user interface (726), the electronic device ceases (728) display of the subscription management user interface, such as in FIG. 6M.

In some embodiments, in response to receiving, via the one or more input devices, the input corresponding to the request to delete the first application from the electronic device (704), the electronic device 500 displays (730), via the display device, the first user interface, such as in FIG. 6M. Thus, even though the subscription management user interface is optionally normally displayed from a settings application for the operating system of the electronic device, when accessed from the subscription alert, closing the subscription management user interface optionally redisplays the user interface from which the subscription alert was displayed rather than displaying the higher-level user interface in the settings application from which the subscription management user interface would normally be displayed.

The above-described manner of re-displaying the user interface from which the subscription alert and management user interface were displayed allows the electronic device to maintain navigational consistency, which simplifies the interaction between the user and the electronic device and enhances the operability of the electronic device and makes the user-device interface more efficient (e.g., by reducing user error when interacting with the subscription management user interface that would result from not maintaining consistent navigation), which additionally reduces power usage and improves battery life of the electronic device by enabling the user to use the electronic device more quickly and efficiency.

In some embodiments, such as in FIG. 6F, the input corresponding to the request to delete the first application from the electronic device is received while displaying, via the display device, a first user interface (732) (e.g., the request to delete the application is a request to delete an icon for launching/displaying the application from a home screen user interface of the electronic device, which optionally includes a plurality of icons for launching/displaying different applications on the electronic device).

In some embodiments, such as in FIG. 6J, while displaying the subscription management user interface, the electronic device receives (734), via the one or more input devices, an input corresponding to a request to cancel the first subscription to the first subscription service (e.g., an input selecting a "cancel subscription" button displayed in the subscription management user interface).

In some embodiments, in response to receiving the input corresponding to the request to cancel the first subscription to the first subscription service (736), such as in FIG. 6J, the electronic device 500 cancels (738) the first subscription to the first subscription service.

In some embodiments, in response to receiving the input corresponding to the request to cancel the first subscription to the first subscription service (736), the electronic device 500 ceases (740) display of the system management user interface, such as in FIG. 6M.

In some embodiments, in response to receiving the input corresponding to the request to cancel the first subscription to the first subscription service (736), the electronic device 500 displays (742), via the display device, the first user interface, such as in FIG. 6M. Thus, even though the subscription management user interface is optionally normally displayed from a settings application/user interface for the operating system of the electronic device, when accessed from the subscription alert, closing the subscription management user interface optionally redisplays the user interface from which the subscription alert was displayed rather than displaying the higher-level user interface in the settings application from which the subscription management user interface would normally be displayed.

The above-described manner of re-displaying the user interface from which the subscription alert and management user interface were displayed allows the electronic device to maintain navigational consistency, which simplifies the interaction between the user and the electronic device and enhances the operability of the electronic device and makes the user-device interface more efficient (e.g., by reducing user error when interacting with the subscription management user interface that would result from not maintaining consistent navigation), which additionally reduces power usage and improves battery life of the electronic device by enabling the user to use the electronic device more quickly and efficiency.

In some embodiments, such as in FIG. 6I, the respective user interface includes information 630a and 634a about a current renewal or end date of the first subscription to the first subscription service (744). For example, the notification that is displayed in response to the input to delete the application includes information about when the currently active subscription associated with the application will be renewed or is set to expire. In this way, the user is able to determine whether action should be taken with respect to the subscription (e.g., if the subscription is set to expire very shortly, the user may decide that there is no need to explicitly cancel it at the moment).

The above-described manner of displaying relevant subscription information in the subscription alert allows the electronic device to provide the user with relevant information, which simplifies the interaction between the user and the electronic device and enhances the operability of the electronic device and makes the user-device interface more efficient (e.g., by reducing unnecessary input to manage the subscription if such management is not needed), which additionally reduces power usage and improves battery life of the electronic device by enabling the user to use the electronic device more quickly and efficiency.

In some embodiments, such as in FIG. 6X, the first application is associated with the first subscription to the first subscription service and a second subscription to a second subscription service (746) (e.g., the application provides content from a first content provider based on a first subscription, and provides a second subscription via the application that provides content from a second content provider (e.g., from within the application or a different application) based on a second subscription).

In some embodiments, such as in FIG. 6X, while displaying the respective user interface, wherein the respective user interface indicates that the user account has the first subscription to the first subscription service and the second subscription to the second subscription service (e.g., the subscription alert indicates to the user that multiple subscriptions are potentially implicated by the deletion of the application), the electronic device 500 receives (748), via the one or more input devices, input directed to the respective user interface.

In some embodiments, in response to receiving the input directed to the respective user interface (750), such as in FIG. 6X, in accordance with a determination that the input directed to the respective user interface corresponds to a request to manage the first and second subscriptions (752) the electronic device 500 displays (754) via the display device, a subscription selection user interface, such as in FIG. 6Y, that includes a first representation 656a of the first subscription to the first subscription service, wherein the first representation includes information 658a about a current subscription status of the first subscription (756) In some embodiments, the subscription alert includes a "manage subscriptions" button and a "not now" button. The input is optionally an input selecting the "manage subscriptions" button. Selection of the "not now" button optionally causes the alert to be dismissed without managing the first or second subscriptions.

In some embodiments, in response to receiving the input directed to the respective user interface (750), such as in FIG. 6X, in accordance with a determination that the input directed to the respective user interface corresponds to a request to manage the first and second subscriptions (752) the electronic device 500 displays (754) via the display device, a second representation 656a of the second subscription to the second subscription services, wherein the second representation includes information 658a about a current subscription status of the second subscription, such as in FIG. 6Y (758). For example, the subscription selection user interface includes representations of each of the subscriptions associated with the application. Each representation optionally includes information about what the subscription is (e.g., a subscription to what, the price of the subscription, etc.), and when the current subscription is set to end/expire or renew. In some embodiments, the subscription selection user interface does not include controls for managing any of the subscriptions displayed in the subscription selection user interface. The subscription selection user interface is optionally not a user interface that is accessible from a system settings application/user interface for the operating system of the electronic device, but rather is optionally only accessible from the subscription alert displayed in response to deleting an application associated with the subscriptions displayed in the subscription selection user interface.

The above-described manner of displaying information about each of the subscriptions associated with the electronic device allows the electronic device to provide the user with all of the relevant subscription information in a single user interface, which simplifies the interaction between the user and the electronic device and enhances the operability of the electronic device and makes the user-device interface more efficient (e.g., by reducing the number of inputs needed to display the information about each of the subscriptions, which might otherwise require navigation to different subscription-specific user interfaces), which additionally reduces power usage and improves battery life of the electronic device by enabling the user to use the electronic device more quickly and efficiency.

In some embodiments, such as in FIG. 6X, while displaying the subscription selection user interface, the electronic device 500 receives (760), via the one or more input devices, a respective input selecting a respective representation 656a of a respective subscription (e.g., selecting one of the subscriptions shown in the subscription selection user interface).

In some embodiments, in response to receiving the respective input (762), in accordance with a determination that the respective representation is the first representation 656a, the electronic device 500 displays (764), via the display device, a subscription management user interface from which the first subscription to the first subscription services can be modified, such as in FIG. 6Y (e.g., if the electronic device detects selection of a representation for the first subscription in the subscription selection user interface, the electronic device displays a subscription management user interface (e.g., as described above) that is dedicated to the first subscription). For example, a user interface from which the first subscription is able to be changed or canceled.

In some embodiments, in response to receiving the respective input (762), in accordance with a determination that the respective representation is the second representation 656b, the electronic device 500 displays (766), via the display device, a subscription management user interface from which the second subscription to the second subscription services can be modified similar to the user interface illustrated in FIG. 6Y. For example, if the electronic device detects selection of a representation for the second subscription in the subscription selection user interface, the electronic device displays a subscription management user interface (e.g., as described above) that is dedicated to the second subscription. For example, a user interface from which the second subscription is able to be changed or canceled.

The above-described manner of displaying subscription management user interfaces for different subscriptions based on user input allows the electronic device to display controls and information for the requested subscription, without doing so for other subscriptions, which simplifies the interaction between the user and the electronic device and enhances the operability of the electronic device and makes the user-device interface more efficient (e.g., by focusing the information and controls displayed to those that were requested), which additionally reduces power usage and improves battery life of the electronic device by enabling the user to use the electronic device more quickly and efficiency.

In some embodiments, such as in FIG. 6Y, while displaying the subscription management user interface from which the first subscription to the first subscription services can be modified, the electronic device 500 receives (768), via the one or more input devices, an input corresponding to a request to change the current subscription status of the first subscription from a first subscription status to a second subscription status (e.g., an input to change the subscription from a yearly subscription to a monthly subscription, an input to cancel the subscription (e.g., change it from an active status to a canceled status), etc.).

In some embodiments, in response to receiving the input corresponding to the request to change the current subscription status of the first subscription from the first subscription status to the second subscription status (770), such as in FIG. 6Y, the electronic device 500 changes the current subscription status of the first subscription from the first subscription status to the second subscription status (e.g., in some embodiments, in response to changing the subscription status of the first subscription, the electronic device remains in the subscription management user interface rather than automatically dismissing the subscription management user interface);

After changing the current subscription status of the first subscription from the first subscription status to the second subscription status, the electronic device 500 receives (772), via the one or more input devices, an input corresponding to a request to cease displaying the subscription management user interface from which the first subscription to the first subscription services can be modified, such as in FIG. 6Z (e.g., selection of a "done" or "back" button displayed in the subscription management user interface for the first subscription).

In some embodiments, in response to receiving the input corresponding to the request to cease displaying the subscription management user interface from which the first subscription to the first subscription services can be modified, the electronic device 500 displays (774), via the display device, the subscription selection user interface, such as in FIG. 6AA, wherein the first representation of the first subscription in the subscription selection user interface includes a visual indication 658*a* of the second subscription status. For example, redisplaying the subscription selection user interface from which the user is able to select any of the subscriptions associated with the application that was deleted to be able to further modify/cancel those subscriptions. In some embodiments, after the first subscription has been modified as described above, the information about the first subscription displayed in the subscription selection user interface is updated to reflect the updated status of the first subscription.

The above-described manner of displaying the subscription selection user interface after the subscription management user interface allows the electronic device to display controls and information for remaining subscriptions associated with the application that was deleted, which simplifies the interaction between the user and the electronic device and enhances the operability of the electronic device and makes the user-device interface more efficient (e.g., by redisplaying information and controls for quickly and efficiently managing the remaining subscriptions), which additionally reduces power usage and improves battery life of the electronic device by enabling the user to use the electronic device more quickly and efficiency.

In some embodiments, while displaying the subscription management user interface from which the first subscription to the first subscription service can be modified, the electronic device 500 receives (776), via the one or more input devices, an input corresponding to a request to cancel the first subscription to the first subscription service, such as in FIG. 6Y (e.g., an input selecting a "cancel subscription" button in the subscription management user interface for the first subscription).

In some embodiments, in response to receiving the input corresponding to the request to cancel the first subscription (778), such as in FIG. 6Y, the electronic device 500 cancels (780) the first subscription to the first subscription service.

In some embodiments, in response to receiving the input corresponding to the request to cancel the first subscription (778), the electronic device ceases (782) display of the subscription management user interface from which the first subscription to the first subscription services can be modified, such as in FIG. 6AA.

In some embodiments, in response to receiving the input corresponding to the request to cancel the first subscription (778), the electronic device 500 displays (784), via the display device, the subscription selection user interface, wherein the first representation of the first subscription in the subscription selection user interface includes a visual indication of the cancellation of the first subscription, such as in FIG. 6AA. For example, in the case of multiple subscriptions associated with the application that was deleted, canceling a given subscription from the subscription management user interface for that subscription optionally does not cause display of the home screen (e.g., the user interface from which the application was deleted), but rather automatically (e.g., without further user input) causes display of the subscription selection user interface from which the user is able to select any of the subscriptions associated with the application that was deleted to be able to further modify/cancel those subscriptions. In some embodiments, after the first subscription has been canceled as described above, the information about the first subscription displayed in the subscription selection user interface is updated to reflect the canceled status of the first subscription.

The above-described manner of automatically displaying the subscription selection user interface in response to the cancellation of the first subscription allows the electronic device to display controls and information for remaining subscriptions associated with the application that was deleted, which simplifies the interaction between the user and the electronic device and enhances the operability of the electronic device and makes the user-device interface more efficient (e.g., by redisplaying information and controls for quickly and efficiently managing the remaining subscriptions), which additionally reduces power usage and improves battery life of the electronic device by enabling the user to use the electronic device more quickly and efficiency.

In some embodiments, such as in FIG. 6X, the first subscription to the first subscription service is a subscription to a content provider associated with the first application (786) (e.g., the first subscription is a subscription to a first content provider that allows the first application to provide content from that first provider on the electronic device (e.g., from within the first application, or from within a different application that the first application is in communication with). In some embodiments, without the first subscription to the first content provider, the first application is not able to provide content on the electronic device (or provides a subset of free/trial content on the electronic device, rather than the full amount of content available from the first content provider)).

In some embodiments, such as in FIG. 6X, the second subscription to the second subscription service is a subscription to a second content provider, other than the content provider associated with the first application, wherein the second subscription to the second content provider was obtained through the content provider associated with the first application (788) (e.g., the second subscription is to a second content provider that is able to provide content through a different application using the second subscription (in some embodiments, through the first application), but whose subscription is available for purchase via the first content provider).

The above-described manner of providing for management of the above subscriptions allows the electronic device to provide for management of a number of subscriptions and/or types of subscriptions, which simplifies the interaction between the user and the electronic device and enhances the operability of the electronic device and makes the user-device interface more efficient (e.g., by providing for the same subscription management for the-above described types of subscriptions as for other subscriptions), which additionally reduces power usage and improves battery life of the electronic device by enabling the user to use the electronic device more quickly and efficiency.

In some embodiments, such as in FIG. 6CC, while a first respective application and a second respective application are installed on the electronic device, wherein the first respective application and the second respective application are associated with a respective subscription to a respective subscription service, the electronic device 500 receives (790) (e.g., multiple applications utilize a given subscription to provide content on the electronic device via those multiple applications), via the one or more input devices, an input corresponding to a request to delete the first respective application from the electronic device.

In some embodiments, in response to receiving, via the one or more input devices, the input corresponding to the request to delete the first respective application from the electronic device, such as in FIG. 6CC (792), the electronic device 500 initiates (794) a process to delete the first respective application from the electronic device, such as in FIG. 6DD (e.g., deleting the first respective application and/or its icon from a home screen of the electronic device).

In some embodiments, in response to receiving, via the one or more input devices, the input corresponding to the request to delete the first respective application from the electronic device, such as in FIG. 6F (792), in accordance with a determination that the respective subscription to the respective subscription service was obtained through the first respective application, the electronic device 500 displays (796), via the display device, a second respective user interface that indicates that a user account associated with the electronic device has the respective subscription to the respective subscription service, such as in FIG. 6H (e.g., if the respective subscription was obtained through the application being deleted, the electronic device displays a user interface that indicates the existence of the respective subscription and includes a selectable button that is selectable to display a subscription management user interface for the respective subscription from which the respective subscription can be modified/canceled, as previously described).

In some embodiments, in response to receiving, via the one or more input devices, the input corresponding to the request to delete the first respective application from the electronic device, such as in FIG. 6O (792), in accordance with a determination that the respective subscription to the respective subscription service was not obtained through the first respective application (e.g., it was obtained through the second respective application, or through another application, such as an application store from which the first respective application and the second respective application were originally purchased and/or downloaded to the electronic device), the electronic device 500 forgoes (798) displaying the second respective user interface. Thus, in some embodiments, the subscription alert is only displayed when the application that originated the subscription is deleted.

The above-described manner of selectively displaying the subscription alert allows the electronic device to display the subscription alert at times when its most likely to be relevant to the user (and thus most likely to be interacted with), which simplifies the interaction between the user and the electronic device and enhances the operability of the electronic device and makes the user-device interface more efficient (e.g., by reducing the number of times the subscription alert is needlessly displayed, resulting in fewer inputs required to dismiss unnecessary alerts), which additionally reduces power usage and improves battery life of the electronic device by enabling the user to use the electronic device more quickly and efficiency.

In some embodiments, such as in FIG. 6O, while a respective application is installed on the electronic device, wherein the respective application is associated with a respective subscription to a respective subscription service (e.g., the respective application provides content (e.g., movies, tv shows, games, etc.) on the electronic device, via the respective application, using the respective subscription), the electronic device 500 receives (798-2), via the one or more input devices, an input corresponding to a request to delete the respective application.

In some embodiments, such as in FIG. 6P, in response to receiving, via the one or more input devices, the input corresponding to the request to delete the respective application (798-4), the electronic device 500 initiates (798-6) a process to delete the respective application from the electronic device (e.g., deleting the application and/or its icon from a home screen of the electronic device).

In some embodiments, such as in FIG. 6EE, in response to receiving, via the one or more input devices, the input corresponding to the request to delete the respective application (798-4), in accordance with a determination that the respective subscription to the respective subscription service enables a plurality of applications, including the respective application, to provide content on the electronic device, and the respective subscription was obtained through an application associated with the respective subscription service that does not utilize the respective subscription to provide content on the electronic device, the electronic device 500 forgoes (798-8) displaying a second respective user interface that indicates that a user account associated with the electronic device has the respective subscription to the respective subscription service. Optionally, the subscription that enables the plurality of applications to provide content on the electronic device was obtained/purchased in an application that doesn't provide content on the electronic device based on a subscription. For example, the respective subscription is a subscription to a games subscription service that allows a plurality of different games applications to be played on the electronic device, and the games subscription was purchased through an application store on the electronic device from which different applications (e.g., content applications, productivity applications, etc.) and games applications can be downloaded to the electronic device.

In some embodiments, such as in FIG. 6Q, in response to receiving, via the one or more input devices, the input corresponding to the request to delete the respective application (798-4), in accordance with a determination that the respective subscription to the respective subscription service was obtained through an application that utilizes the respective subscription service to provide content on the electronic device (e.g., the subscription was not obtained through an application store application on the electronic device), the electronic device 500 displays (798-10), via the display device, the second respective user interface. Thus, in some embodiments, deletion of an application that operates according to the type of subscription described above does not cause a subscription alert to be displayed.

The above-described manner of selectively displaying the subscription alert allows the electronic device to display the subscription alert at times when its most likely to be relevant to the user (and thus most likely to be interacted with), which simplifies the interaction between the user and the electronic device and enhances the operability of the electronic device and makes the user-device interface more efficient (e.g., by reducing the number of times the subscription alert is needlessly displayed, resulting in fewer inputs required to dismiss unnecessary alerts), which additionally reduces power usage and improves battery life of the electronic device by enabling the user to use the electronic device more quickly and efficiency.

In some embodiments, such as in FIG. 6CC, while a respective application is installed on the electronic device, wherein the respective application is associated with a respective subscription to a respective subscription service, the electronic device 500 receives (798-12), via the one or more input devices, an input corresponding to a request to delete the respective application, wherein the respective subscription to the respective subscription service enables a plurality of applications, including the respective application, to provide content on the electronic device, and the respective subscription was obtained through an application associated with the respective subscription service that does not utilize the respective subscription to provide content on the electronic device (e.g., the subscription that enables the plurality of applications to provide content on the electronic device was obtained/purchased in an application that doesn't provide content on the electronic device based on a subscription). For example, the respective subscription is a subscription to a games subscription service that allows a plurality of different games applications to be played on the electronic device, and the games subscription was purchased through an application store on the electronic device from which different applications (e.g., content applications, productivity applications, etc.) and games applications can be downloaded to the electronic device.

In some embodiments, in response to receiving, via the one or more input devices, the input corresponding to the request to delete the respective application (798-14), the electronic device 500 initiates (798-16) a process to delete the respective application from the electronic device, such as in FIG. 6DD (e.g., deleting the application and/or its icon from a home screen of the electronic device).

In some embodiments, such as in FIG. 6II, in accordance with a determination that the respective application is a last application on the electronic device that provides content on the electronic device based on the respective subscription to the respective subscription service, the electronic device 500 displays (798-18), via the display device, a second respective user interface that indicates that a user account associated with the electronic device has the respective subscription to the respective subscription service (e.g., displaying a subscription alert from which the subscription can be managed (e.g., in response to selection of a "change subscription" button included in the alert) only when the last application that utilizes the subscription to provide content on the electronic device is deleted).

In some embodiments, such as in FIGS. 6FF-6GG, in accordance with a determination that at least one application on the electronic device, other than the respective application, provides content on the electronic device based on the respective subscription to the respective subscription service, the electronic device 500 forgoes (798-20) displaying, via the display device, the second respective user interface. For example, not displaying the subscription alert when other applications remain on the electronic device that utilize the subscription to provide content on the electronic device.

The above-described manner of only displaying the subscription alert when the last application that utilizes the subscription is deleted from the electronic device allows the electronic device to only display the subscription alert when it is likely to be needed, which simplifies the interaction between the user and the electronic device and enhances the operability of the electronic device and makes the user-device interface more efficient (e.g., by reducing the likelihood that a user erroneously cancels a subscription while other applications that require the subscription remain on the electronic device), which additionally reduces power usage and improves battery life of the electronic device by enabling the user to use the electronic device more quickly and efficiency.

In some embodiments, such as in FIG. 6O, in response to receiving, via the one or more input devices, the input corresponding to the request to delete the first application from the electronic device (798-22), in accordance with a determination that the first subscription to the first subscription service was obtained outside of the user account associated with the electronic device, the electronic device 500 forgoes (798-24) displaying the respective user interface. For example, some subscriptions are optionally obtained directly with the subscription service (and thus not associated with the user account with which the electronic device is configured, such as the user account that is associated with an application store application that is on the electronic device), while other subscriptions are optionally purchased through an application store on the electronic device and are thus associated with a user account with which the electronic device is configured. In such circumstances, the subscription alert is optionally not displayed for deletion of applications that utilize subscriptions obtained outside of the user account of the electronic device, and optionally is displayed for deletion of applications that utilize subscription obtained through the user account of the electronic device.

The above-described manner of only displaying the subscription alert when the subscription is associated with the user account of the electronic device allows the electronic device to only display the subscription alert when the subscription can be managed from the subscription management user interface of the electronic device (e.g., outside subscriptions optionally cannot be managed from the subscription management user interface of the electronic device), which simplifies the interaction between the user and the electronic device and enhances the operability of the electronic device and makes the user-device interface more efficient (e.g., by reducing display of the subscription alert to times when subscription management can be successfully performed from the subscription alert and the subscription management user interface), which additionally reduces power usage and improves battery life of the electronic device by enabling the user to use the electronic device more quickly and efficiency.

It should be understood that the particular order in which the operations in FIGS. 7A-7K have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., a as described with respect to FIGS. 1A-1B, 3, 5A-5J) or application specific chips. Further, the operations described above with reference to FIGS. 7A-7K are, optionally, implemented by components depicted in FIGS. 1A-1B. For example, displaying operations 708, 718, and 730, receiving operations 702, 712, and 724, and initiating operations 706, 794, and 798-6 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to facilitate interactions with subscription applications on an electronic device. The present disclosure contemplates that in some instances, this gathered data may include personal information data that uniquely identifies or can be used to identify a specific person. Such personal information data can include demographic data, location-based data, online identifiers, telephone numbers, email addresses, home addresses, date of birth, or any other personal information.

The present disclosure recognizes that the use of such personal information data, in the present technology, can be used to the benefit of users. For example, the personal information data can be used to subscribe to services that provide access to content, services, or applications on an electronic device. Accordingly, use of such personal information data enables users to enter fewer inputs to configure subscriptions associated with applications. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change how payment information, billing addresses, etc. are stored and shared. For example, the user can select a setting that forgoes saving payment information. In another example, users can manage the privacy of their active subscriptions.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users can forgo storing payment information and, instead, manually enter the payment information when configuring a new subscription.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display device and one or more input devices:
  while a first application is installed on the electronic device, receiving, via the one or more input devices, an input corresponding to a request to delete the first application from the electronic device; and
  in response to receiving, via the one or more input devices, the input corresponding to the request to delete the first application from the electronic device:
    initiating a process to delete the first application from the electronic device;
    in accordance with a determination that a user account associated with the electronic device has a first subscription to a first subscription service, wherein the first subscription to the first subscription service allows the first application to provide first content on the electronic device, displaying, via the display device, a respective user interface that indicates that the user account has the first subscription to the first subscription service, wherein the respective user interface includes a selectable option that, when selected, causes the electronic device to cease display of the respective user interface without modifying the subscription; and
    in accordance with a determination that the first application does not provide content on the electronic device based on a subscription to a subscription service, forgoing displaying the respective user interface.

2. The method of claim 1, further comprising:
while displaying the respective user interface, receiving, via the one or more input devices, input directed to the respective user interface; and
in response to receiving the input directed to the respective user interface:
  in accordance with a determination that the input directed to the respective user interface corresponds to a request to manage the first subscription to the first subscription service:

displaying, via the display device, a subscription management user interface from which the first subscription to the first subscription services can be modified.

3. The method of claim 2, wherein the subscription management user interface is a system user interface, other than a user interface of the first application, and is also accessible in response to selection of a selectable option displayed in a system settings user interface, other than the respective user interface.

4. The method of claim 3, wherein the input corresponding to the request to delete the first application from the electronic device is received while displaying, via the display device, a first user interface, the method further comprising:
while displaying the subscription management user interface, receiving, via the one or more input devices, an input corresponding to a request to cease displaying the subscription management user interface; and
in response to receiving the input corresponding to the request to cease displaying the subscription management user interface:
ceasing display of the subscription management user interface; and
displaying, via the display device, the first user interface.

5. The method of claim 2, wherein the input corresponding to the request to delete the first application from the electronic device is received while displaying, via the display device, a first user interface, the method further comprising:
while displaying the subscription management user interface, receiving, via the one or more input devices, an input corresponding to a request to cancel the first subscription to the first subscription service; and
in response to receiving the input corresponding to the request to cancel the first subscription to the first subscription service:
canceling the first subscription to the first subscription service;
ceasing display of the subscription management user interface; and
displaying, via the display device, the first user interface.

6. The method of claim 1, wherein the respective user interface includes information about a current renewal or end date of the first subscription to the first subscription service.

7. The method of claim 1, wherein the first application is associated with the first subscription to the first subscription service and a second subscription to a second subscription service, the method further comprising:
while displaying the respective user interface, wherein the respective user interface indicates that the user account has the first subscription to the first subscription service and the second subscription to the second subscription service, receiving, via the one or more input devices, input directed to the respective user interface; and
in response to receiving the input directed to the respective user interface:
in accordance with a determination that the input directed to the respective user interface corresponds to a request to manage the first and second subscriptions:
displaying, via the display device, a subscription selection user interface that includes:
a first representation of the first subscription to the first subscription service, wherein the first representation includes information about a current subscription status of the first subscription; and
a second representation of the second subscription to the second subscription services, wherein the second representation includes information about a current subscription status of the second subscription.

8. The method of claim 7, further comprising:
while displaying the subscription selection user interface, receiving, via the one or more input devices, a respective input selecting a respective representation of a respective subscription; and
in response to receiving the respective input:
in accordance with a determination that the respective representation is the first representation, displaying, via the display device, a subscription management user interface from which the first subscription to the first subscription services can be modified; and
in accordance with a determination that the respective representation is the second representation, displaying, via the display device, a subscription management user interface from which the second subscription to the second subscription services can be modified.

9. The method of claim 8, further comprising:
while displaying the subscription management user interface from which the first subscription to the first subscription services can be modified, receiving, via the one or more input devices, an input corresponding to a request to change the current subscription status of the first subscription from a first subscription status to a second subscription status;
in response to receiving the input corresponding to the request to change the current subscription status of the first subscription from the first subscription status to the second subscription status, changing the current subscription status of the first subscription from the first subscription status to the second subscription status;
after changing the current subscription status of the first subscription from the first subscription status to the second subscription status, receiving, via the one or more input devices, an input corresponding to a request to cease displaying the subscription management user interface from which the first subscription to the first subscription services can be modified; and
in response to receiving the input corresponding to the request to cease displaying the subscription management user interface from which the first subscription to the first subscription services can be modified, displaying, via the display device, the subscription selection user interface, wherein the first representation of the first subscription in the subscription selection user interface includes a visual indication of the second subscription status.

10. The method of claim 8, further comprising:
while displaying the subscription management user interface from which the first subscription to the first subscription service can be modified, receiving, via the one or more input devices, an input corresponding to a request to cancel the first subscription to the first subscription service; and
in response to receiving the input corresponding to the request to cancel the first subscription:
canceling the first subscription to the first subscription service;

ceasing display of the subscription management user interface from which the first subscription to the first subscription services can be modified; and displaying, via the display device, the subscription selection user interface, wherein the first representation of the first subscription in the subscription selection user interface includes a visual indication of the cancellation of the first subscription.

11. The method of claim 7, wherein:
the first subscription to the first subscription service is a subscription to a content provider associated with the first application, and
the second subscription to the second subscription service is a subscription to a second content provider, other than the content provider associated with the first application, wherein the second subscription to the second content provider was obtained through the content provider associated with the first application.

12. The method of claim 1, further comprising:
while a first respective application and a second respective application are installed on the electronic device, wherein the first respective application and the second respective application are associated with a respective subscription to a respective subscription service, receiving, via the one or more input devices, an input corresponding to a request to delete the first respective application from the electronic device; and
in response to receiving, via the one or more input devices, the input corresponding to the request to delete the first respective application from the electronic device:
  initiating a process to delete the first respective application from the electronic device;
  in accordance with a determination that the respective subscription to the respective subscription service was obtained through the first respective application, displaying, via the display device, a second respective user interface that indicates that a user account associated with the electronic device has the respective subscription to the respective subscription service; and
  in accordance with a determination that the respective subscription to the respective subscription service was not obtained through the first respective application, forgoing displaying the second respective user interface.

13. The method of claim 1, further comprising:
while a respective application is installed on the electronic device, wherein the respective application is associated with a respective subscription to a respective subscription service, receiving, via the one or more input devices, an input corresponding to a request to delete the respective application; and
in response to receiving, via the one or more input devices, the input corresponding to the request to delete the respective application:
  initiating a process to delete the respective application from the electronic device;
  in accordance with a determination that the respective subscription to the respective subscription service enables a plurality of applications, including the respective application, to provide content on the electronic device, and the respective subscription was obtained through an application associated with the respective subscription service that does not utilize the respective subscription to provide content on the electronic device, forgoing displaying a second respective user interface that indicates that a user account associated with the electronic device has the respective subscription to the respective subscription service; and
  in accordance with a determination that the respective subscription to the respective subscription service was obtained through an application that utilizes the respective subscription service to provide content on the electronic device, displaying, via the display device, the second respective user interface.

14. The method of claim 1, further comprising:
while a respective application is installed on the electronic device, wherein the respective application is associated with a respective subscription to a respective subscription service, receiving, via the one or more input devices, an input corresponding to a request to delete the respective application, wherein the respective subscription to the respective subscription service enables a plurality of applications, including the respective application, to provide content on the electronic device, and the respective subscription was obtained through an application associated with the respective subscription service that does not utilize the respective subscription to provide content on the electronic device; and
in response to receiving, via the one or more input devices, the input corresponding to the request to delete the respective application:
  initiating a process to delete the respective application from the electronic device;
  in accordance with a determination that the respective application is a last application on the electronic device that provides content on the electronic device based on the respective subscription to the respective subscription service, displaying, via the display device, a second respective user interface that indicates that a user account associated with the electronic device has the respective subscription to the respective subscription service; and
  in accordance with a determination that at least one application on the electronic device, other than the respective application, provides content on the electronic device based on the respective subscription to the respective subscription service, forgoing displaying, via the display device, the second respective user interface.

15. The method of claim 1, further comprising:
in response to receiving, via the one or more input devices, the input corresponding to the request to delete the first application from the electronic device:
  in accordance with a determination that the first subscription to the first subscription service was obtained outside of the user account associated with the electronic device, forgoing displaying the respective user interface.

16. An electronic device, comprising:
one or more processors;
memory; and
one or more programs, wherein the one or more programs are stored in the memory and configured to be executed by the one or more processors, the one or more programs including instructions for:
while a first application is installed on the electronic device, receiving, via one or more input devices, an input corresponding to a request to delete the first application from the electronic device; and in response to receiving, via the one or more input devices, the input corresponding to the request to delete the first application from the electronic device:

initiating a process to delete the first application from the electronic device;

in accordance with a determination that a user account associated with the electronic device has a first subscription to a first subscription service, wherein the first subscription to the first subscription service allows the first application to provide first content on the electronic device, displaying, via a display device, a respective user interface that indicates that the user account has the first subscription to the first subscription service, wherein the respective user interface includes a selectable option that, when selected, causes the electronic device to cease display of the respective user interface without modifying the subscription; and in accordance with a determination that the first application does not provide content on the electronic device based on a subscription to a subscription service, forgoing displaying the respective user interface.

17. The electronic device of claim 16, wherein the one or more programs further include instructions for:

while displaying the respective user interface, receiving, via the one or more input devices, input directed to the respective user interface; and in response to receiving the input directed to the respective user interface:

in accordance with a determination that the input directed to the respective user interface corresponds to a request to manage the first subscription to the first subscription service:

displaying, via the display device, a subscription management user interface from which the first subscription to the first subscription services can be modified.

18. The electronic device of claim 17, wherein the subscription management user interface is a system user interface, other than a user interface of the first application, and is also accessible in response to selection of a selectable option displayed in a system settings user interface, other than the respective user interface.

19. The electronic device of claim 18, wherein the input corresponding to the request to delete the first application from the electronic device is received while displaying, via the display device, a first user interface, and the one or more programs further include instructions for:

while displaying the subscription management user interface, receiving, via the one or more input devices, an input corresponding to a request to cease displaying the subscription management user interface; and in response to receiving the input corresponding to the request to cease displaying the subscription management user interface:

ceasing display of the subscription management user interface; and displaying, via the display device, the first user interface.

20. The electronic device of claim 17, wherein the input corresponding to the request to delete the first application from the electronic device is received while displaying, via the display device, a first user interface, the one or more programs further including instructions for:

while displaying the subscription management user interface, receiving, via the one or more input devices, an input corresponding to a request to cancel the first subscription to the first subscription service; and in response to receiving the input corresponding to the request to cancel the first subscription to the first subscription service:

canceling the first subscription to the first subscription service;

ceasing display of the subscription management user interface; and displaying, via the display device, the first user interface.

21. The electronic device of claim 16, wherein the respective user interface includes information about a current renewal or end date of the first subscription to the first subscription service.

22. The electronic device of claim 16, wherein the first application is associated with the first subscription to the first subscription service and a second subscription to a second subscription service, and the one or more programs further include instructions for:

while displaying the respective user interface, wherein the respective user interface indicates that the user account has the first subscription to the first subscription service and the second subscription to the second subscription service, receiving, via the one or more input devices, input directed to the respective user interface; and in response to receiving the input directed to the respective user interface:

in accordance with a determination that the input directed to the respective user interface corresponds to a request to manage the first and second subscriptions:

displaying, via the display device, a subscription selection user interface that includes:

a first representation of the first subscription to the first subscription service, wherein the first representation includes information about a current subscription status of the first subscription; and a second representation of the second subscription to the second subscription services, wherein the second representation includes information about a current subscription status of the second subscription.

23. The electronic device of claim 22, wherein the one or more programs further include instructions for:

while displaying the subscription selection user interface, receiving, via the one or more input devices, a respective input selecting a respective representation of a respective subscription; and in response to receiving the respective input:

in accordance with a determination that the respective representation is the first representation, displaying, via the display device, a subscription management user interface from which the first subscription to the first subscription services can be modified; and in accordance with a determination that the respective representation is the second representation, displaying, via the display device, a subscription management user interface from which the second subscription to the second subscription services can be modified.

24. The electronic device of claim 23, wherein the one or more programs further include instructions for:

while displaying the subscription management user interface from which the first subscription to the first subscription services can be modified, receiving, via the one or more input devices, an input corresponding to a request to change the current subscription status of the first subscription from a first subscription status to a second subscription status;

in response to receiving the input corresponding to the request to change the current subscription status of the first subscription from the first subscription status to the second subscription status, changing the current subscription status of the first subscription from the first subscription status to the second subscription status;

after changing the current subscription status of the first subscription from the first subscription status to the second subscription status, receiving, via the one or more input devices, an input corresponding to a request to cease displaying the subscription management user interface from which the first subscription to the first subscription services can be modified; and in response to receiving the input corresponding to the request to cease displaying the subscription management user interface from which the first subscription to the first subscription services can be modified, displaying, via the display device, the subscription selection user interface, wherein the first representation of the first subscription in the subscription selection user interface includes a visual indication of the second subscription status.

25. The electronic device of claim 23, wherein the one or more programs further include instructions for:

while displaying the subscription management user interface from which the first subscription to the first subscription service can be modified, receiving, via the one or more input devices, an input corresponding to a request to cancel the first subscription to the first subscription service; and in response to receiving the input corresponding to the request to cancel the first subscription:
canceling the first subscription to the first subscription service;
ceasing display of the subscription management user interface from which the first subscription to the first subscription services can be modified; and
displaying, via the display device, the subscription selection user interface, wherein the first representation of the first subscription in the subscription selection user interface includes a visual indication of the cancellation of the first subscription.

26. The electronic device of claim 22, wherein:
the first subscription to the first subscription service is a subscription to a content provider associated with the first application, and
the second subscription to the second subscription service is a subscription to a second content provider, other than the content provider associated with the first application, wherein the second subscription to the second content provider was obtained through the content provider associated with the first application.

27. The electronic device of claim 16, wherein the one or more programs further include instructions for:
while a first respective application and a second respective application are installed on the electronic device, wherein the first respective application and the second respective application are associated with a respective subscription to a respective subscription service, receiving, via the one or more input devices, an input corresponding to a request to delete the first respective application from the electronic device; and in response to receiving, via the one or more input devices, the input corresponding to the request to delete the first respective application from the electronic device:
initiating a process to delete the first respective application from the electronic device;
in accordance with a determination that the respective subscription to the respective subscription service was obtained through the first respective application, displaying, via the display device, a second respective user interface that indicates that a user account associated with the electronic device has the respective subscription to the respective subscription service; and
in accordance with a determination that the respective subscription to the respective subscription service was not obtained through the first respective application, forgoing displaying the second respective user interface.

28. The electronic device of claim 16, wherein the one or more programs further include instructions for:
while a respective application is installed on the electronic device, wherein the respective application is associated with a respective subscription to a respective subscription service, receiving, via the one or more input devices, an input corresponding to a request to delete the respective application; and in response to receiving, via the one or more input devices, the input corresponding to the request to delete the respective application:
initiating a process to delete the respective application from the electronic device;
in accordance with a determination that the respective subscription to the respective subscription service enables a plurality of applications, including the respective application, to provide content on the electronic device, and the respective subscription was obtained through an application associated with the respective subscription service that does not utilize the respective subscription to provide content on the electronic device, forgoing displaying a second respective user interface that indicates that a user account associated with the electronic device has the respective subscription to the respective subscription service; and
in accordance with a determination that the respective subscription to the respective subscription service was obtained through an application that utilizes the respective subscription service to provide content on the electronic device, displaying, via the display device, the second respective user interface.

29. The electronic device of claim 16, wherein the one or more programs further include instructions for:
while a respective application is installed on the electronic device, wherein the respective application is associated with a respective subscription to a respective subscription service, receiving, via the one or more input devices, an input corresponding to a request to delete the respective application, wherein the respective subscription to the respective subscription service enables a plurality of applications, including the respective application, to provide content on the electronic device, and the respective subscription was obtained through an application associated with the respective subscription service that does not utilize the respective subscription to provide content on the electronic device; and in response to receiving, via the one or more input devices, the input corresponding to the request to delete the respective application:
initiating a process to delete the respective application from the electronic device;
in accordance with a determination that the respective application is a last application on the electronic device that provides content on the electronic device based on the respective subscription to the respective subscription service, displaying, via the display device, a second respective user interface that indicates that a user account associated with the electronic device has the respective subscription to the respective subscription service; and
in accordance with a determination that at least one application on the electronic device, other than the respective application, provides content on the electronic device based on the respective subscription to the respective subscription service, forgoing displaying, via the display device, the second respective user interface.

30. The electronic device of claim 16, wherein the one or more programs further include instructions for:
in response to receiving, via the one or more input devices, the input corresponding to the request to delete the first application from the electronic device:
in accordance with a determination that the first subscription to the first subscription service was obtained outside of the user account associated with the electronic device, forgoing displaying the respective user interface.

31. A non-transitory computer readable storage medium storing one or more programs, the one or more programs comprising instructions, which when executed by one or more processors of an electronic device, cause the electronic device to:
while a first application is installed on the electronic device, receive, via one or more input devices, an input corresponding to a request to delete the first application from the electronic device; and
in response to receiving, via the one or more input devices, the input corresponding to the request to delete the first application from the electronic device:
initiate a process to delete the first application from the electronic device;
in accordance with a determination that a user account associated with the electronic device has a first subscription to a first subscription service, wherein the first subscription to the first subscription service allows the first application to provide first content on the electronic device, display, via a display device, a respective user interface that indicates that the user account has the first subscription to the first subscription service, wherein the respective user interface includes a selectable option that, when selected, causes the electronic device to cease display of the respective user interface without modifying the subscription; and
in accordance with a determination that the first application does not provide content on the electronic device based on a subscription to a subscription service, forgo displaying the respective user interface.

32. The non-transitory computer readable storage medium of claim 31, wherein the one or more programs further cause the electronic device to:
while displaying the respective user interface, receive, via the one or more input devices, input directed to the respective user interface; and
in response to receiving the input directed to the respective user interface:
in accordance with a determination that the input directed to the respective user interface corresponds to a request to manage the first subscription to the first subscription service:
display, via the display device, a subscription management user interface from which the first subscription to the first subscription services can be modified.

33. The non-transitory computer readable storage medium of claim 32, wherein the subscription management user interface is a system user interface, other than a user interface of the first application, and is also accessible in response to selection of a selectable option displayed in a system settings user interface, other than the respective user interface.

34. The non-transitory computer readable storage medium of claim 33, wherein the input corresponding to the request to delete the first application from the electronic device is received while displaying, via the display device, a first user interface, and the one or more programs further cause the electronic device to:
while displaying the subscription management user interface, receive, via the one or more input devices, an input corresponding to a request to cease displaying the subscription management user interface; and
in response to receiving the input corresponding to the request to cease displaying the subscription management user interface:
cease display of the subscription management user interface; and
display, via the display device, the first user interface.

35. The non-transitory computer readable storage medium of claim 32, wherein the input corresponding to the request to delete the first application from the electronic device is received while displaying, via the display device, a first user interface, and the one or more programs further cause the electronic device to:
while displaying the subscription management user interface, receive, via the one or more input devices, an input corresponding to a request to cancel the first subscription to the first subscription service; and
in response to receiving the input corresponding to the request to cancel the first subscription to the first subscription service:
cancel the first subscription to the first subscription service;
cease display of the subscription management user interface; and
display, via the display device, the first user interface.

36. The non-transitory computer readable storage medium of claim 31, wherein the respective user interface includes information about a current renewal or end date of the first subscription to the first subscription service.

37. The non-transitory computer readable storage medium of claim 31, wherein the first application is associated with the first subscription to the first subscription service and a second subscription to a second subscription service, and the one or more programs further cause the electronic device to:
while displaying the respective user interface, wherein the respective user interface indicates that the user account has the first subscription to the first subscription service and the second subscription to the second subscription service, receive, via the one or more input devices, input directed to the respective user interface; and in response to receiving the input directed to the respective user interface:

in accordance with a determination that the input directed to the respective user interface corresponds to a request to manage the first and second subscriptions:

display, via the display device, a subscription selection user interface that includes:

a first representation of the first subscription to the first subscription service, wherein the first representation includes information about a current subscription status of the first subscription; and a second representation of the second subscription to the second subscription services, wherein the second representation includes information about a current subscription status of the second subscription.

38. The non-transitory computer readable storage medium of claim 37, wherein the one or more programs further cause the electronic device to:

while displaying the subscription selection user interface, receive, via the one or more input devices, a respective input selecting a respective representation of a respective subscription; and in response to receiving the respective input:

in accordance with a determination that the respective representation is the first representation, display, via the display device, a subscription management user interface from which the first subscription to the first subscription services can be modified; and in accordance with a determination that the respective representation is the second representation, display, via the display device, a subscription management user interface from which the second subscription to the second subscription services can be modified.

39. The non-transitory computer readable storage medium of claim 38, wherein the one or more programs further cause the electronic device to:

while displaying the subscription management user interface from which the first subscription to the first subscription services can be modified, receive, via the one or more input devices, an input corresponding to a request to change the current subscription status of the first subscription from a first subscription status to a second subscription status;

in response to receiving the input corresponding to the request to change the current subscription status of the first subscription from the first subscription status to the second subscription status, change the current subscription status of the first subscription from the first subscription status to the second subscription status;

after changing the current subscription status of the first subscription from the first subscription status to the second subscription status, receive, via the one or more input devices, an input corresponding to a request to cease displaying the subscription management user interface from which the first subscription to the first subscription services can be modified; and in response to receiving the input corresponding to the request to cease displaying the subscription management user interface from which the first subscription to the first subscription services can be modified, display, via the display device, the subscription selection user interface, wherein the first representation of the first subscription in the subscription selection user interface includes a visual indication of the second subscription status.

40. The non-transitory computer readable storage medium of claim 38, wherein the one or more programs further cause the electronic device to:

while displaying the subscription management user interface from which the first subscription to the first subscription service can be modified, receive, via the one or more input devices, an input corresponding to a request to cancel the first subscription to the first subscription service; and in response to receiving the input corresponding to the request to cancel the first subscription:

cancel the first subscription to the first subscription service;

cease display of the subscription management user interface from which the first subscription to the first subscription services can be modified; and display, via the display device, the subscription selection user interface, wherein the first representation of the first subscription in the subscription selection user interface includes a visual indication of the cancellation of the first subscription.

41. The non-transitory computer readable storage medium of claim 37, wherein:

the first subscription to the first subscription service is a subscription to a content provider associated with the first application, and the second subscription to the second subscription service is a subscription to a second content provider, other than the content provider associated with the first application, wherein the second subscription to the second content provider was obtained through the content provider associated with the first application.

42. The non-transitory computer readable storage medium of claim 17, wherein the one or more programs further cause the electronic device to:

while a first respective application and a second respective application are installed on the electronic device, wherein the first respective application and the second respective application are associated with a respective subscription to a respective subscription service, receive, via the one or more input devices, an input corresponding to a request to delete the first respective application from the electronic device; and in response to receiving, via the one or more input devices, the input corresponding to the request to delete the first respective application from the electronic device:

initiate a process to delete the first respective application from the electronic device;

in accordance with a determination that the respective subscription to the respective subscription service was obtained through the first respective application, display, via the display device, a second respective user interface that indicates that a user account associated with the electronic device has the respective subscription to the respective subscription service; and in accordance with a determination that the respective subscription to the respective subscription service was not obtained through the first respective application, forgo displaying the second respective user interface.

43. The non-transitory computer readable storage medium of claim 31, wherein the instructions cause the electronic device to:
- while a respective application is installed on the electronic device, wherein the respective application is associated with a respective subscription to a respective subscription service, receive, via the one or more input devices, an input corresponding to a request to delete the respective application; and
- in response to receiving, via the one or more input devices, the input corresponding to the request to delete the respective application:
  - initiate a process to delete the respective application from the electronic device;
  - in accordance with a determination that the respective subscription to the respective subscription service enables a plurality of applications, including the respective application, to provide content on the electronic device, and the respective subscription was obtained through an application associated with the respective subscription service that does not utilize the respective subscription to provide content on the electronic device, forgo displaying a second respective user interface that indicates that a user account associated with the electronic device has the respective subscription to the respective subscription service; and
  - in accordance with a determination that the respective subscription to the respective subscription service was obtained through an application that utilizes the respective subscription service to provide content on the electronic device, display, via the display device, the second respective user interface.

44. The non-transitory computer readable storage medium of claim 31, wherein the one or more programs further cause the electronic device to:
- while a respective application is installed on the electronic device, wherein the respective application is associated with a respective subscription to a respective subscription service, receive, via the one or more input devices, an input corresponding to a request to delete the respective application, wherein the respective subscription to the respective subscription service enables a plurality of applications, including the respective application, to provide content on the electronic device, and the respective subscription was obtained through an application associated with the respective subscription service that does not utilize the respective subscription to provide content on the electronic device; and
- in response to receiving, via the one or more input devices, the input corresponding to the request to delete the respective application:
  - initiate a process to delete the respective application from the electronic device;
  - in accordance with a determination that the respective application is a last application on the electronic device that provides content on the electronic device based on the respective subscription to the respective subscription service, display, via the display device, a second respective user interface that indicates that a user account associated with the electronic device has the respective subscription to the respective subscription service; and
  - in accordance with a determination that at least one application on the electronic device, other than the respective application, provides content on the electronic device based on the respective subscription to the respective subscription service, forgo displaying, via the display device, the second respective user interface.

45. The non-transitory computer readable storage medium of claim 31, wherein the one or more programs further cause the electronic device to:
- in response to receiving, via the one or more input devices, the input corresponding to the request to delete the first application from the electronic device:
  - in accordance with a determination that the first subscription to the first subscription service was obtained outside of the user account associated with the electronic device, forgo displaying the respective user interface.

\* \* \* \* \*